US012776272B2

(12) United States Patent
Kim et al.

(10) Patent No.: US 12,776,272 B2
(45) Date of Patent: Oct. 27, 2026

(54) DISPLAY DEVICE AND ELECTRONIC DEVICE

(71) Applicant: Samsung Display Co., LTD., Yongin-si (KR)

(72) Inventors: Kwi Hyun Kim, Yongin-si (KR); Se Hyun Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/192,034

(22) Filed: Apr. 28, 2025

(65) Prior Publication Data

US 2026/0087983 A1 Mar. 26, 2026

(30) Foreign Application Priority Data

Sep. 20, 2024 (KR) ........................ 10-2024-0127007

(51) Int. Cl.
*G09G 3/20* (2006.01)
*G09G 3/3233* (2016.01)

(52) U.S. Cl.
CPC ......... *G09G 3/3233* (2013.01); *G09G 3/2007* (2013.01); *G09G 2300/0426* (2013.01); *G09G 2300/0804* (2013.01); *G09G 2300/0819* (2013.01); *G09G 2300/0842* (2013.01); *G09G 2300/0861* (2013.01); *G09G 2310/08* (2013.01); *G09G 2320/0233* (2013.01); *G09G 2320/0242* (2013.01); *G09G 2330/023* (2013.01); *G09G 2380/10* (2013.01)

(58) Field of Classification Search
CPC ......... G09G 3/3225; G09G 2300/0452; G09G 2300/0861; G09G 2300/0842; G09G 3/20
See application file for complete search history.

(56) References Cited

U.S. PATENT DOCUMENTS

| | | | | |
|---|---|---|---|---|
| 8,723,763 B2 * | 5/2014 | Jeong | G09G 3/3291 345/82 |
| 9,076,381 B2 * | 7/2015 | Naoaki | G09G 3/3225 |
| 11,227,537 B2 * | 1/2022 | Yoon | G09G 3/32 |
| 11,532,283 B2 * | 12/2022 | Jang | G09G 3/3233 |
| 11,915,648 B2 * | 2/2024 | Lu | G09G 3/3266 |
| 2007/0126671 A1 * | 6/2007 | Naoaki | G09G 3/3225 345/77 |

(Continued)

FOREIGN PATENT DOCUMENTS

| | | |
|---|---|---|
| CN | 111179836 A | 5/2020 |
| KR | 100732824 B1 | 6/2007 |

(Continued)

*Primary Examiner* — Olga V Merkoulova
(74) *Attorney, Agent, or Firm* — CANTOR COLBURN LLP

(57) ABSTRACT

A display device includes: a first pixel including a first light emitting element which provides light of a first color; a second pixel including a second light emitting element which provides light of a second color different from the first color, a first emission line which is connected to the first pixel and transmits a first emission signal to the first pixel; and a second emission line which is connected to the second pixel and transmits a second emission signal to the second pixel, where a first pulse width of the first emission signal is smaller than a second pulse width of the second emission signal.

19 Claims, 30 Drawing Sheets

(56) References Cited

U.S. PATENT DOCUMENTS

| | | | | |
|---|---|---|---|---|
| 2011/0050741 | A1* | 3/2011 | Jeong | G09G 3/3233<br>345/82 |
| 2021/0027697 | A1* | 1/2021 | Yoon | G09G 3/3233 |
| 2022/0148522 | A1* | 5/2022 | Jang | G09G 3/3233 |
| 2023/0005423 | A1* | 1/2023 | Lu | G09G 3/3233 |
| 2024/0005859 | A1* | 1/2024 | Kim | G09G 3/3233 |

FOREIGN PATENT DOCUMENTS

| | | | |
|---|---|---|---|
| KR | 1020210106125 | A | 8/2021 |
| KR | 1020220052265 | A | 4/2022 |

* cited by examiner

DISPLAY DEVICE AND ELECTRONIC DEVICE

This application claims priority to Korean Patent Application No. 10-2024-0127007, filed on Sep. 20, 2024, and all the benefits accruing therefrom under 35 U.S.C. § 119, the content of which in its entirety is herein incorporated by reference.

BACKGROUND

1. Field

The present disclosure relates to a display device, and more particularly, to a display device and an electronic device with reduced power consumption and improved image quality.

2. Description of the Related Art

An organic light emitting display device includes a display element which emits light with a luminance that varies with an electric current applied thereto, for example, an organic light emitting diode.

The organic light emitting display device includes a plurality of pixels that provide light of different colors.

SUMMARY

Embodiments of the disclosure provide a display device and an electronic device with reduced power consumption and improved image quality.

According to an embodiment of the disclosure, there is provided a display device including: a first pixel including a first light emitting element which provides light of a first color; a second pixel including a second light emitting element which provides light of a second color different from the first color; a first emission line which is connected to the first pixel and transmits a first emission signal to the first pixel; and a second emission line which is connected to the second pixel and transmits a second emission signal to the second pixel, where a first pulse width of the first emission signal is smaller than a second pulse width of the second emission signal.

According to an embodiment of the disclosure, there is provided an electronic device including: a display device which displays an image, where the display device includes a first pixel including a first light emitting element which provides light of a first color; a second pixel including a second light emitting element which provides light of a second color different from the first color; a first emission line which is connected to the first pixel and transmits a first emission signal; and a second emission line which is connected to the second pixel and transmits a second emission signal, where a first pulse width of the first emission signal is smaller than a second pulse width of the second emission signal.

In embodiments of the disclosure, a luminance deviation of each light in its optimal current density section may be minimized. Therefore, the power consumption of the display device can be reduced, and the image quality of the display device can be improved.

BRIEF DESCRIPTION OF THE DRAWINGS

These and/or other features of embodiments of the disclosure will become apparent and more readily appreciated from the following description of the embodiments, taken in conjunction with the accompanying drawings, in which.

DETAILED DESCRIPTION

Figure 1:
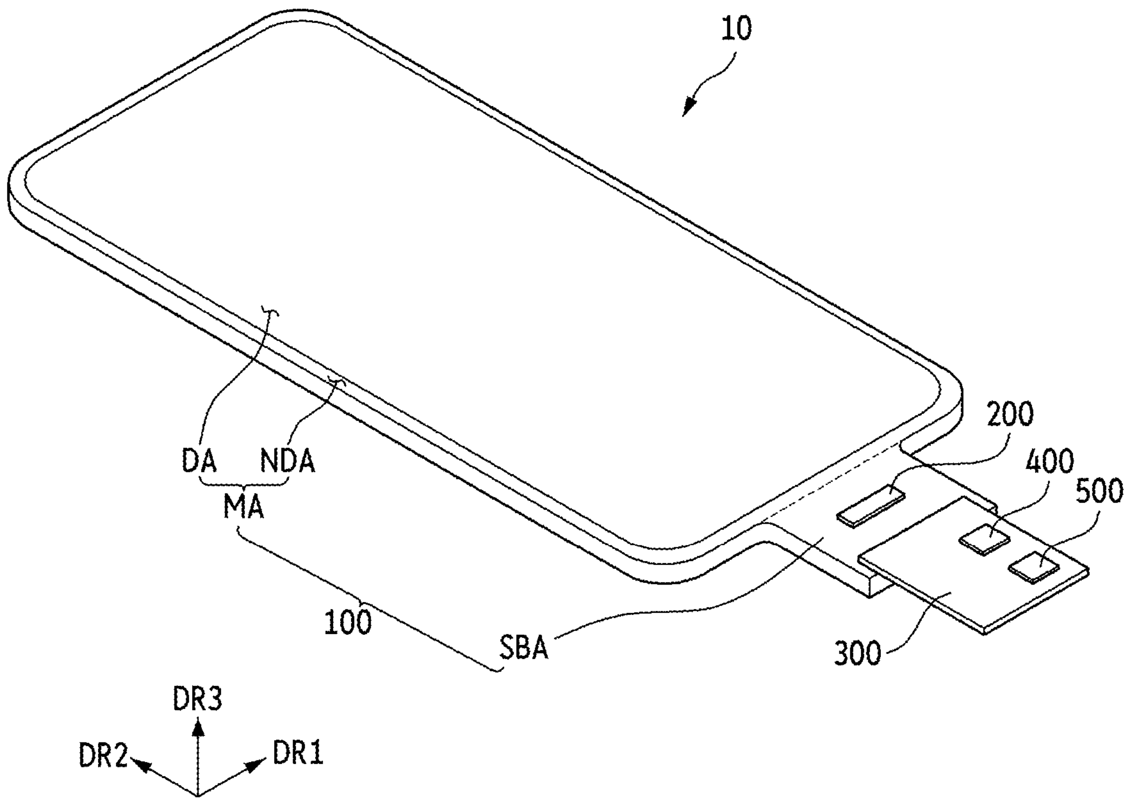
FIG. 1 is a perspective view of a display device according to an embodiment.

The invention will now be described more fully hereinafter with reference to the accompanying drawings, in which various embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

It will also be understood that when a layer is referred to as being "on" another layer or substrate, it can be directly on the other layer or substrate, or intervening layers may also be present. In contrast, when an element is referred to as being "directly on" another element, there are no intervening elements present. The same reference numbers indicate the same components throughout the specification. In the attached figures, the thickness of layers and regions is exaggerated for clarity.

Although the terms "first", "second", etc. may be used herein to describe various elements, these elements, should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Features of various embodiments of the disclosure may be combined partially or totally. As will be clearly appreciated by those skilled in the art, technically various interactions and operations are possible. Various embodiments can be practiced individually or in combination.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments will be described in detail with reference to the accompanying drawings.

FIG. 1 is a perspective view of a display device 10 according to an embodiment.

Referring to FIG. 1, an embodiment of the display device 10 may be applied to portable electronic devices such as mobile phones, smartphones, tablet personal computers (PCs), mobile communication terminals, electronic notebooks, electronic books, portable multimedia players (PMPs), navigation devices, and ultra-mobile PCs (UMPCs). For example, the display device 10 may be applied as a display unit of a television, a notebook computer, a monitor, a billboard, or an Internet of things (IoT) device. For another example, the display device 10 may be applied to wearable devices such as smart watches, watch phones, glasses-type displays, and head mounted displays.

The display device 10 may have a planar shape similar to a quadrangle. In an embodiment, for example, the display device 10 may have a planar shape similar to a quadrangle having short sides in a first direction DR1 and long sides in a second direction DR2 when viewed in a plan view or in a third direction DR3. Here, the third direction DR3 may be a direction perpendicular to a plane defined by the first direction DR1 and the second direction DR2 or a thickness direction of the display device 10. Each corner where a short side extending in the first direction DR1 meets a long side extending in the second direction DR2 may be rounded to have a predetermined curvature or may be right-angled. The planar shape of the display device 10 is not limited to the quadrangular shape but may also be similar to other polygonal shapes, a circular shape, or an oval shape.

In an embodiment, the display device 10 may include a display panel 100, a display driver 200, a circuit board 300, a touch driver 400, and a power supply unit 500.

The display panel 100 may include a main area MA and a sub-area SBA.

The main area MA may include a display area DA including pixels that display an image and a non-display area NDA disposed around the display area DA. The display area DA may emit light from a plurality of emission areas or a plurality of opening areas. In an embodiment, for example, the display panel 100 may include a pixel circuit including switching elements, a pixel defining layer defining an emission area or an opening area, and a self-light emitting element.

In an embodiment, for example, the self-light emitting element may include, but is not limited to, at least one selected from an organic light emitting diode including an organic light emitting layer, a quantum dot light emitting diode including a quantum dot light emitting layer, an inorganic light emitting diode including an inorganic semiconductor, and a micro light emitting diode.

The non-display area NDA may be an area outside the display area DA. The non-display area NDA may be defined as an edge area of the main area MA of the display panel 100. The non-display area NDA may include a gate driver (not illustrated) which supplies gate signals to gate lines and fan-out lines (not illustrated) which connect the display driver 200 and the display area DA.

The sub-area SBA may extend from a side of the main area MA. The sub-area SBA may include a flexible material that can be bent, folded, rolled, etc. In an embodiment, for example, in a state where the sub-area SBA is bent, the sub-area SBA may overlap the main area MA in the thickness direction (e.g., the third direction DR3). The sub-area SBA may include the display driver 200 and a pad unit connected to the circuit board 300. In another embodiment, the sub-area SBA may be omitted, and the display driver 200 and the pad unit may be disposed in the non-display area NDA.

The display driver 200 may output signals and voltages for driving the display panel 100. The display driver 200 may supply data voltages to data lines. The display driver 200 may supply a power supply voltage to a power line and supply a gate control signal to the gate driver. The display driver 200 may be formed as an integrated circuit and mounted on the display panel 100 by a chip on glass (COG) method, a chip on plastic (COP) method, or an ultrasonic bonding method. In an embodiment, for example, the display driver 200 may be disposed in the sub-area SBA and may be overlapped by the main area MA in the thickness direction (third direction DR3) by the bending of the sub-area SBA. In another embodiment, for example, the display driver 200 may be mounted on the circuit board 300.

The circuit board 300 may be attached onto the pad unit of the display panel 100 using an anisotropic conductive film. Lead lines of the circuit board 300 may be electrically connected to the pad unit of the display panel 100. The circuit board 300 may be a flexible printed circuit board, a printed circuit board, or a flexible film such as a chip on film.

The touch driver 400 may be mounted on the circuit board 300. The touch driver 400 may be electrically connected to a touch sensing unit of the display panel 100. The touch driver 400 may supply a touch driving signal to a plurality of touch electrodes of the touch sensing unit and sense a change in capacitance between the touch electrodes. In an embodiment, for example, the touch driving signal may be a pulse signal having a predetermined frequency. The touch driver 400 may determine whether an input has been made based on a change in capacitance between the touch electrodes and calculate coordinates of the input. The touch driver 400 may be formed as an integrated circuit.

The power supply unit 500 may be disposed on the circuit board 300 and may supply a power supply voltage to the display driver 200 and the display panel 100. The power supply unit 500 may generate a driving voltage and supply the driving voltage to a driving voltage line VDL, may generate an initialization voltage (e.g., a first initialization voltage and a second initialization voltage) and supply the initialization voltage to an initialization voltage line (e.g., a first initialization voltage line VIL1 and a second initialization voltage line VIL2), and may generate a common voltage and supply the common voltage to a common electrode common to light emitting elements of a plurality of pixels. In an embodiment, for example, the driving voltage may be a high potential voltage for driving the light emitting elements, and the common voltage may be a low potential voltage for driving the light emitting elements.

Figure 2:
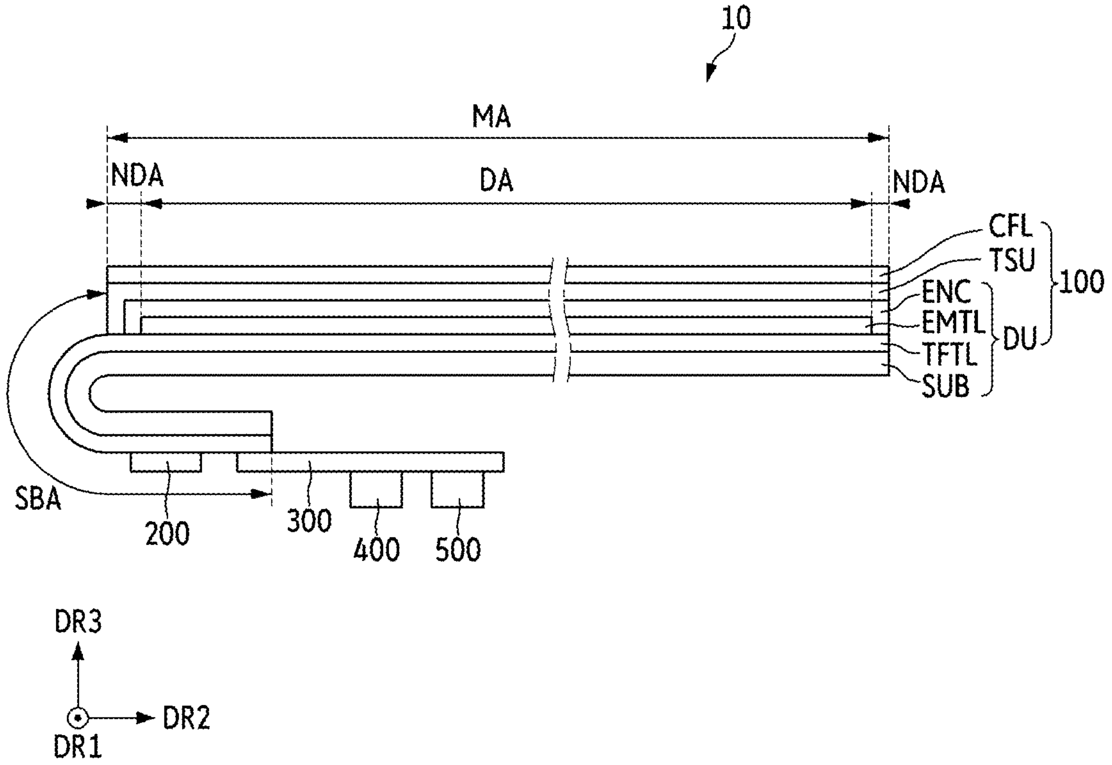
FIG. 2 is a cross-sectional view of the display device according to an embodiment.

FIG. 2 is a cross-sectional view of the display device 10 according to an embodiment.

Referring to FIG. 2, in an embodiment of the display device 10, the display panel 100 may include a display unit DU, a touch sensing unit TSU, and a color filter layer CFL. The display unit DU may include a substrate SUB, a thin-film transistor layer TFTL, a light emitting element layer EMTL, and an encapsulation layer ENC.

The substrate SUB may be a base substrate or a base member. The substrate SUB may be a flexible substrate that can be bent, folded, rolled, etc. In an embodiment, for example, the substrate SUB may include polymer resin such as polyimide (PI), but the disclosure is not limited thereto. In another embodiment, for example, the substrate SUB may include a glass material or a metal material.

The thin-film transistor layer TFTL may be disposed on the substrate SUB. The thin-film transistor layer TFTL may include a plurality of thin-film transistors constituting pixel circuits of pixels. The thin-film transistor layer TFTL may further include gate lines, data lines, power lines, gate control lines, fan-out lines connecting the display driver 200 and the data lines, and lead lines connecting the display driver 200 and the pad unit. Each of the thin-film transistors may include a semiconductor region, a source electrode, a drain electrode, and a gate electrode. In an embodiment, for example, where the gate driver is formed on a side of the non-display area NDA of the display panel 100, the gate driver may include thin-film transistors.

The thin-film transistor layer TFTL may be disposed in the display area DA, the non-display area NDA, and the sub-area SBA. The thin-film transistors of the pixels, the gate lines, the data lines, and the power lines of the thin-film transistor layer TFTL may be disposed in the display area DA. The gate control lines and the fan-out lines of the thin-film transistor layer TFTL may be disposed in the non-display area NDA. The lead lines of the thin-film transistor layer TFTL may be disposed in the sub-area SBA.

The light emitting element layer EMTL may be disposed on the thin-film transistor layer TFTL. The light emitting element layer EMTL may include a plurality of light emitting elements, each including a pixel electrode, a light emitting layer and a common electrode sequentially stacked to emit light, and a pixel defining layer defining the pixels. The light emitting elements of the light emitting element layer EMTL may be disposed in the display area DA.

In an embodiment, for example, the light emitting layer may be an organic light emitting layer including an organic material. The light emitting layer may include a hole transporting layer, an organic light emitting layer, and an electron transporting layer. When the pixel electrode receives a predetermined voltage through a thin-film transistor of the thin-film transistor layer TFTL and the common electrode receives a cathode voltage, holes and electrons may move to the organic light emitting layer through the hole transporting layer and the electron transporting layer, respectively. Then, the holes and the electrons may be combined with each other in the organic light emitting layer to emit light. In an embodiment, for example, the pixel electrode may be an anode, and the common electrode may be a cathode, but the disclosure is not limited thereto.

In another embodiment, for example, the light emitting elements may include a quantum dot light emitting diode including a quantum dot light emitting layer, an inorganic light emitting diode including an inorganic semiconductor, or a micro light emitting diode.

The encapsulation layer ENC may cover upper and side surfaces of the light emitting element layer EMTL and may protect the light emitting element layer EMTL. The encapsulation layer ENC may include at least one inorganic layer and at least one organic layer to encapsulate the light emitting element layer EMTL.

The touch sensing unit TSU may be disposed on the encapsulation layer ENC. The touch sensing unit TSU may include a plurality of touch electrodes for sensing a user's touch in a capacitive manner and touch lines connecting the touch electrodes and the touch driver 400. In an embodiment, for example, the touch sensing unit TSU may sense a user's touch in a mutual capacitance manner or a self-capacitance manner.

In another embodiment, for example, the touch sensing unit TSU may be disposed on a separate substrate disposed on the display unit DU. In such an embodiment, the substrate supporting the touch sensing unit TSU may be a base member that encapsulates the display unit DU.

The touch electrodes of the touch sensing unit TSU may be disposed in a touch sensor area overlapping the display area DA. The touch lines of the touch sensing unit TSU may be disposed in a touch peripheral area overlapping the non-display area NDA.

The color filter layer CFL may be disposed on the touch sensing unit TSU. The color filter layer CFL may include a plurality of color filters corresponding to a plurality of emission areas, respectively. Each of the color filters may selectively transmit light of a specific wavelength and block or absorb light of other wavelengths. The color filter layer CFL may absorb a part of light coming from the outside of the display device 10, thereby reducing reflected light caused by the external light. Therefore, the color filter layer CFL can effectively prevent color distortion caused by reflection of external light.

In such an embodiment, since the color filter layer CFL is directly disposed on the touch sensing unit TSU, the display device 10 may not include a separate substrate for the color filter layer CFL. Therefore, a thickness of the display device 10 can be relatively reduced.

The sub-area SBA of the display panel 100 may extend from a side of the main area MA. The sub-area SBA may include a flexible material that can be bent, folded, rolled, etc. In an embodiment, for example, when the sub-area SBA is bent, it may be overlapped by the main area MA in the thickness direction (or the third direction DR3). The sub-area SBA may include the display driver 200 and the pad unit electrically connected to the circuit board 300.

Figure 3:
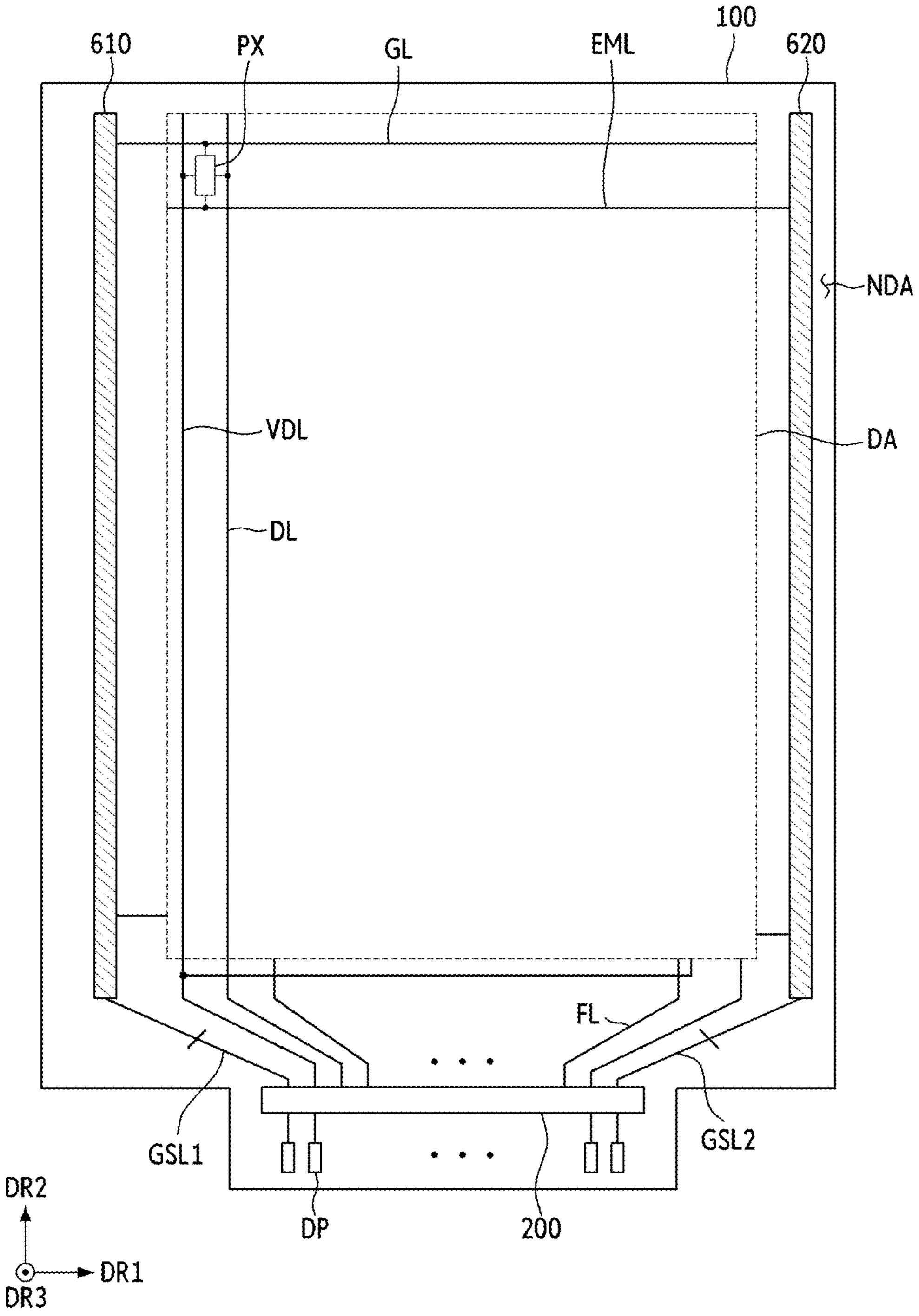
FIG. 3 is a plan view of a display unit of the display device according to an embodiment.
Figure 4:
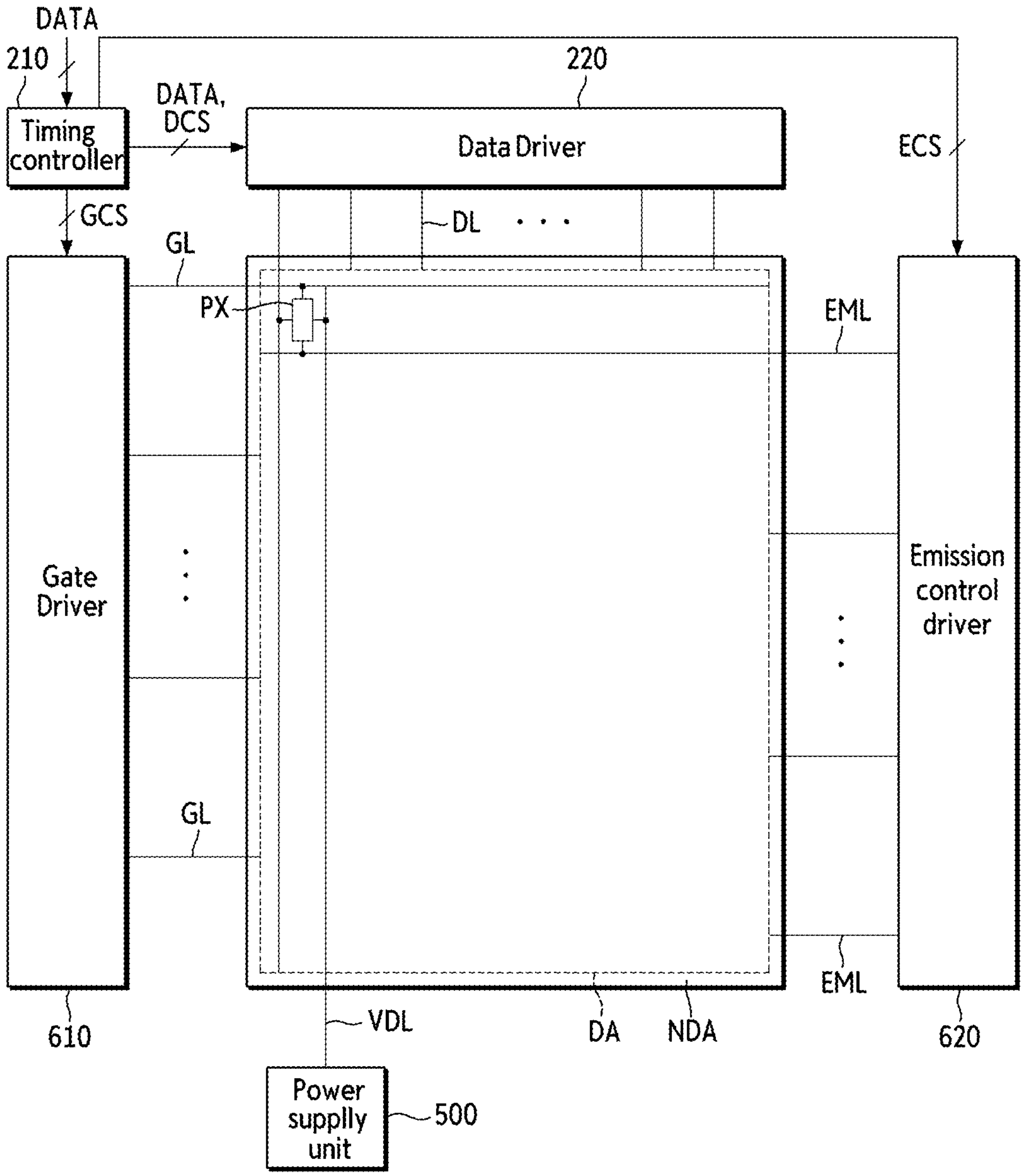
FIG. 4 is a block diagram of a display panel and a display driver according to an embodiment.

FIG. 3 is a plan view of the display unit DU of the display device 10 according to an embodiment. FIG. 4 is a block diagram of the display panel 100 and the display driver 200 according to an embodiment.

Referring to FIGS. 3 and 4, in an embodiment, the display panel 100 may include the display area DA and the non-display area NDA.

The display area DA may include a plurality of pixels PX, a plurality of driving voltage lines VDL connected to the pixels PX, a plurality of gate lines GL of a plurality of common voltage lines VSL (see FIG. 5), a plurality of emission control lines EML, and a plurality of data lines DL.

Each of the pixels PX may be connected to a gate line GL, a data line DL, an emission control line EML, a driving voltage line VDL, and a common voltage line VSL. Each of the pixels PX may include at least one transistor, a light emitting element, and a capacitor.

The gate lines GL may extend in the first direction DR1 and may be spaced apart from each other in the second direction DR2 intersecting the first direction DR1. The gate lines GL may be arranged along the second direction DR2. The gate lines GL may sequentially supply gate signals to the pixels PX connected thereto.

The emission lines EML may extend in the first direction DR1 and may be spaced apart from each other in the second direction DR2 The emission lines EML may be arranged along the second direction DR2. The emission lines EML may sequentially supply emission signals to the pixels PX.

The data lines DL may extend in the second direction DR2 and may be spaced apart from each other in the first direction DR1. The data lines DL may be arranged along the first direction DR1. The data lines DL may supply data voltages to the pixels PX connected thereto. A data voltage may determine the luminance of each of the pixels PX. The driving voltage lines VDL may extend in the second direction DR2 and may be spaced apart from each other in the first direction DR1. The driving voltage lines VDL may be arranged along the first direction DR1. The driving voltage lines VDL may supply a first driving voltage to the pixels PX. The first driving voltage may be a high potential voltage for driving the light emitting elements of the pixels PX.

The non-display area NDA may surround the display area DA. The non-display area NDA may include a gate driver 610, an emission driver 620, fan-out lines FL, a first gate control line GSL1, and a second gate control line GSL2.

The fan-out lines FL may extend from the display driver 200 to the display area DA. The fan-out lines FL may supply data voltages received from the display driver 200 to the data lines DL.

The first gate control line GSL1 may extend from the display driver 200 to the gate driver 610. The first gate control line GSL1 may supply a gate control signal GCS received from the display driver 200 to the gate driver 610.

The second gate control line GSL2 may extend from the display driver 200 to the emission driver 620. The second gate control line GSL2 may supply an emission control signal ECS received from the display driver 200 to the emission driver 620.

The sub-area SBA may extend from a side of the non-display area NDA. The sub-area SBA may include the display driver 200 and a pad unit DP. The pad unit DP may be disposed closer to an edge of the sub-area SBA than the display driver 200. The pad unit DP may be electrically connected to the circuit board 300 through an anisotropic conductive film.

The display driver 200 may include a timing controller 210 and a data driver 220.

The timing controller 210 may receive digital video data DATA and timing signals from the circuit board 300. The timing controller 210 may control the operation timing of the data driver 220 by generating a data control signal DCS based on the timing signals, may control the operation timing of the gate driver 610 by generating the gate control signal GCS, and may control the operation timing of the emission driver 620 by generating the emission control signal ECS. The timing controller 210 may supply the gate control signal GCS to the gate driver 610 through the first gate control line GSL1. The timing controller 210 may supply the emission control signal ECS to the emission driver 620 through the second gate control line GSL2. The timing controller 210 may supply the digital video data DATA and the data control signal DCS to the data driver 220.

The data driver 220 may convert the digital video data DATA into analog data voltages and supply the analog data voltages to the data lines DL through the fan-out lines FL. Gate signals of the gate driver 610 may select pixels PX to which the data voltages are to be supplied, and the selected pixels PX may receive the data voltages through the data lines DL.

The power supply unit 500 may be disposed on the circuit board 300 to supply a power supply voltage to the display driver 200 and the display panel 100. The power supply unit 500 may generate a driving voltage and supply the driving voltage to a driving voltage line VDL, may generate an initialization voltage and supply the initialization voltage to an initialization voltage line, and may generate a common voltage and supply the common voltage to a common voltage common to the light emitting elements of the pixels.

In an embodiment, the gate driver 610 may be disposed outside one side of the display area DA or on one side of the non-display area NDA, and the emission driver 620 may be disposed outside the other side of the display area DA or on the other side of the non-display area NDA. However, the disclosure is not limited thereto. In another embodiment, for example, the gate driver 610 and the emission driver 620 may be disposed on either one side or the other side of the non-display area NDA.

The gate driver 610 may include a plurality of transistors that generate gate signals based on the gate control signal GCS. The emission driver 620 may include a plurality of transistors that generate emission signals based on the emission control signal ECS. In an embodiment, for example, the transistors of the gate driver 610 and the transistors of the emission driver 620 may be formed in (or directly on) a same layer as the transistors of each of the pixels PX. The gate driver 610 may supply the gate signals to the gate lines GL, and the emission driver 620 may supply the emission signals to the emission control lines EML.

Figure 5:
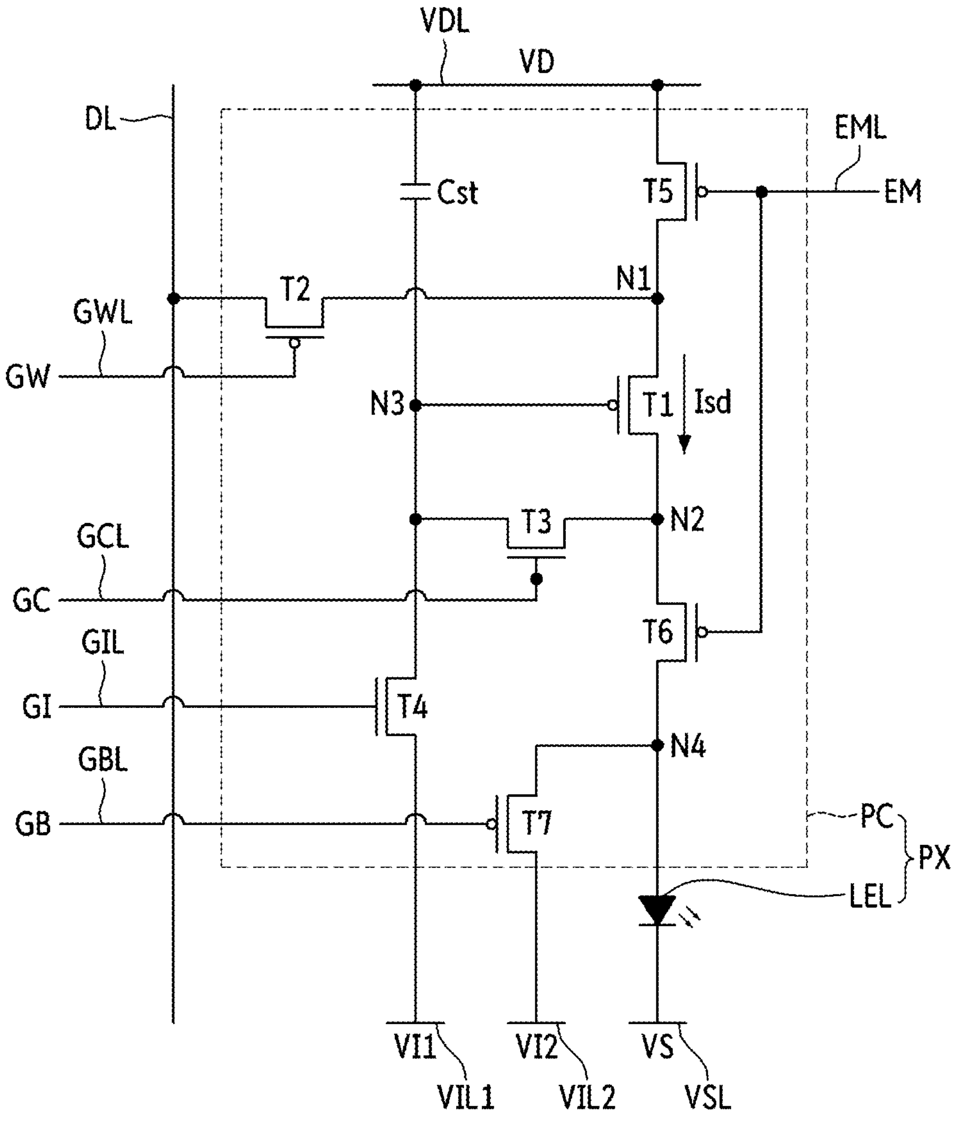
FIG. 5 is a circuit diagram of a pixel of the display device according to an embodiment.

FIG. 5 is a circuit diagram of a pixel PX of the display device 10 according to an embodiment.

In an embodiment, the pixel PX may be connected to a first gate line GWL, a second gate line GCL, a third gate line GIL, a fourth gate line GBL, an emission control line EML, a data line DL, a driving voltage line VDL, a common voltage line VSL, a first initialization voltage line VIL1, and a second initialization voltage line VIL2.

The pixel PX may include a pixel circuit PC and a light emitting element LEL. In an embodiment, as shown in FIG. 5, the pixel circuit PC may include a first transistor T1, a second transistor T2, a third transistor T3, a fourth transistor T4, a fifth transistor T5, a sixth transistor T6, a seventh transistor T7, and a capacitor Cst.

The first transistor T1 may include a gate electrode, a source electrode, and a drain electrode. The first transistor T1 may control a source-drain current (hereinafter, referred to as a driving current) based on a data voltage applied to the gate electrode. The driving current Isd flowing through a channel region of the first transistor T1 may be proportional to the square of a difference between a voltage (Vsg) between the source electrode and the gate electrode of the first transistor T1 and a threshold voltage (Vth) (i.e., $Isd=k\times(Vsg-Vth)^2$), where k denotes a proportional coefficient determined by the structure and physical characteristics of the first transistor T1, Vsg denotes a source-gate voltage of the first transistor T1, and Vth denotes a threshold voltage of the first transistor T1.

The light emitting element LEL may receive the driving current Isd and emit light. The amount of light emitted from the light emitting element LEL or the luminance of the light emitting element LEL may be proportional to the magnitude of the driving current Isd.

In an embodiment, the light emitting element LEL may be an organic light emitting diode including a first electrode (e.g., an anode or a pixel electrode), a second electrode (e.g., a cathode or a common electrode), and an organic light emitting layer disposed between the first electrode and the second electrode. In another embodiment, for example, the light emitting element LEL may be an inorganic light emitting element including a first electrode, a second electrode, and an inorganic semiconductor disposed between the first electrode and the second electrode. In another embodiment, for example, the light emitting element LEL may be a quantum dot light emitting element including a first electrode, a second electrode, and a quantum dot light emitting layer disposed between the first electrode and the second electrode. In another embodiment, for example, the light emitting element LEL may be a micro light emitting diode.

The first electrode of the light emitting element ED may be electrically connected to a fourth node N4. The first electrode of the light emitting element ED may be connected to a drain electrode of the sixth transistor T6 and a source electrode of the seventh transistor T7 through the fourth node N4. The second electrode of the light emitting element LEL may be connected to the common voltage line VSL. The second electrode of the light emitting element LEL may receive a second driving voltage VS (e.g., a low potential voltage) from the common voltage line VSL.

The second transistor T2 may be turned on by a first gate signal GW of the first gate line GWL to electrically connect the data line DL and a first node N1, which is connected to the source electrode of the first transistor T1, to each other. The second transistor T2 turned on based on the first gate signal GW may supply a data voltage to the first node N1. The second transistor T2 may include a gate electrode electrically connected to the first gate line GWL, a source electrode electrically connected to the data line DL, and a drain electrode electrically connected to the first node N1.

The third transistor T3 may be turned on by a second gate signal GC of the second gate line GCL to electrically connect a second node N2, which is connected to the drain electrode of the first transistor T1, and a third node N3, which is connected to the gate electrode of the first transistor T1, to each other. The third transistor T3 may be connected between the third node N3 and the second node N2. In an embodiment, for example, the third transistor T3 may include a gate electrode electrically connected to the second gate line GCL, a source electrode electrically connected to the third node N3, and a drain electrode electrically connected to the second node N2. The third transistor T3 turned on by the second gate signal GC of the second gate line GCL may electrically connect the second node N2 which is the drain electrode of the first transistor T1 and the third node N3 which is the gate electrode of the first transistor T1.

The fourth transistor T4 may be turned on by a third gate signal GI of the third gate line GIL to electrically connect the third node N3, which is connected to the gate electrode of the first transistor T1, and the first initialization voltage line VIL1 to each other. The fourth transistor T4 may be connected in series between the third node N3 and the first initialization voltage line VIL1. In an embodiment, for example, the fourth transistor T4 may include a gate electrode electrically connected to the third gate line GIL, a source electrode electrically connected to the third node N3, and a drain electrode electrically connected to the first initialization voltage line VIL1.

The fifth transistor T5 may be turned on by an emission signal EM of the emission line EML to electrically connect the driving voltage line VDL and the first node N1, which is connected to the source electrode of the first transistor T1, to each other. The fifth transistor T5 may include a gate electrode electrically connected to the emission control line EML, a source electrode electrically connected to the driving voltage line VDL, and a drain electrode electrically connected to the first node N1.

The sixth transistor T6 may be turned on by the emission signal EM of the emission line EML to electrically connect the second node N2, which is connected to the drain electrode of the first transistor T1, and the fourth node N4, which is connected to the first electrode of the light emitting element LEL, to each other. The sixth transistor T6 may include a gate electrode electrically connected to the emission control line EML, a source electrode electrically connected to the second node N2, and the drain electrode electrically connected to the fourth node N4. When the fifth transistor T5, the first transistor T1, and the sixth transistor T6 are all turned on, the driving current Isd may be supplied to the light emitting element LEL.

The seventh transistor T7 may be turned on by a fourth gate signal GB of the fourth gate line GBL to electrically connect the fourth node N4, which is connected to the first electrode of the light emitting element LEL, and the second initialization voltage line VIL2 to each other. The seventh transistor T7 turned on based on the fourth gate signal GB may discharge the first electrode of the light emitting element LEL to a second initialization voltage VI2. The seventh transistor T7 may include a gate electrode electrically connected to the fourth gate line GBL, the source electrode electrically connected to the fourth node N4, and a drain electrode electrically connected to the second initialization voltage line VIL2. The second initialization voltage line VIL2 may transmit the second initialization voltage VI2.

Each of the first transistor T1, the second transistor T2, the fifth transistor T5, the sixth transistor T6, and the seventh transistor T7 may include a silicon-based active layer. In an embodiment, for example, each of the first transistor T1, the second transistor T2, the fifth transistor T5, the sixth transistor T6, and the seventh transistor T7 may be a p-type transistor including an active layer including or made of low temperature polycrystalline silicon (LTPS). The active layer including or made of low temperature polycrystalline silicon may have high electron mobility and excellent turn-on characteristics. Therefore, the display device 10 including transistors with high turn-on characteristics can stably and efficiently drive the pixels PX. Each of the first transistor T1, the second transistor T2, the fifth transistor T5, the sixth transistor T6, and the seventh transistor T7 may output a current, which flows into the source electrode, to the drain electrode based on a gate-low voltage applied to the gate electrode.

Each of the third transistor T3 and the fourth transistor T4 may be an n-type transistor including an oxide-based active layer. A transistor including an oxide-based active layer may have a coplanar structure in which a gate electrode is disposed at the top. The transistor including the oxide-based active layer may output a current, which flows into a drain electrode, to a source electrode based on a gate-high voltage applied to the gate electrode.

The capacitor Cst may be electrically connected between the third node N3, which is connected to the gate electrode of the first transistor T1, and the driving voltage line VDL. In an embodiment, for example, a first electrode of the capacitor Cst may be electrically connected to the third node N3, and a second electrode of the capacitor Cst may be electrically connected to the driving voltage line VDL, thereby maintaining a potential difference between the driving voltage line VDL and the gate electrode of the first transistor T1.

The pixels PX may include a plurality of pixels that provide (or emit) light of different colors. In an embodiment, for example, the pixels PX may include a first pixel PX1 that provides light of a first color, a second pixel PX2 that provides light of a second color, and a third pixel PX3 that provides light of a third color. In such an embodiment, the first pixel PX1 may include a first light emitting element LEL1 that provides light of the first color, the second pixel PX2 may include a second light emitting element LEL2 that provides light of the second color, and the third pixel PX3 may include a third light emitting element LEL3 that provides light of the third color. Here, the first color may be red (or a red color), the second color may be green (or a green color), and the third color may be blue (or a blue color). However, the disclosure is not limited thereto, and the first color, the second color and the third color may also have various colors of different wavelengths.

The first pixel PX1, the second pixel PX2, and the third pixel PX3 disposed adjacent to each other may form or collectively define a unit pixel.

According to an embodiment, at least two selected from the first pixel PX1, the second pixel PX2, and the third pixel PX3 may receive different emission signals, respectively. This will be described later in detail with reference to FIG. 6.

Figure 6:
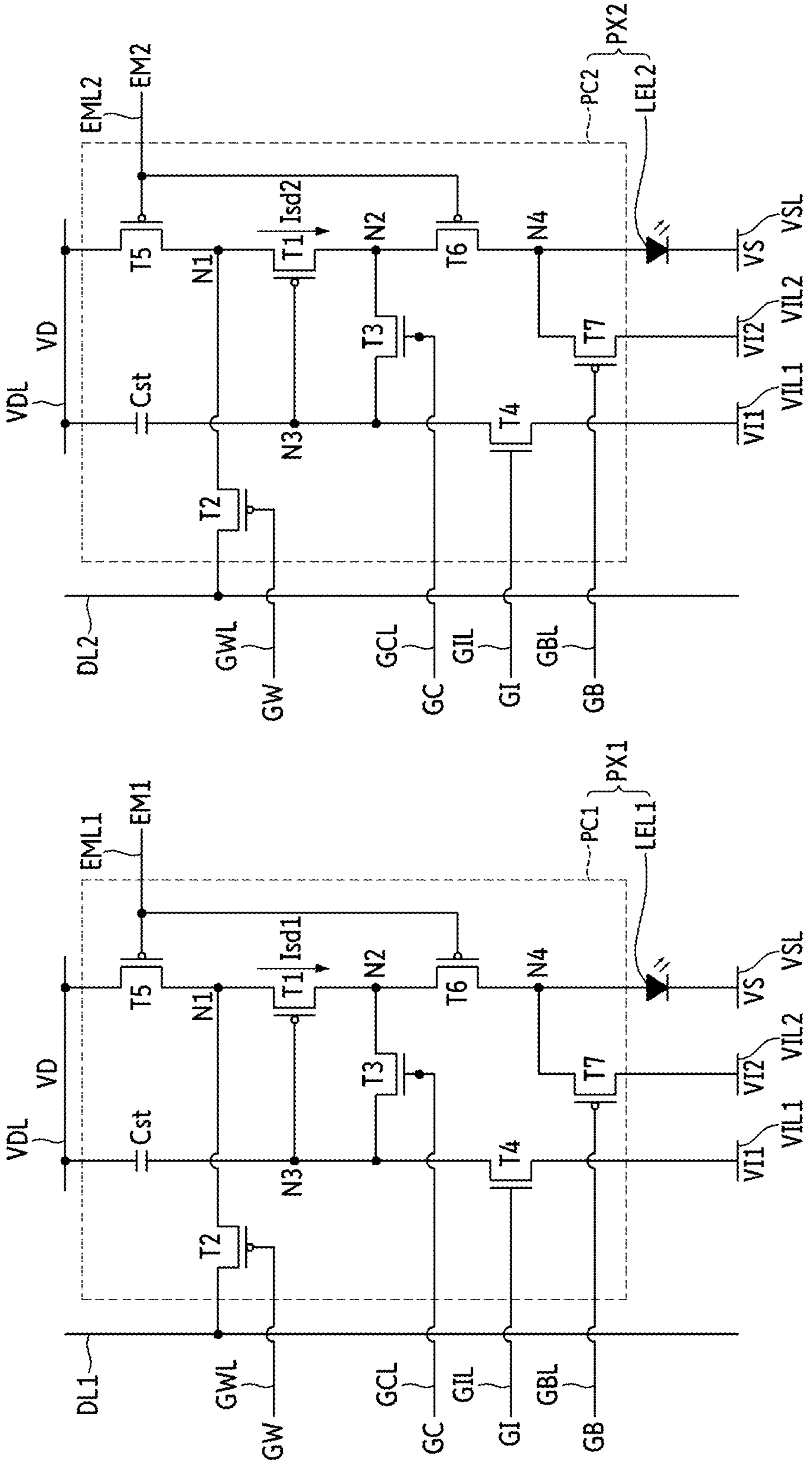
FIG. 6 is a circuit diagram of a first pixel and a second pixel of the display device according to an embodiment.
Figure 7:
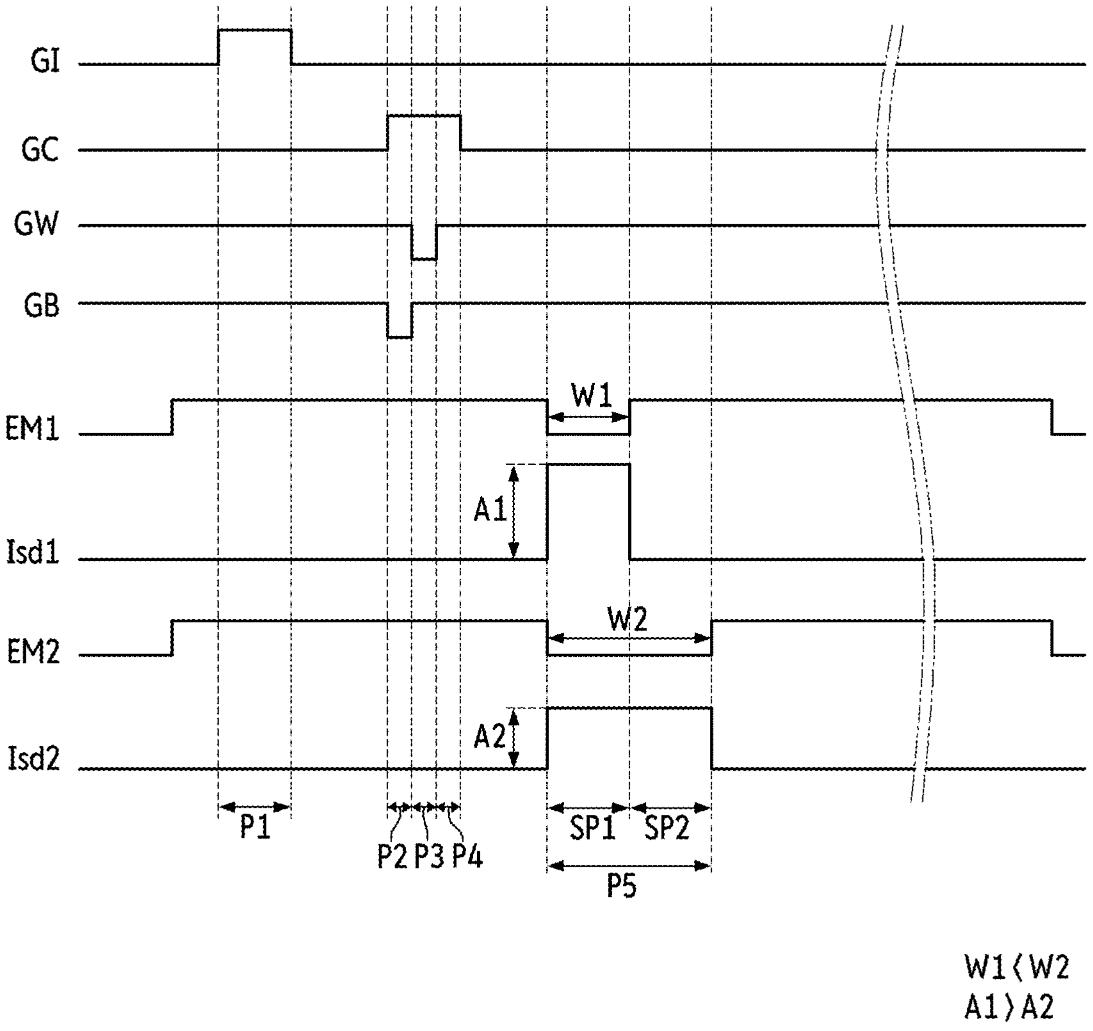
FIG. 7 is a signal timing diagram of gate signals, emission signals, and driving currents supplied to the first pixel and the second pixel of FIG. 6.

FIG. 6 is a circuit diagram of a first pixel PX1 and a second pixel PX2 of the display device 10 according to the embodiment. FIG. 7 is a signal timing diagram of gate signals, emission signals, and driving currents supplied to the first pixel PX1 and the second pixel PX2 of FIG. 6.

In an embodiment, the first pixel PX1 may include a first pixel circuit PC1 and a first light emitting element LEL1. The first light emitting element LEL1 may be connected to the first pixel circuit PC1. The first pixel circuit PC1 may include first through seventh transistors T1 through T7 and a capacitor Cst. The first through seventh transistors T1 through T7 and the capacitor Cst of the first pixel circuit PC1 may be identical to the first through seventh transistors T1 through T7 and the capacitor Cst of FIG. 5 described above, respectively. Here, the first light emitting element LEL1 may provide light of the first color.

In an embodiment, the second pixel PX2 may include a second pixel circuit PC2 and a second light emitting element LEL2. The second light emitting element LEL2 may be connected to the second pixel circuit PC2. The second pixel circuit PC2 may include first through seventh transistors T1 through T7 and a capacitor Cst. The first through seventh transistors T1 through T7 and the capacitor Cst of the second pixel circuit PC2 may be identical to the first through seventh transistors T1 through T7 and the capacitor Cst of FIG. 5 described above, respectively. Here, the second light emitting element LEL2 may provide light of the second color.

According to an embodiment, each of the fifth transistor T5 and the sixth transistor T6 of the first pixel PX1 may receive a first emission signal EM1. In an embodiment, for example, the first emission signal EM1 may be supplied to each of a gate electrode of the fifth transistor T5 provided in the first pixel PX1 and a gate electrode of the sixth transistor T6 provided in the first pixel PX1.

According to an embodiment, each of the fifth transistor T5 and the sixth transistor T6 of the second pixel PX2 may receive a second emission signal EM2. In an embodiment, for example, the second emission signal EM2 may be supplied to each of a gate electrode of the fifth transistor T5 provided in the second pixel PX2 and a gate electrode of the sixth transistor T6 provided in the second pixel PX2.

The first emission signal EM1 and the second emission signal EM2 may have different pulse widths. In an embodiment, for example, as illustrated in FIG. 7, a pulse width W1 of the first emission signal EM1 may be smaller than a pulse width W2 of the second emission signal EM2. This will be described later in greater detail based on the operation of the pixels PX1 and PX2.

In an embodiment, referring to FIG. 7, the display device 10 may operate based on a first period P1, a second period P2, a third period P3, a fourth period P4, and a fifth period P5 during one frame period.

A third gate signal GI, a second gate signal GC, a first gate signal GW, a fourth gate signal GB, the first emission signal EM1, and the second emission signal EM2 may have an active level or a non-active level in each of the periods P1 through P5. Here, the active level of each of the signals GI, GC, GW, GB, EM1 and EM2 described above may refer to a voltage level that can turn on a corresponding transistor to which the signal is transmitted. In other words, a signal at the active level may have a greater value than a threshold voltage of a corresponding transistor. In an embodiment, for example, where a corresponding transistor is an n-type transistor, the active level of a signal transmitted to a gate electrode of the corresponding transistor may refer to a high level (e.g., a positive level or a high voltage level).

The non-active level of each of the signals GI, GC, GW, GB, EM1 and EM2 may refer to a voltage level that can turn off a corresponding transistor. In other words, a signal at the non-active level may have a smaller value than a threshold voltage of a corresponding transistor. In an embodiment, for example, where a corresponding transistor is an n-type transistor, the non-active level of a signal transmitted to a gate electrode of the corresponding transistor may refer to a low level (e.g., a negative level or a low voltage level).

In another embodiment, for example, where a corresponding transistor is a p-type transistor, the active level of a signal transmitted to a gate electrode of the corresponding transistor may refer to a low level (e.g., a negative level or a low voltage level), and the non-active level of the signal transmitted to the gate electrode of the corresponding transistor may refer to a high level (e.g., a positive level or a high voltage level).

In an embodiment, for example, as illustrated in FIG. 7, in the first period P1, the third gate signal GI may have the active level. In the first period P1, the second gate signal GC, the first gate signal GW, the fourth gate signal GB, the first emission signal EM1, and the second emission signal EM2 may each have the non-active level.

In the second period P2, the second gate signal GC and the fourth gate signal GB may each have the active level. In the second period P2, the third gate signal GI, the first gate signal GW, the first emission signal EM1, and the second emission signal EM2 may each have the non-active level.

In the third period P3, the second gate signal GC and the first gate signal GW may each have the active level. In the third period P3, the third gate signal GI, the fourth gate signal GB, the first emission signal EM1, and the second emission signal EM2 may each have the non-active level. In addition, in the third period P3, a data voltage may be applied to each of a first data line DL1 and a second data line DL2.

In the fourth period P4, the second gate signal GC may have the active level. In the fourth period P4, the third gate signal GI, the first gate signal GW, the fourth gate signal GB, the first emission signal EM1, and the second emission signal EM2 may each have the non-active level.

In the fifth period P5, the first emission signal EM1 and the second emission signal EM2 may have the active level. In the fifth period P5, the third gate signal GI, the second gate signal GC, the first gate signal GW, and the fourth gate signal GB may each have the non-active level.

According to an embodiment, in the fifth period P5, the first emission signal EM1 and the second emission signal EM2 may have different pulse widths, respectively. In an embodiment, for example, the pulse width W1 of the first emission signal EM1 may be smaller than the pulse width W2 of the second emission signal EM2. In such an embodiment, a time duration (hereinafter, referred to as a holding time) during which the first emission signal EM1 is maintained at the active level in the fifth period P5 may be different from a time duration (hereinafter, referred to as a holding time) during which the second emission signal EM2 is maintained at the active level in the fifth period P5. In an embodiment, for example, the holding time of the first emission signal EM1 in the fifth period P5 may be shorter than the holding time of the second emission signal EM2 in the fifth period P5.

According to an embodiment, the fifth period P5 corresponding to an emission period of a pixel may be divided into a plurality of subperiods SP1 and SP2. In an embodiment, for example, the fifth period P5 may include consecutive first and second subperiods SP1 and SP2. The first emission signal EM1 may be maintained at the active level during the first subperiod SP1 of the fifth period P5, and the second emission signal EM2 may be maintained at the active level during the entire fifth period P5 (e.g., the first subperiod SP1 and the second subperiod SP2). In other words, the first emission signal EM1 may have a holding time corresponding to a length of the first subperiod SP1 of the fifth period P5, and the second emission signal EM2 may have a holding time corresponding to a total length of the fifth period P5 (e.g., the sum of the length of the first subperiod SP1 and a length of the second subperiod SP2).

According to an embodiment, based on one frame period, a duty ratio of the first emission signal EM1 may be in a range of about 0.1% to about 10%, and a duty ratio of the second emission signal EM2 may be in a range of about 0.1% to about 20%.

According to an embodiment, as the pulse width of an emission signal supplied to a pixel decreases, the magnitude of a data voltage supplied to the pixel may increase. In an embodiment, for example, since the pulse width W1 of the first emission signal EM1 supplied to the first pixel PX1 is smaller than the pulse width W2 of the second emission signal EM2, the magnitude of a first data voltage applied to the first pixel PX1 may be greater than the magnitude of a second data voltage applied to the second pixel PX2. In such an embodiment, since the pulse width W2 of the second emission signal EM2 supplied to the second pixel PX2 is greater than the pulse width W1 of the first emission signal EM1, the magnitude of the second data voltage applied to the second pixel PX2 may be greater than the magnitude of the first data voltage applied to the first pixel PX1. Specifically, when the first data voltage and the second data voltage have (or correspond to) a same gray level, an absolute value of a difference value between a reference voltage and the first data voltage may be greater than an absolute value of a difference value between the reference voltage and the second data voltage. In other words, when the first data voltage and the second data voltage are data voltages having the same gray level, an absolute value of the first data voltage may be greater than an absolute value of the second data voltage based on the reference voltage. Therefore, even if the first data voltage and the second data voltage have the same gray level, the first data voltage supplied to the first pixel PX1 may be greater than the second data voltage supplied to the second pixel PX2. Here, the reference voltage may be, for example, a voltage corresponding to a black gray level.

In an embodiment, as described above, the magnitude of the first data voltage increases in inverse proportion as the pulse width W1 of the first emission signal EM1 decreases. Therefore, as illustrated in FIG. 7, a first driving current Isd1 provided from the first transistor T1 of the first pixel PX1 in the first subperiod SP1 of the fifth period P5 may be larger (or greater) than a second driving current Isd2 provided from the first transistor T1 of the second pixel PX2. In an embodiment, for example, amplitude A1 (or pulse size) of the first driving current Isd1 may be larger than amplitude A2 (or pulse size) of the second driving current Isd2.

In an embodiment, since the pulse width W1 of the first emission signal EM1 is smaller (or less) than the pulse width W2 of the second emission signal EM2, the first driving current Isd1 may be smaller than the second driving current Isd2 in the second subperiod SP2 of the fifth period P5. In an embodiment, for example, the amplitude A1 (or pulse size) of the first driving current Isd1 may be smaller than the amplitude A2 (or pulse size) of the second driving current Isd2 in the second subperiod SP2 of the fifth period P5.

Therefore, the first driving current Isd1 provided from the first transistor T1 of the first pixel PX1 during the fifth period P5 may be larger than the second driving current Isd2 provided from the first transistor T1 of the second pixel PX2 during the fifth period P5.

In an embodiment, for example, the first pixel PX1 may be a red pixel including a red light emitting element that provides red light, and the second pixel PX2 may be a green pixel including a green light emitting element that provides green light. Due to the characteristics of the elements, the red light emitting element may be desired to receive a much larger amount of current to reach an optimal current density section (or an optimal current efficiency section) than the green light emitting element. When a light emitting element emits light in the optimal density section, it can provide light having a higher luminance even with a smaller current.

Since there is a large difference in the amount of current to reach the optimal current density section between the red pixel and the green pixel as described above, if a driving current of the same magnitude is supplied to the red pixel and the green pixel, a difference in luminance between the red pixel and the green pixel may increase, thus deteriorating image quality. Therefore, according to an embodiment, the first emission signal EM1 and the second emission signal EM2 may have different pulse widths as described above such that the first driving current Isd1 supplied to the red pixel is allowed to be larger than the second driving current Isd2 supplied to the green pixel at the same gray level. In an embodiment, for example, the pulse width W1 of the first emission signal EM1 transmitted to the red pixel may be smaller than the pulse width W2 of the second emission signal EM2 transmitted to the green pixel. Accordingly, the first driving current Isd1 supplied to the first light emitting element LEL1 may be larger than the second driving current Isd2 supplied to the second light emitting element LEL2. In an embodiment, for example, a peak value of the first driving current Isd1 may be greater than a peak value of the second driving current Isd2. Therefore, the red light emitting element that receives the relatively larger first driving current Isd1 and the green light emitting element that receives the relatively smaller second driving current Isd2 may reach their respective optimal current density sections. According to an embodiment, the first pixel PX1 (e.g., a red pixel) may emit red light with optimal efficiency in the optimal current density section of the red light emitting element, and the second pixel PX2 (e.g., a green pixel) may emit green light with optimal efficiency in the optimal current density section of the green light emitting element. Therefore, light efficiency relative to current (e.g., driving current) supplied to the first pixel PX1 and the second pixel PX2 may increase. In addition, according to an embodiment, a luminance deviation of the red light and the green light in their respective optimal density sections may be minimized. Therefore, according to an embodiment, the power consumption of the display device 10 can be reduced, and the image quality of the display device 10 can be improved.

The operation of the first pixel PX1 of the display device 10 will be described below based on FIGS. 6 and 7.

First, the operation of the first pixel PX1 of the display device 10 in the first period P1 will be described as follows.

As illustrated in FIG. 7, in the first period P1, the third gate signal GI may have an active level. In the first period P1, the second gate signal GC, the first gate signal GW, the fourth gate signal GB, and the first emission signal EM1 may each have a non-active level.

The third gate signal GI at the active level may be transmitted to a gate electrode of the fourth transistor T4 through a third gate line GIL. Accordingly, the fourth transistor T4 may be turned on.

The second gate signal GC at the non-active level may be transmitted to a gate electrode of the third transistor T3 through a second gate line GCL. Accordingly, the third transistor T3 may be turned off.

The first gate signal GW at the non-active level may be transmitted to a gate electrode of the second transistor T2 through a first gate line GWL. Accordingly, the second transistor T2 may be turned off.

The fourth gate signal GB at the non-active level may be transmitted to a gate electrode of the seventh transistor T7 through a fourth gate line GBL. Accordingly, the seventh transistor T7 may be turned off.

The first emission signal EM1 at the non-active level may be transmitted to each of the gate electrode of the fifth transistor T5 and the gate electrode of the sixth transistor T6 through a first emission line EML1. Accordingly, the fifth transistor T5 and the sixth transistor T6 may be turned off.

In the first period P1, as the fourth transistor T4 is turned on as described above, a first initialization voltage VI1 from a first initialization voltage line VIL1 may be applied to a third node N3 through the turned-on fourth transistor T4. Therefore, in the first period P1, a voltage of a gate electrode of the first transistor T1 may be initialized to the first initialization voltage VI1. At this time, as the first initialization voltage VI1 is applied to the gate electrode of the first transistor T1, the first transistor T1 may be turned on.

Next, the operation of the first pixel PX1 of the display device 10 in the second period P2 will be described as follows.

As illustrated in FIG. 7, in the second period P2, the second gate signal GC and the fourth gate signal GB may each have an active level. In the second period P2, the third gate signal GI, the first gate signal GW, and the first emission signal EM1 may each have a non-active level.

The second gate signal GC at the active level may be transmitted to the gate electrode of the third transistor T3 through the second gate line GCL. Accordingly, the third transistor T3 may be turned on.

The fourth gate signal GB at the active level may be transmitted to the gate electrode of the seventh transistor T7 through the fourth gate line GBL. Accordingly, the seventh transistor T7 may be turned on.

The third gate signal GI at the non-active level may be transmitted to the gate electrode of the fourth transistor T4 through the third gate line GIL. Accordingly, the fourth transistor T4 may be turned off.

The first gate signal GW at the non-active level may be transmitted to the gate electrode of the second transistor T2 through the first gate line GWL. Accordingly, the second transistor T2 may be turned off.

The first emission signal EM1 at the non-active level may be transmitted to the gate electrode of the fifth transistor T5 and the gate electrode of the sixth transistor T6 through the first emission line EML1. Accordingly, the fifth transistor T5 and the sixth transistor T6 may be turned off.

In the second period P2, as the third transistor T3 is turned on as described above, the third node N3 and a second node N2 may be connected to each other through the turned-on third transistor T3. Accordingly, a voltage of the third node N3 (e.g., the first initialization voltage VI1) may be applied to the second node N2. Accordingly, a voltage of a drain electrode of the first transistor T1 may be initialized. In addition, a voltage of a first node N1 may be initialized through the first transistor T1 which is turned on in the first period P1 and kept turned on in the second period P2. For example, in the second period P2, the voltage of the second node N2 may be applied to the first node N1 through the turned-on first transistor T1. Therefore, in the second period P2, a source electrode and the drain electrode of the first transistor T1 may each be initialized to the initialization voltage.

In the second period P2, as the seventh transistor T7 is turned on as described above, a second initialization voltage VI2 from a second initialization voltage line VIL2 may be applied to a fourth node N4 through the turned-on seventh transistor T7. Therefore, in the second period P2, a voltage of a first electrode of the first light emitting element LEL1 may be initialized to the second initialization voltage VI2.

Next, the operation of the first pixel PX1 of the display device 10 in the third period P3 will be described as follows.

As illustrated in FIG. 7, in the third period P3, the second gate signal GC and the first gate signal GW may each have an active level. In the third period P3, the third gate signal GI, the fourth gate signal GB, and the first emission signal EM1 may each have a non-active level. In addition, in the third period P3, a data voltage (e.g., the first data voltage) may be applied to the first data line DL1.

The second gate signal GC at the active level may be transmitted to the gate electrode of the third transistor T3 through the second gate line GCL. Accordingly, the third transistor T3 may be turned on.

The first gate signal GW at the active level may be transmitted to the gate electrode of the second transistor T2 through the first gate line GWL. Accordingly, the second transistor T2 may be turned on.

The third gate signal GI at the non-active level may be transmitted to the gate electrode of the fourth transistor T4 through the third gate line GIL. Accordingly, the fourth transistor T4 may be turned off.

The fourth gate signal GB at the non-active level may be transmitted to the gate electrode of the seventh transistor T7 through the fourth gate line GBL. Accordingly, the seventh transistor T7 may be turned off.

The first emission signal EM1 at the non-active level may be transmitted to each of the gate electrode of the fifth transistor T5 and the gate electrode of the sixth transistor T6 through the first emission line EML1. Accordingly, the fifth transistor T5 and the sixth transistor T6 may be turned off.

In the third period P3, as the third transistor T3 is turned on as described above, the gate electrode (e.g., the third node N3) and the drain electrode (e.g., the second node N2) of the first transistor T1 may be electrically connected to each other. In other words, the first transistor T1 may be connected to the first pixel circuit PC1 in a diode form.

In the third period P3, as the second transistor T2 is turned on as described above, the first data voltage from the first data line DL1 may be applied to the source electrode (e.g., the first node N1) of the first transistor T1 through the turned-on second transistor T2. A voltage of the source electrode of the first transistor T1 may be maintained at the first data voltage in this way, but the voltage of the gate electrode (e.g., the third node N3) of the first transistor T1 may gradually increase. For example, a voltage difference (hereinafter, referred to as a gate-source voltage) between the gate electrode (e.g., the third node N3) of the first transistor T1 and the source electrode (e.g., the first node N1) of the first transistor T1 may have a greater value than a threshold voltage of the first transistor T1 due to the first data voltage applied to the first node N1. Accordingly, the first transistor T1 may be turned on. Then, as a current generated by the first data voltage is supplied to the second node N2 and the third node N3 through the turned-on first transistor T1 and the turned-on third transistor T3, the voltage of the gate electrode of the first transistor T1 may gradually increase. As the voltage of the gate electrode of the first transistor T1 gradually increases, the gate-source voltage of the first transistor T1 may gradually decrease. When the decreasing gate-source voltage of the first transistor T1 reaches the threshold voltage of the first transistor T1, the first transistor T1 may be turned off. Therefore, the threshold voltage of the first transistor T1 may be detected at the time when the first transistor T1 is turned off, and the detected threshold voltage may be reflected in the third node N3. For example, the voltage of the third node N3 at the time when the first transistor T1 is turned off may be a voltage obtained by subtracting the threshold voltage of the first transistor T1 from the first data voltage. The voltage of the third node N3 (e.g., the first data voltage—the threshold voltage of the first transistor T1) may be stored by the capacitor Cst and maintained for a certain period of time. Therefore, in the fourth period P4, the first data voltage may be applied, and the threshold voltage of the first transistor T1 may be detected and maintained. Thus, in the fourth period P4, the voltage of the third node N3 may include the threshold voltage of the first transistor T1.

Next, the operation of the first pixel PX1 of the display device 10 in the fourth period P4 will be described as follows.

As illustrated in FIG. 7, in the fourth period P4, the second gate signal GC may have an active level. In the fourth period P4, the third gate signal GI, the first gate signal GW, the fourth gate signal GB, and the first emission signal EM1 may each have a non-active level.

The second gate signal GC at the active level may be transmitted to the gate electrode of the third transistor T3 through the second gate line GCL. Accordingly, the third transistor T3 may be turned on.

The third gate signal GI at the non-active level may be transmitted to the gate electrode of the fourth transistor T4 through the third gate line GIL. Accordingly, the fourth transistor T4 may be turned off.

The first gate signal GW at the non-active level may be transmitted to the gate electrode of the second transistor T2 through the first gate line GWL. Accordingly, the second transistor T2 may be turned off.

The fourth gate signal GB at the non-active level may be transmitted to the gate electrode of the seventh transistor T7 through the fourth gate line GBL. Accordingly, the seventh transistor T7 may be turned off.

The first emission signal EM1 at the non-active level may be transmitted to each of the gate electrode of the fifth transistor T5 and the gate electrode of the sixth transistor T6 through the first emission line EML1. Accordingly, the fifth transistor T5 and the sixth transistor T6 may be turned off.

In the fourth period P4, as the third transistor T3 is turned on as described above, the gate electrode (e.g., the third node N3) and the drain electrode (e.g., the second node N2) of the first transistor T1 may be electrically connected to each other. In other words, the first transistor T1 may be connected to the first pixel circuit PC1 in a diode form.

The fourth period P4 may be a period for additionally detecting the threshold voltage of the first transistor T1. For example, when an active period of the first gate signal GW (e.g., a period during which the first gate signal GW is maintained at an active level) is not long enough for the threshold voltage of the first transistor T1 to be detected in the third period P3, the first transistor T1 may not be turned off but may remain turned on in the third period P3. In this case, the threshold voltage of the first transistor T1 may not be detected in the third period P3. Therefore, the third transistor T3 may be turned on once more in the fourth period P4, such that the first transistor T1 is connected to the first pixel circuit PC1 in a diode form. Then, the voltage of the third node N3 may increase sufficiently through the turned-on first transistor T1. Accordingly, the first transistor T1 may be turned off in the fourth period P4, and thus the threshold voltage of the first transistor T1 may be detected.

Next, the operation of the first pixel PX1 of the display device 10 in the fifth period P5 will be described as follows.

As illustrated in FIG. 7, in the fifth period P5, the first emission signal EM1 may have an active level. In the fifth period P5, the third gate signal GI, the second gate signal GC, the first gate signal GW, and the fourth gate signal GB may each have a non-active level.

The first emission signal EM1 at the active level may be transmitted to each of the gate electrode of the fifth transistor T5 and the gate electrode of the sixth transistor T6 through the first emission line EML1. Accordingly, the fifth transistor T5 and the sixth transistor T6 may be turned on.

The third gate signal GI at the non-active level may be transmitted to the gate electrode of the fourth transistor T4 through the third gate line GIL. Accordingly, the fourth transistor T4 may be turned off.

The second gate signal GC at the non-active level may be transmitted to the gate electrode of the third transistor T3 through the second gate line GCL. Accordingly, the third transistor T3 may be turned off.

The first gate signal GW at the non-active level may be transmitted to the gate electrode of the second transistor T2 through the first gate line GWL. Accordingly, the second transistor T2 may be turned off.

The fourth gate signal GB at the non-active level may be transmitted to the gate electrode of the seventh transistor T7 through the fourth gate line GBL. Accordingly, the seventh transistor T7 may be turned off.

In the fifth period P5, the first transistor T1 may be kept turned on by the gate-source voltage maintained by the capacitor Cst.

In the first subperiod SP1 of the fifth period P5, as the first transistor T1, the fifth transistor T5, and the sixth transistor T6 are turned on, the first driving current Isd1 may be supplied to the first light emitting element LEL1 through the turned-on first transistor T1, fifth transistor T5 and sixth transistor T6. Therefore, the first light emitting element LEL1 may emit light corresponding to the first driving current Isd1. Here, the gate-source voltage maintained by the capacitor Cst includes the threshold voltage of the first transistor T1. Thus, the magnitude of the first driving current Isd1 flowing to the first light emitting element LEL1 through the turned-on first transistor T1 may be determined based on the first data voltage and the threshold voltage of the first transistor T1. Therefore, the first driving current Isd1 supplied to the first light emitting element LEL1 may accurately reflect the magnitude of the first data voltage. In this way, since the driving current of each pixel is determined by compensating for different threshold voltages of the first transistors T1 of the pixels, a difference in luminance between the pixels due to a difference in threshold voltage between the first transistors T1 of the pixels can be minimized.

Therefore, the image quality of the display device 10 can be improved.

The operation of the second pixel PX2 is substantially the same as the operation of the first pixel PX1 described above. However, in the second pixel PX2, since the second emission signal EM2 has an active level during the entire fifth period P5 (e.g., the first subperiod SP1 and the second subperiod SP2), the first transistor T1, the fifth transistor T5, and the sixth transistor T6 of the second pixel PX2 may be turned on during the entire fifth period P5 (e.g., the first subperiod SP1 and the second subperiod SP2). The second driving current Isd2 flowing through the first transistor T1 of the second pixel PX2 during the fifth period P5 may be smaller than the first driving current Isd1. For example, the peak value of the second driving current Isd2 in the first subperiod SP1 may be smaller than the peak value of the first driving current Isd1.

According to an embodiment, each of the first emission signal EM1 and the second emission signal EM2 may be provided from the emission driver 620. Here, the emission driver 620 may include a plurality of emission drivers. In an embodiment, for example, the emission driver 620 may include a first emission driver which provides the first emission signal EM1 and a second emission driver which provides the second emission signal EM2. The first emission signal EM1 from the first emission driver may be supplied to the first emission line EML1, and the second emission signal EM2 from the second emission driver may be supplied to the second emission line EML2.

Figure 8:
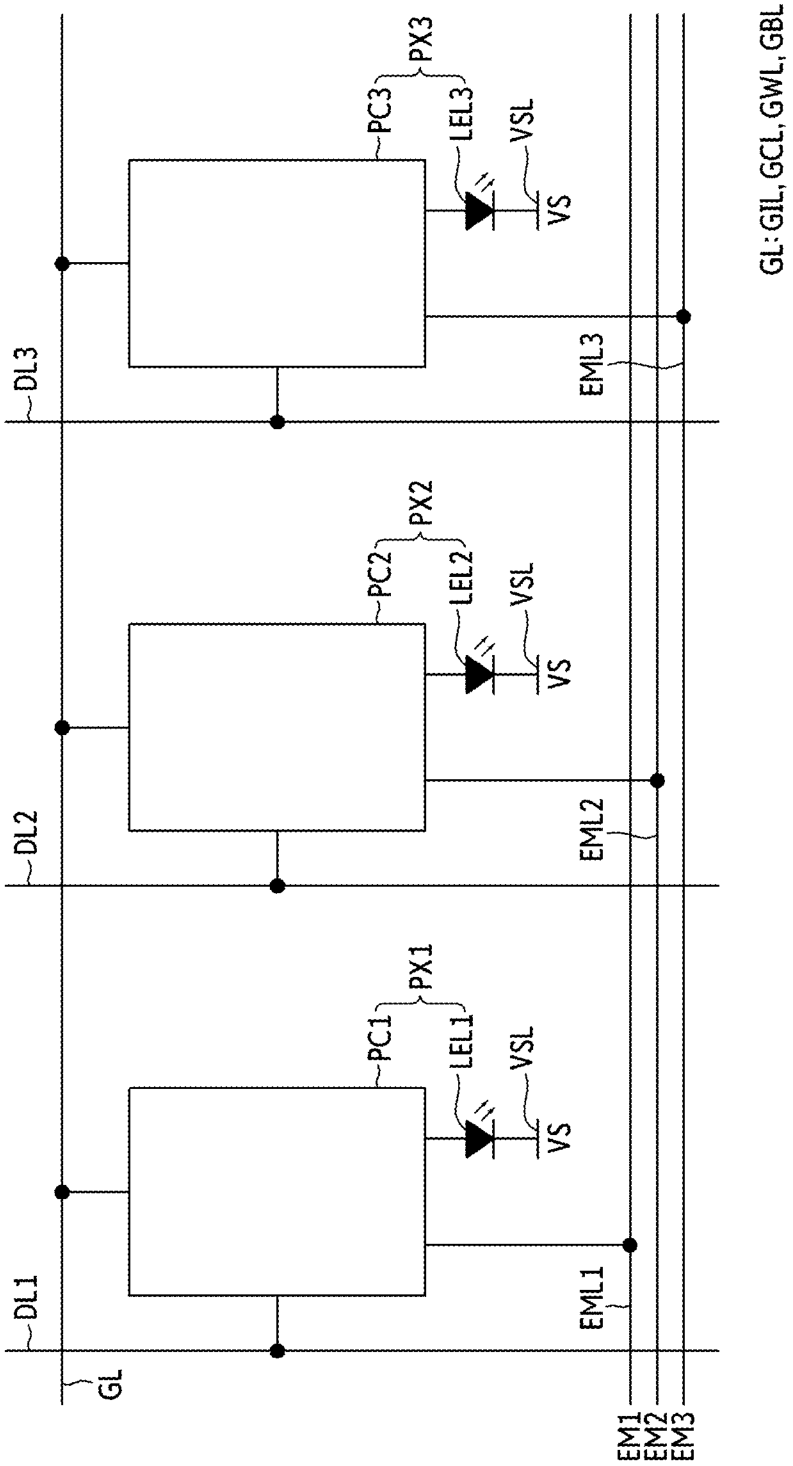
FIG. 8 is a circuit diagram of a first pixel, a second pixel, and a third pixel of the display device according to an embodiment.
Figure 9:
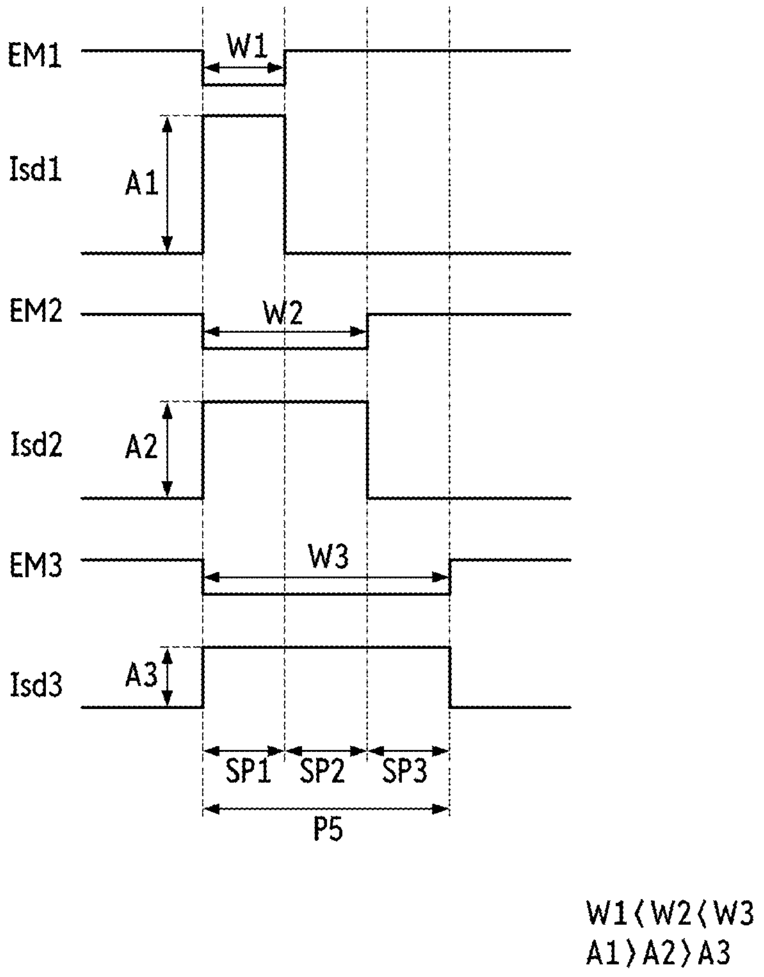
FIG. 9 is a signal timing diagram of a first emission signal, a second emission signal and a third emission signal and a first driving current, a second driving current and a third driving current supplied to the first pixel, the second pixel and the third pixel of FIG. 8, respectively.

FIG. 8 is a circuit diagram of a first pixel PX1, a second pixel PX2, and a third pixel PX3 of the display device 10 according to an embodiment. FIG. 9 is a signal timing diagram of a first emission signal EM1, a second emission signal EM2 and a third emission signal EM3 and a first driving current Isd1, a second driving current Isd2 and a third driving current Isd3 supplied to the first pixel PX1, the second pixel PX2 and the third pixel PX3 of FIG. 8, respectively.

In an embodiment, as illustrated in FIG. 8, the display device 10 may include the first pixel PX1, the second pixel PX2, and the third pixel PX3 that provide light of different colors, respectively.

The first pixel PX1 may be connected to a gate line GL, a first emission line EML1, and a first data line DL1. The first pixel PX1 may include a first pixel circuit PC1 and a first light emitting element LEL1 connected to the first pixel circuit PC1. The first pixel circuit PC1 may be connected to the gate line GL, the first emission line EML1 and the first data line DL1, and the first light emitting element LEL1 may be connected between the first pixel circuit PC1 and a common voltage line VSL. The first pixel PX1 may receive a first gate signal GW, a second gate signal GC, a third gate signal GI and a fourth gate signal GB through a first gate line GWL, a second gate line GCL, a third gate line GIL and a fourth gate line GBL included in the gate line GL, respectively, and may receive the first emission signal EM1 through the first emission line EML1.

The second pixel PX2 may be connected to the gate line GL, a second emission line EML2, and a second data line DL2. The second pixel PX2 may include a second pixel circuit PC2 and a second light emitting element LEL2 connected to the second pixel circuit PC2. The second pixel circuit PC2 may be connected to the gate line GL, the second emission line EML2 and the second data line DL2, and the second light emitting element LEL2 may be connected between the second pixel circuit PC2 and the common voltage line VSL. The second pixel PX2 may receive the first gate signal GW, the second gate signal GC, the third gate signal GI and the fourth gate signal GB through the first gate line GWL, the second gate line GCL, the third gate line GIL and the fourth gate line GBL included in the gate line GL, respectively, and may receive the second emission signal EM2 through the second emission line EML2.

The third pixel PX3 may be connected to the gate line GL, a third emission line EML3, and a third data line DL3. The third pixel PX3 may include a third pixel circuit PC3 and a third light emitting element LEL3 connected to the third pixel circuit PC3. The third pixel circuit PC3 may be connected to the gate line GL, the third emission line EML3 and the third data line DL3, and the third light emitting element LEL3 may be connected between the third pixel circuit PC3 and the common voltage line VSL. The third pixel PX3 may receive the first gate signal GW, the second gate signal GC, the third gate signal GI and the fourth gate signal GB through the first gate line GWL, the second gate line GCL, the third gate line GIL and the fourth gate line GBL included in the gate line GL, respectively, and may receive the third emission signal EM3 through the third emission line EML3.

In an embodiment shown in FIG. 8, the first pixel PX1 may be a red pixel that provides red light, the second pixel PX2 may be a blue pixel that provides blue light, and the third pixel PX3 may be a green pixel that provides green light. In such an embodiment, the first light emitting element LEL1 of the first pixel PX1 may provide red light, the second light emitting element LEL2 of the second pixel PX2 may provide blue light, and the third light emitting element LEL3 of the third pixel PX3 may provide green light.

In an embodiment shown in FIG. 8, the gate line GL may include, for example, the first gate line GWL, the second gate line GCL, the third gate line GIL, and the fourth gate line GBL.

Due to the characteristics of elements, a red light emitting element may be desired to receive a much larger amount of current to reach an optimal current density section (or an optimal current efficiency section) than a blue light emitting element, and the blue light emitting element may be desired to receive a much larger amount of current to reach the optimal current density section than a green light emitting element. Therefore, according to an embodiment, the first emission signal EM1, the second emission signal EM2, and the third emission signal EM3 may have different pulse widths, respectively, such that the first driving current Isd1 supplied to a red pixel is larger than the second driving current Isd2 supplied to a blue pixel at the same gray level and that the second driving current Isd2 supplied to the blue pixel is larger than the third driving current Isd3 supplied to a green pixel at the same gray level. In an embodiment, for example, as illustrated in FIG. 9, a pulse width W1 of the first emission signal EM1 transmitted to the red pixel may be smaller than a pulse width W2 of the second emission signal EM2 transmitted to the blue pixel, and the pulse width W2 of the second emission signal EM2 transmitted to the blue pixel may be smaller than a pulse width W3 of the third emission signal EM3 transmitted to the green pixel. Accordingly, the first driving current Isd1 supplied to the first light emitting element LEL1 may be larger than the second driving current Isd2 supplied to the second light emitting element LEL2, and the second driving current Isd2 supplied to the second light emitting element LEL2 may be larger than the third driving current Isd3 supplied to the third light emitting element LEL3. In an embodiment, for example, a peak value of the first driving current Isd1 may be greater than a peak value of the second driving current Isd2, and the peak value of the second driving current Isd2 may be greater than a peak value of the third driving current Isd3. Specifically, in a first subperiod SP1, amplitude A1 of the first driving current Isd1 may be larger than amplitude A2 of the second driving current Isd2, and the amplitude A2 of the second driving current Isd2 may be larger than amplitude A3 of the third driving current Isd3. Therefore, according to an embodiment, the first pixel PX1 (e.g., a red pixel) may emit red light with optimal efficiency in the optimal current density section of the red light emitting element, the second pixel PX2 (e.g., a blue pixel) may emit blue light with optimal efficiency in the optimal current density section of the blue light emitting element, and the third pixel PX3 (e.g., a green pixel) may emit green light with optimal efficiency in the optimal current density section of the green light emitting element. Therefore, light efficiency relative to current (e.g., driving current) supplied to the first pixel PX1, the second pixel PX2 and the third pixel PX3 may increase. In addition, according to an embodiment, a luminance deviation of the red light, the blue light and the green light in their respective optimal density sections may be minimized. Therefore, according to an embodiment, the power consumption of the display device 10 can be reduced, and the image quality of the display device 10 can be improved.

In an embodiment, as illustrated in FIG. 9, an emission period P5 may include three consecutive subperiods SP1 through SP3. The first emission signal EM1 supplied to the first pixel PX1 may have an active level during a first subperiod SP1 and may have a non-active level during a second subperiod SP2 and a third subperiod SP3. The second emission signal EM2 supplied to the second pixel PX2 may have an active level during the first subperiod SP1 and the second subperiod SP2 and may have a non-active level during the third subperiod SP3. The third emission signal EM3 supplied to the third pixel PX3 may have an active level during the entire emission period P5. In an embodiment, for example, the third emission signal EM3 may have an active level during the first subperiod SP1, the second subperiod SP2, and the third subperiod SP3.

According to an embodiment, each of the first emission signal EM1, the second emission signal EM2, and the third emission signal EM3 may be provided from the emission driver 620. Here, the emission driver 620 may include a plurality of emission drivers. In an embodiment, for example, the emission driver 620 may include a first emission driver which provides the first emission signal EM1, a second emission driver which provides the second emission signal EM2, and a third emission driver which provides the third emission signal EM3. The first emission signal EM1 from the first emission driver may be supplied to the first emission line EML1, the second emission signal EM2 from the second emission driver may be supplied to the second emission line EML2, and the third emission signal EM3 from the third emission driver may be supplied to the third emission line EML3.

In an embodiment, as shown in FIG. 8, a first data voltage applied to the first pixel PX1 through the first data line DL1, a second data voltage applied to the second pixel PX2 through the second data line DL2, and a third data voltage applied to the third pixel PX3 through the third data line DL3 may have different magnitudes, respectively. For example, when the first data voltage, the second data voltage, and the third data voltage are data voltages of the same gray level, the second data voltage applied to the second pixel PX2 may be smaller than the first data voltage applied to the first pixel PX1 and greater than the third data voltage applied to the third pixel PX3. For example, when the first data voltage, the second data voltage, and the third data voltage are data voltages of the same gray level, an absolute value of a difference value between a reference voltage and the second data voltage may be smaller than an absolute value of a difference value between the reference voltage and the first data voltage and greater than an absolute value of a difference between the reference voltage and the third data voltage.

According to an embodiment, the first pixel circuit PC1 of the first pixel PX1, the second pixel circuit PC2 of the second pixel PX2, and the third pixel circuit PC3 of the third pixel PX3 in FIG. 8 may each include the transistors T1 through T7 and the capacitor Cst of the pixel circuit illustrated in FIG. 5 described above. In an embodiment, for example, the first pixel circuit PC1, the second pixel circuit PC2, and the third pixel circuit PC3 may each include first through seventh transistors T1 through T7 and a capacitor Cst.

Figure 10:
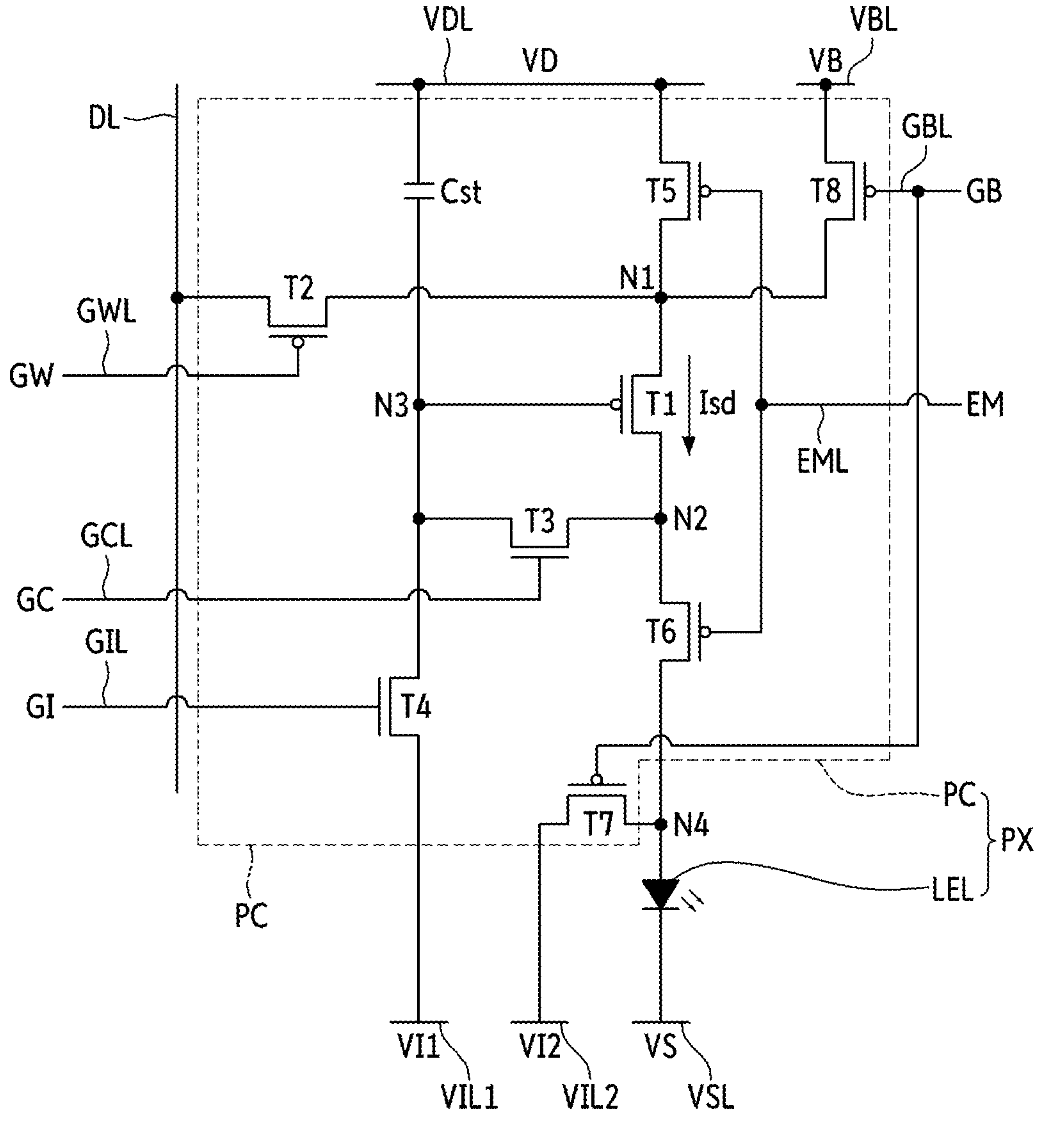
FIG. 10 is a circuit diagram of a pixel of a display device according to an embodiment.

FIG. 10 is a circuit diagram of a pixel of a display device 10 according to an embodiment.

The pixel of FIG. 10 is substantially the same as the pixel of FIG. 5 described above except that the pixel further includes an eighth transistor T8. This difference will be mainly described, and any repetitive detailed description of the same or like elements as those described above will be omitted or simplified.

The eighth transistor T8 may be turned on by a fourth gate signal GB of a fourth gate line GBL to electrically connect a bias voltage line VBL and a first node N1 which is a source electrode of a first transistor T1. The eighth transistor T8 turned on based on the fourth gate signal GB may supply a bias voltage VB to the first node N1. The eighth transistor T8 may improve the hysteresis of the first transistor T1 by supplying the bias voltage VB to the source electrode of the first transistor T1. The eighth transistor T8 may have a gate electrode electrically connected to the fourth gate line GBL, a source electrode electrically connected to the bias voltage line VBL, and a drain electrode electrically connected to the first node N1.

The eighth transistor T8 may be a p-type transistor including an active layer made of low temperature polycrystalline silicon (LTPS).

Each of the pixels of FIGS. 6 and 8 described above may further include the eighth transistor T8 as in FIG. 10.

An array for the pixel of FIG. 10 (hereinafter, referred to as a pixel array) will be described as follows.

Figure 11:
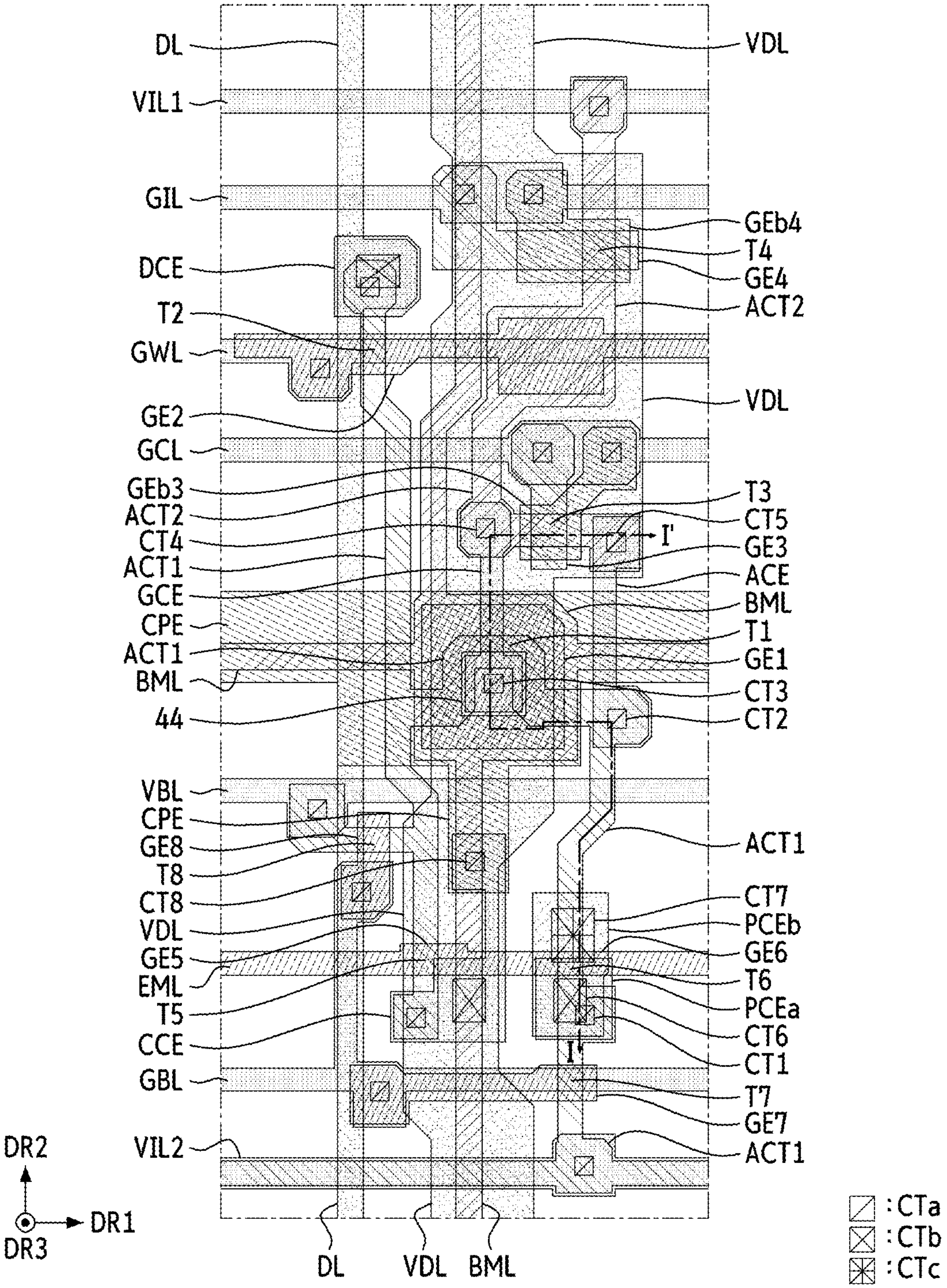
FIG. 11 is a plan view of a pixel array according to an embodiment.
Figure 12:
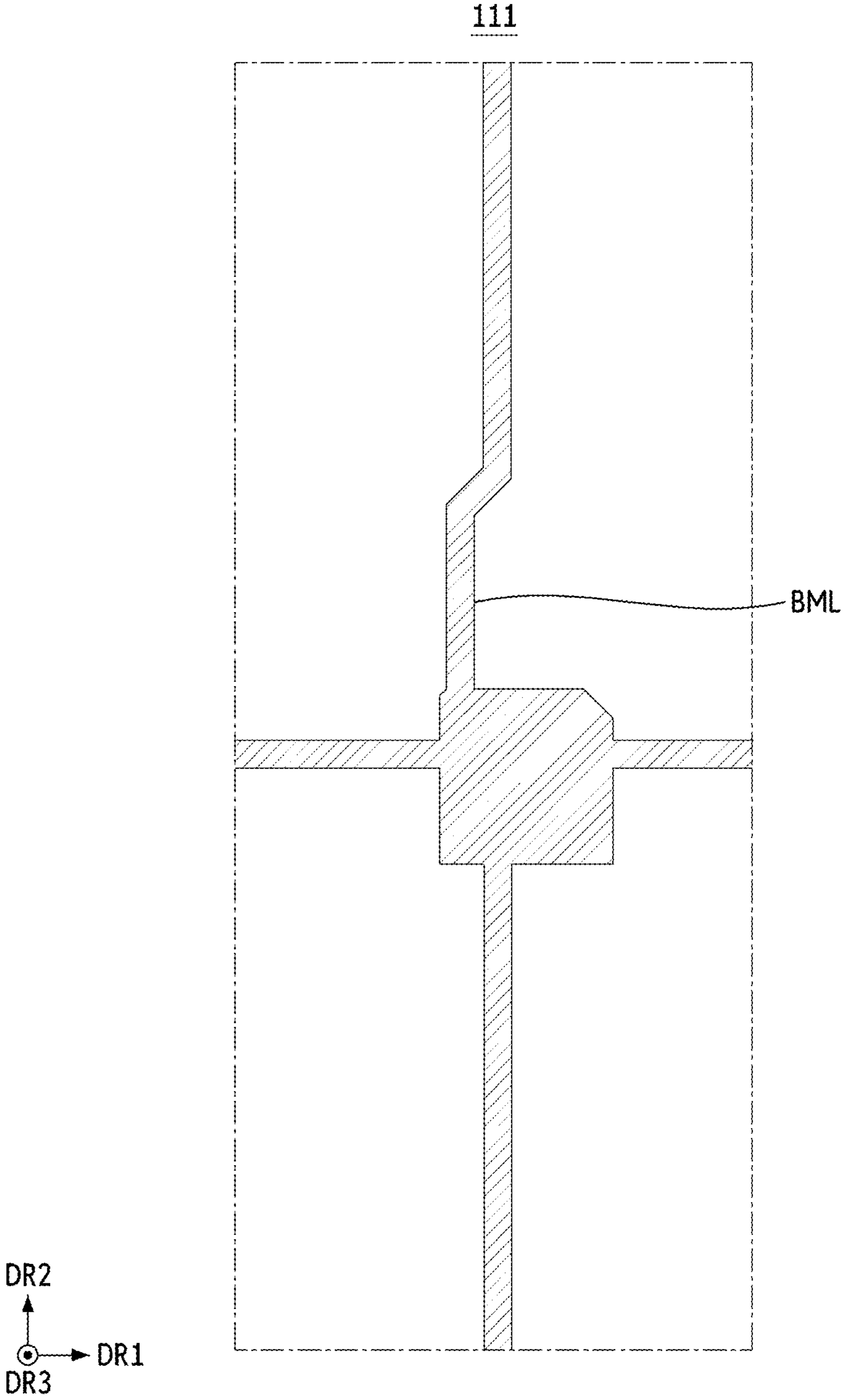
FIG. 12 is a plan view of only a first pattern layer among components of FIG. 11.
Figure 13:
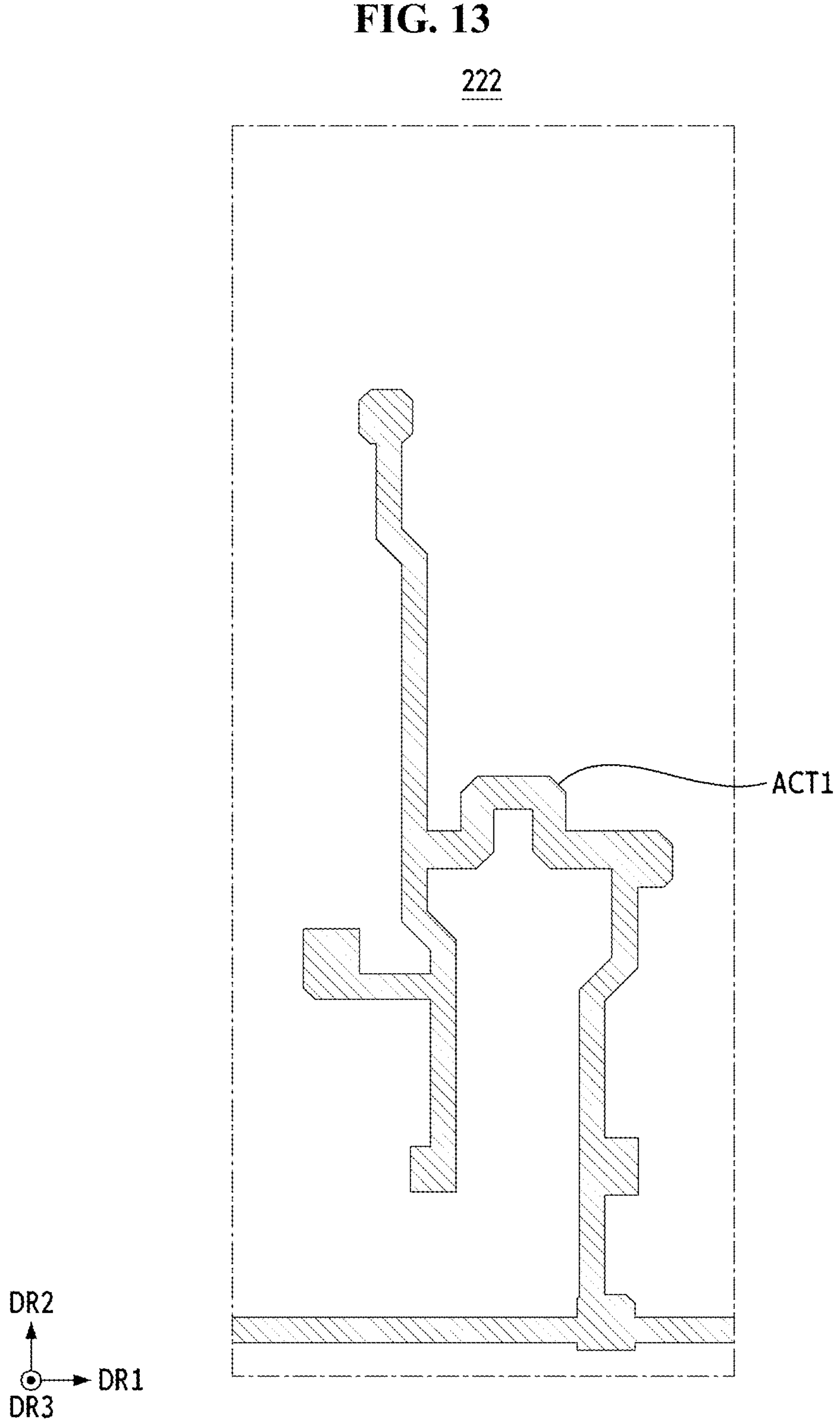
FIG. 13 is a plan view of only a second pattern layer among the components of FIG. 11.
Figure 14:
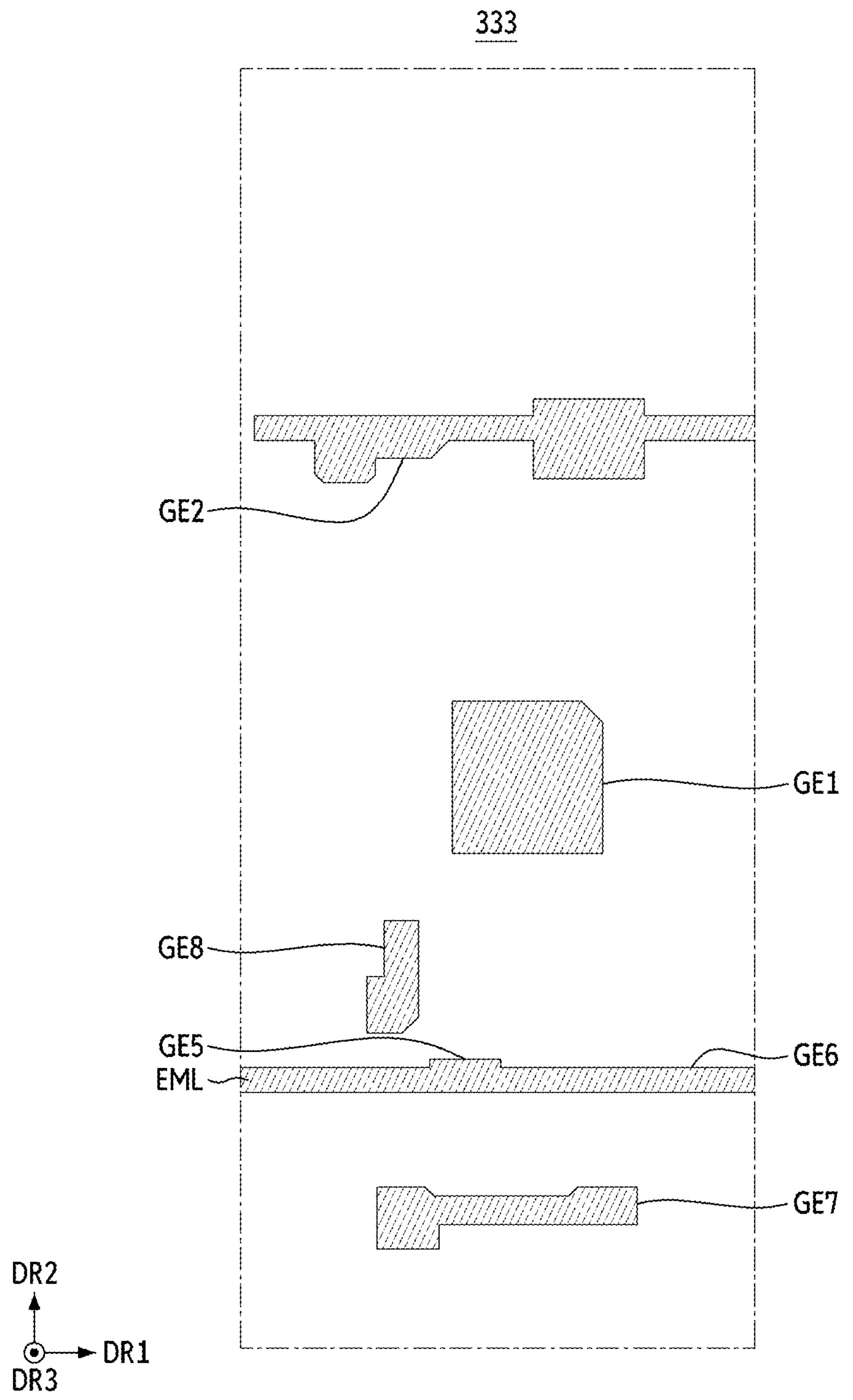
FIG. 14 is a plan view of only a third pattern layer among the components of FIG. 11.
Figure 15:
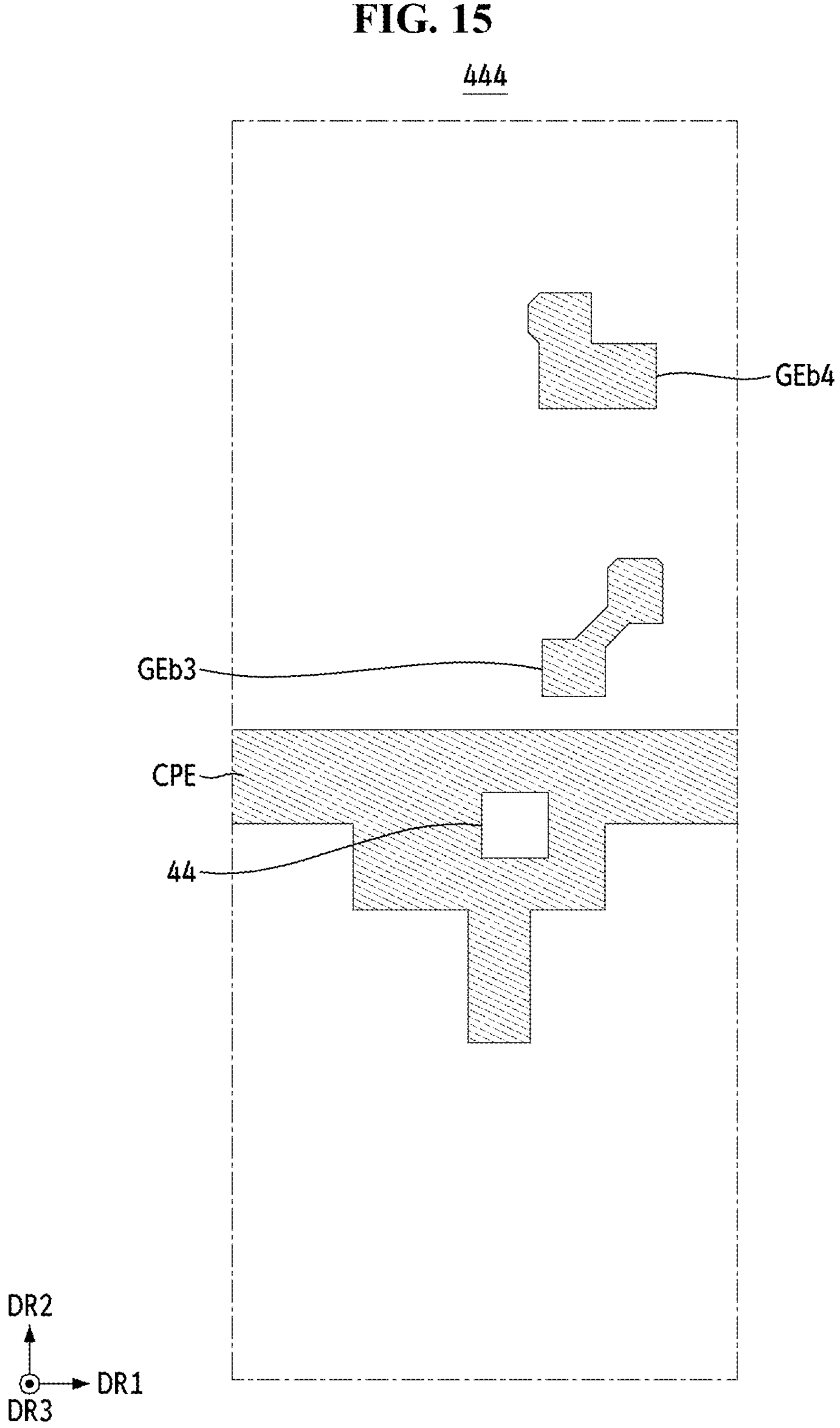
FIG. 15 is a plan view of only a fourth pattern layer among the components of FIG. 11.
Figure 16:
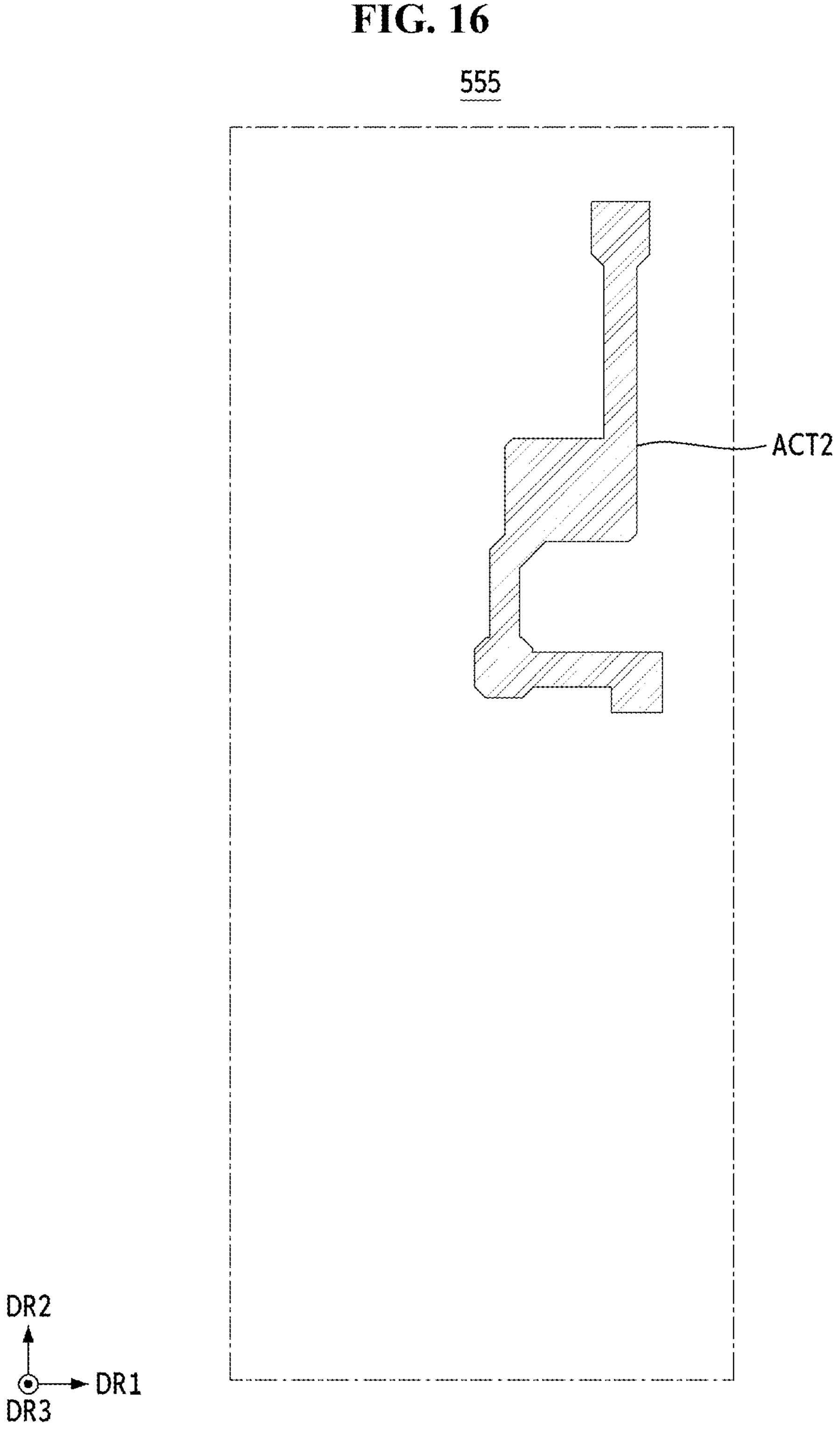
FIG. 16 is a plan view of only a fifth pattern layer among the components of FIG. 11.
Figure 17:
FIG. 17 is a plan view of only a sixth pattern layer among the components of FIG. 11.
Figure 18:
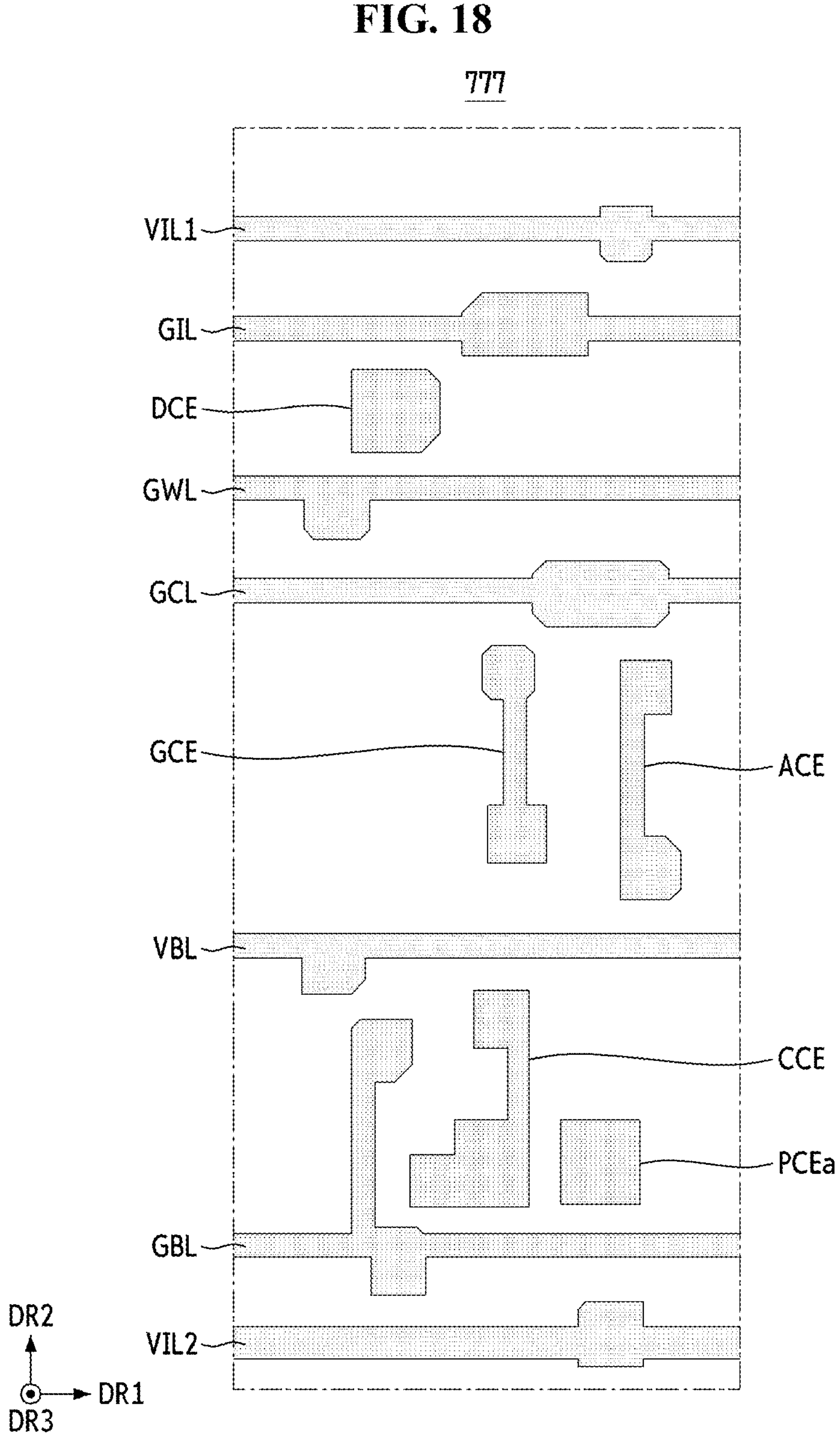
FIG. 18 is a plan view of only a seventh pattern layer among the components of FIG. 11.
Figure 19:
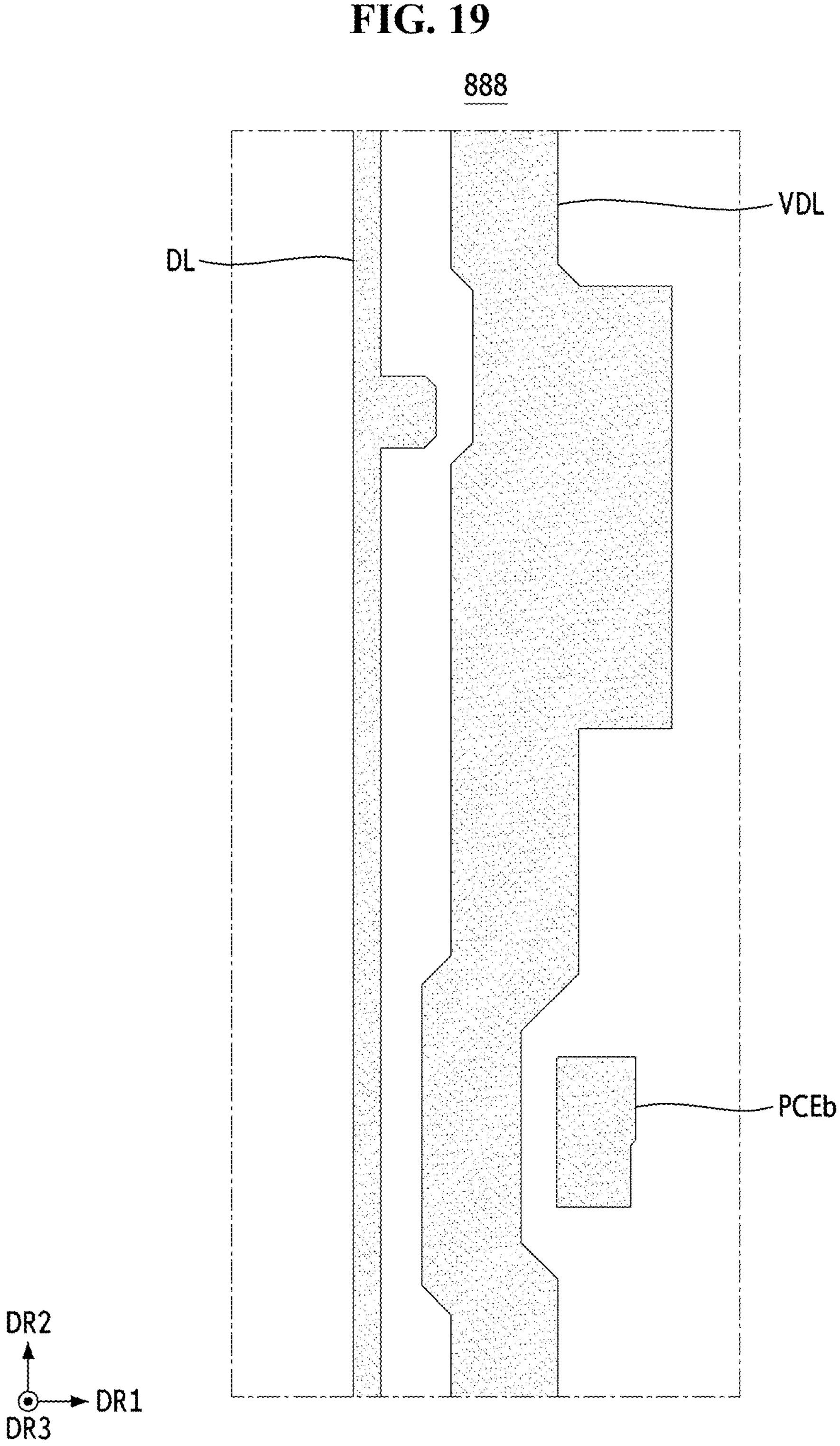
FIG. 19 is a plan view of only an eighth pattern layer among the components of FIG. 11.
Figure 20:
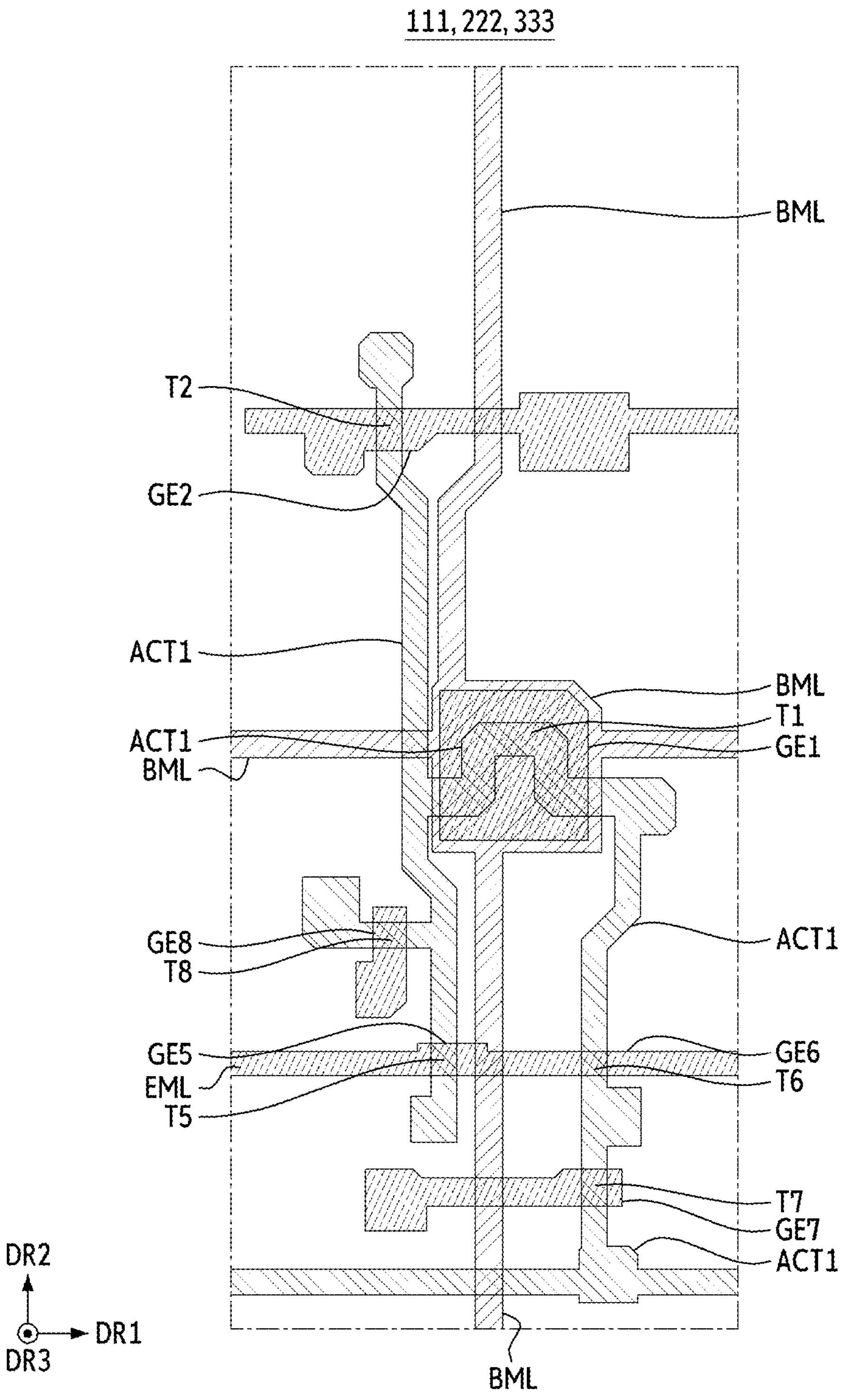
FIG. 20 is a plan view of only the first, second and third patterns layers among the components of FIG. 11.
Figure 21:
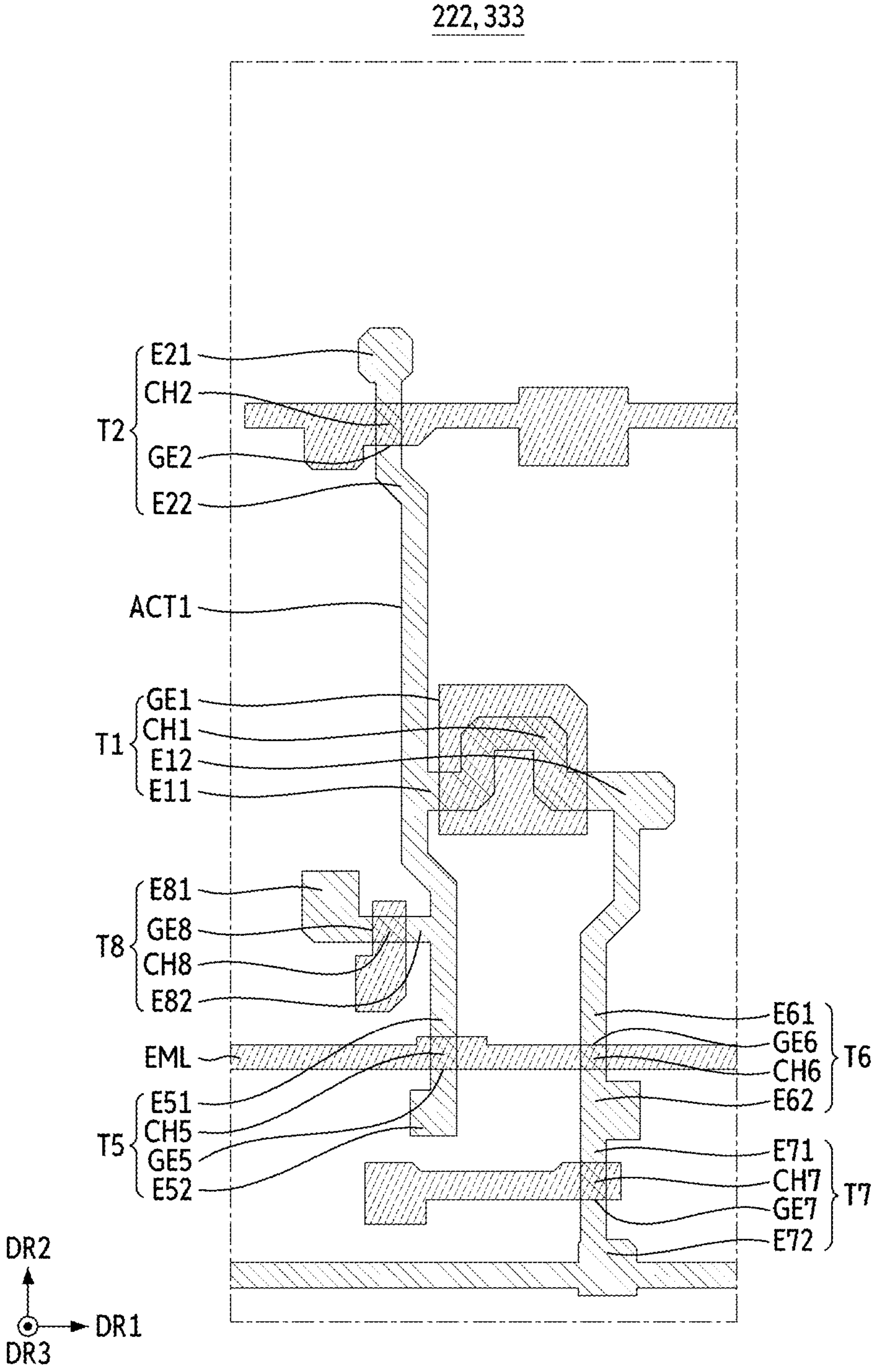
FIG. 21 is a plan view of only the second and third pattern layers among the components of FIG. 11.
Figure 22:
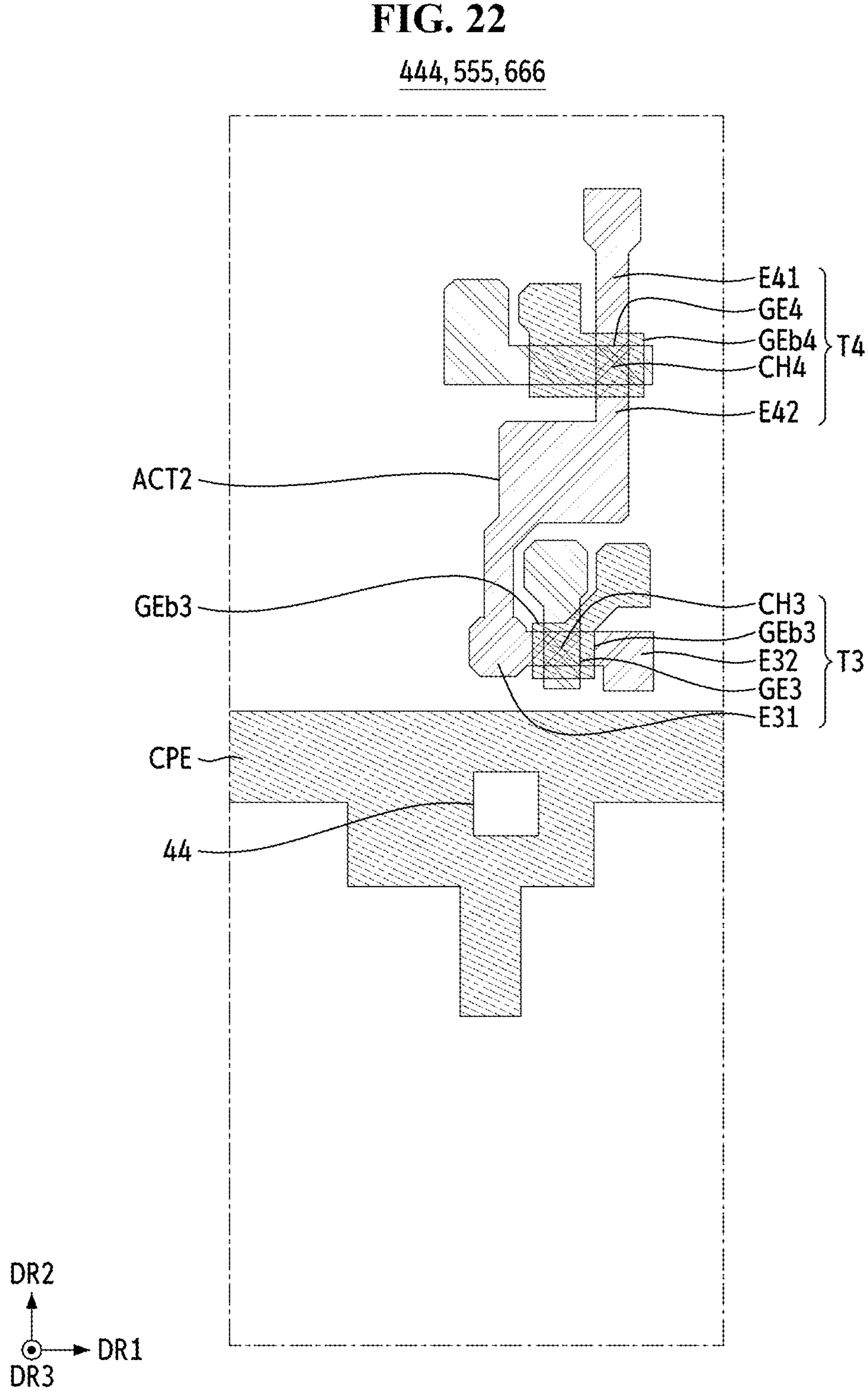
FIG. 22 is a plan view of only the fourth, fifth and sixth pattern layers among the components of FIG. 11.
Figure 23:
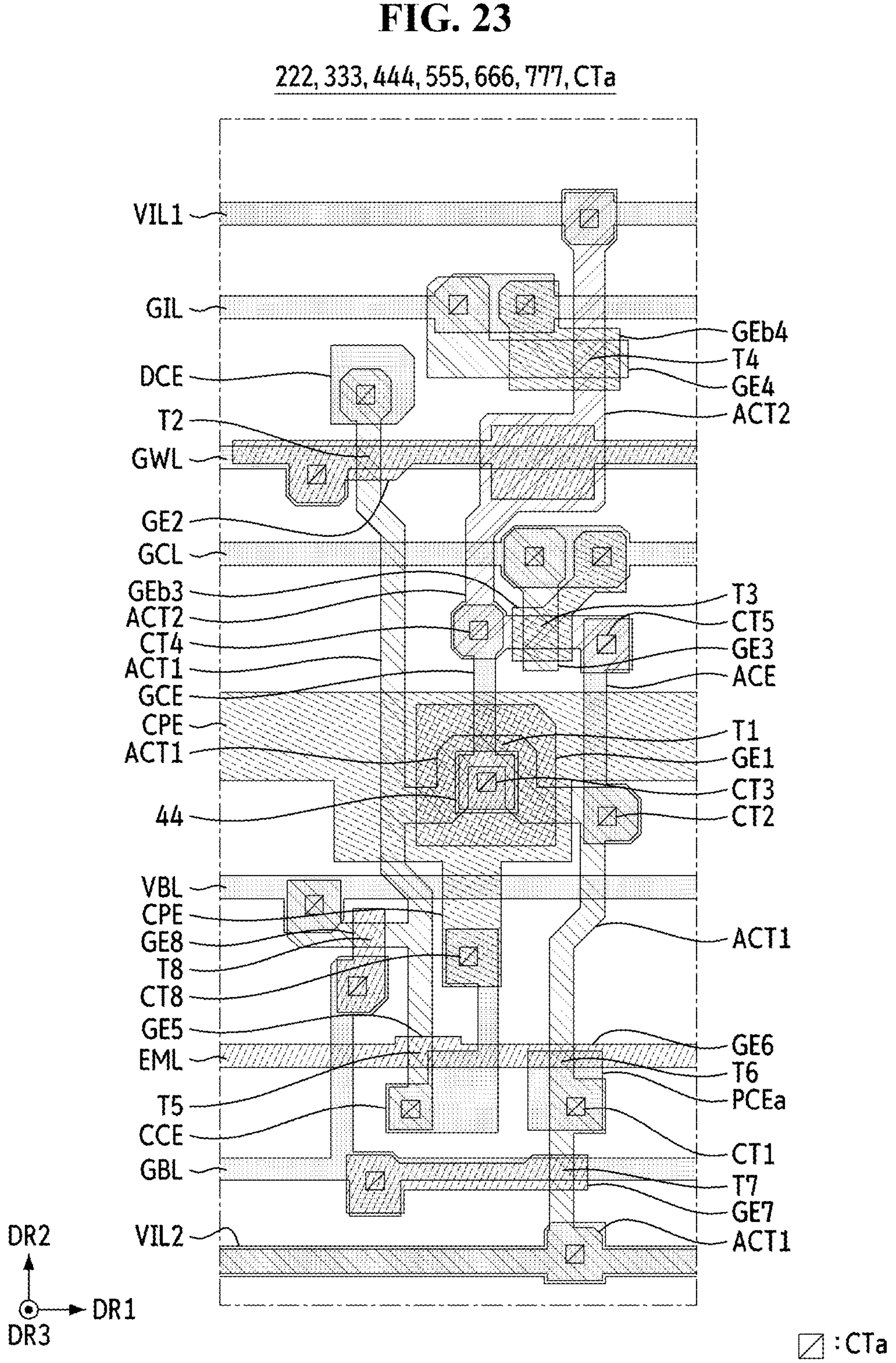
FIG. 23 is a plan view for explaining the connection relationship between the second through seventh pattern layers of FIG. 11.
Figure 24:
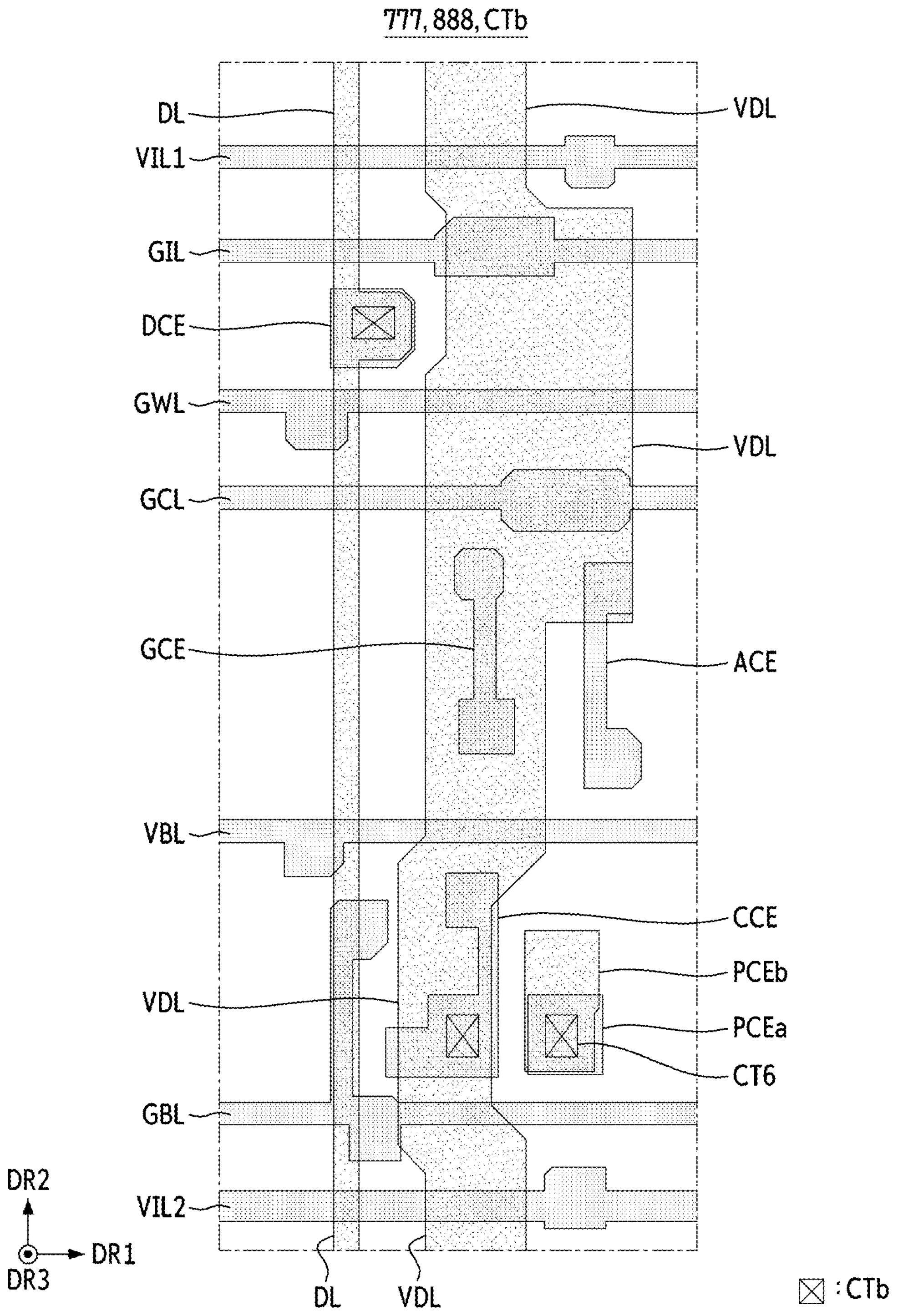
FIG. 24 is a plan view for explaining the connection relationship between the seventh and eighth pattern layers of FIG. 11.
Figure 25:
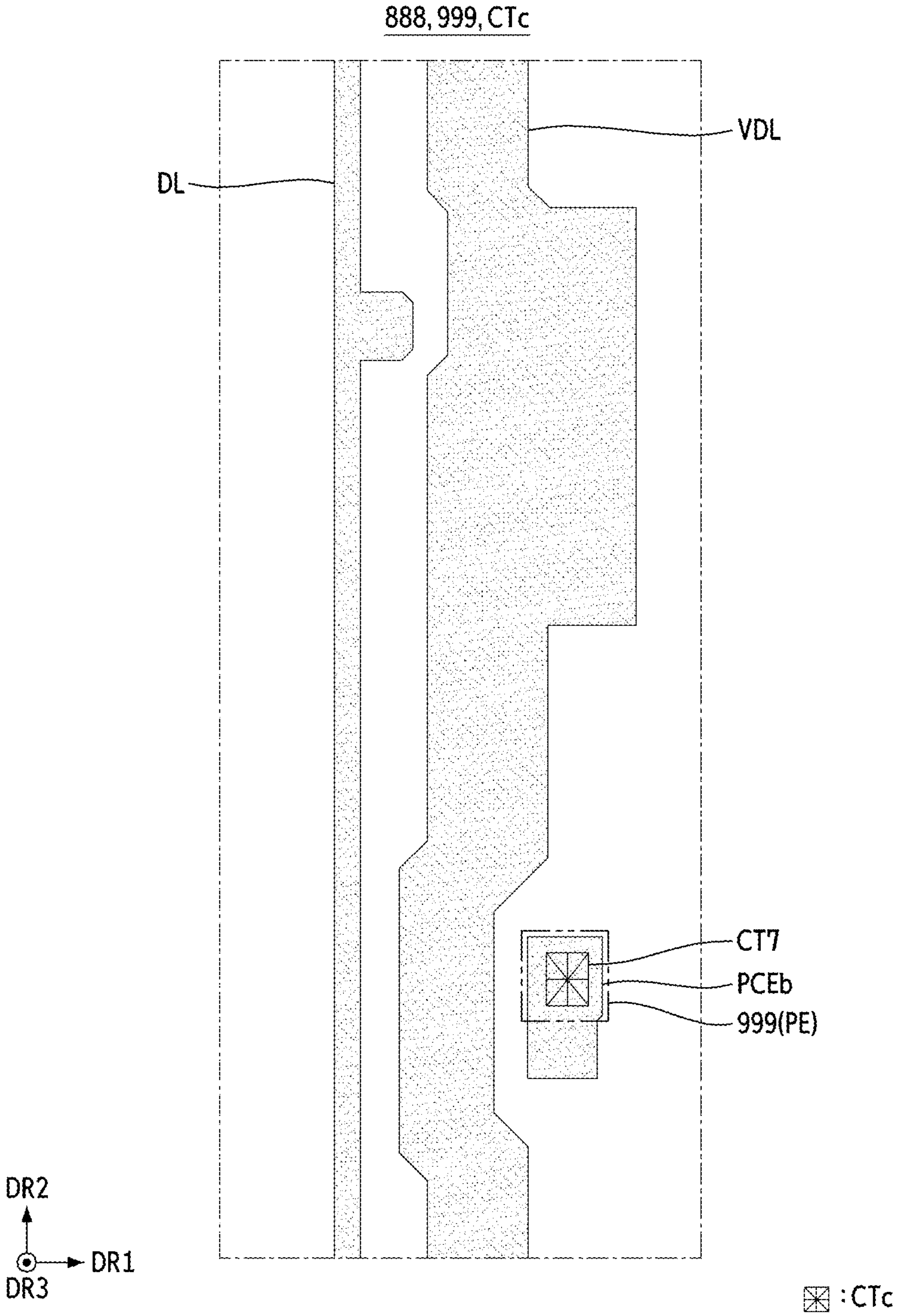
FIG. 25 is a plan view for explaining the connection relationship between the eighth and ninth pattern layers of FIG. 11.

FIG. 11 is a plan view of a pixel array according to an embodiment. FIG. 12 is a plan view of only a first pattern layer 111 among components of FIG. 11. FIG. 13 is a plan view of only a second pattern layer 222 among the components of FIG. 11. FIG. 14 is a plan view of only a third pattern layer 333 among the components of FIG. 11. FIG. 15 is a plan view of only a fourth pattern layer 444 among the components of FIG. 11. FIG. 16 is a plan view of only a fifth pattern layer 555 among the components of FIG. 11. FIG. 17 is a plan view of only a sixth pattern layer 666 among the components of FIG. 11. FIG. 18 is a plan view of only a seventh pattern layer 777 among the components of FIG. 11. FIG. 19 is a plan view of only an eighth pattern layer 888 among the components of FIG. 11. FIG. 20 is a plan view of only the first, second and third patterns layers 111, 222 and 333 among the components of FIG. 11. FIG. 21 is a plan view of only the second and third pattern layers 222 and 333 among the components of FIG. 11. FIG. 22 is a plan view of only the fourth, fifth and sixth pattern layers 444, 555 and 666 among the components of FIG. 11. FIG. 23 is a plan view for explaining the connection relationship between the second through seventh pattern layers 222 through 777 of FIG. 11. FIG. 24 is a plan view for explaining the connection relationship between the seventh and eighth pattern layers 777 and 888 of FIG. 11. FIG. 25 is a plan view for explaining the connection relationship between the eighth and ninth pattern layers 888 and 999 of FIG. 11.

In an embodiment, as illustrated in FIG. 11, contact holes may be divided or classified into first type contact holes CTa, second type contact holes CTb, and third type contact holes CTc. The first type contact holes CTa may be contact holes for connecting the seventh pattern layer 777 and a pattern layer (e.g., the second through sixth pattern layers 222 through 666) under the seventh pattern layer 777. The second type contact holes CTb may be contact holes for connecting the eighth pattern layer 888 and a pattern layer (e.g., at least one of the seventh pattern layers 777) under the eighth pattern layer 888. The third type contact holes CTc may be contact holes for connecting the ninth pattern layer 999 and a pattern layer (e.g., the eighth pattern layer 888) under the ninth pattern layer 999.

The first pattern layer 111 may be disposed on a substrate SUB in the third direction DR3. In an embodiment, the first pattern layer 111 may include or define a light blocking layer BML as in the example illustrated in FIGS. 11, 12 and 20.

Figure 26:
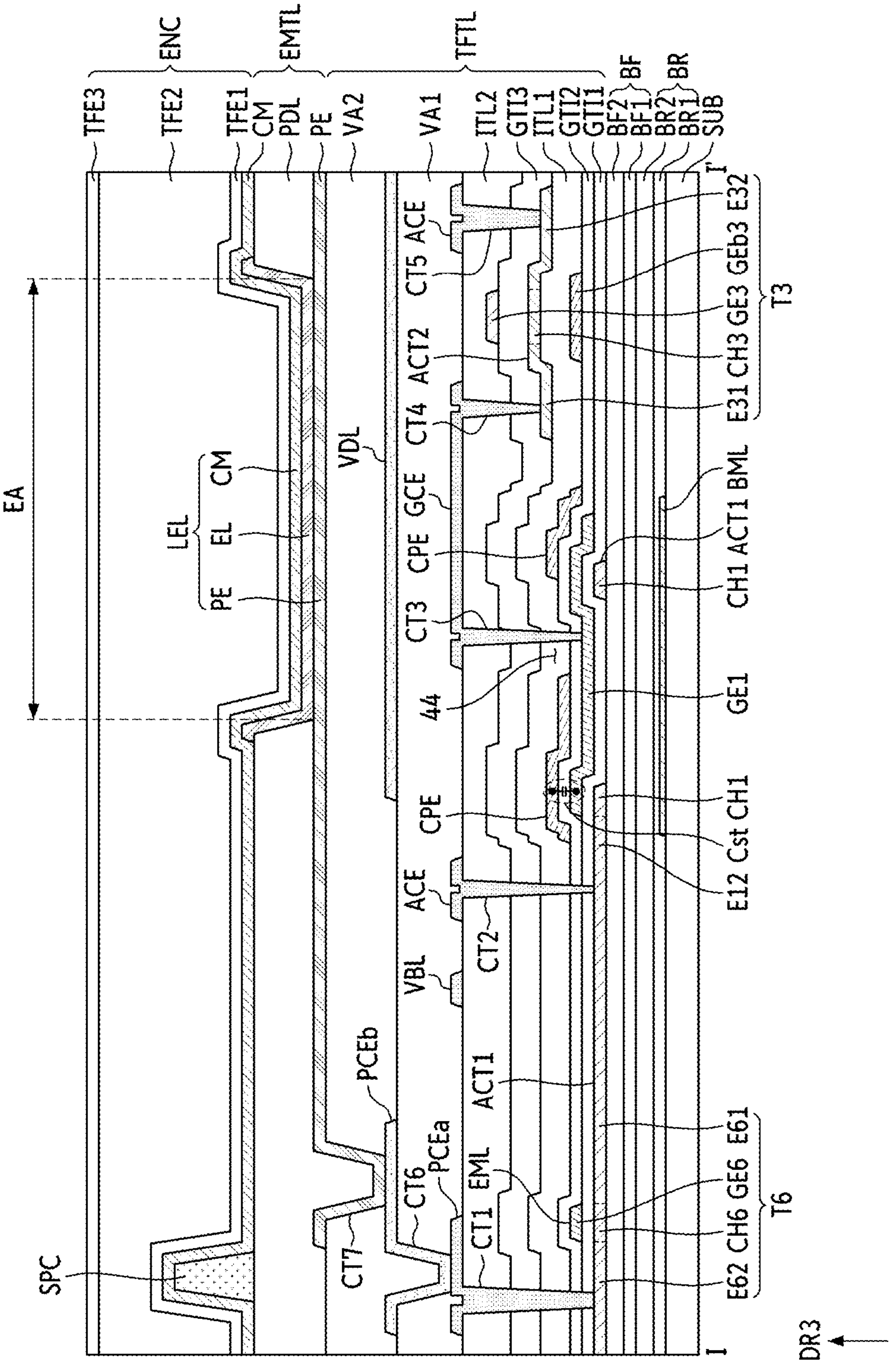
FIG. 26 is a cross-sectional view taken along line I-I' of FIG. 11.

As illustrated in FIG. 26, the light blocking layer BML may be disposed on the substrate SUB to cover an overlap region (e.g., a first channel region CH1) between a first gate electrode GE1 and a first active layer ACT1. In other words, the light blocking layer BML may be disposed on the substrate SUB to overlap the channel region CH1 of a first transistor T1 which is a driving transistor.

The second pattern layer 222 may be disposed on the first pattern layer 111 in the third direction DR3. The second pattern layer 222 may include the first active layer ACT1 as in the example illustrated in FIGS. 11, 13 and 21.

The first active layer ACT1 may provide (or define) channel regions CH1, CH2, CH5, CH6, CH7 and CH8, first electrodes E11, E21, E51, E61, E71 and E81 and second electrodes E12, E22, E52, E62, E72 and E82 of the first transistor T1, a second transistor T2, a fifth transistor T5, a sixth transistor T6, a seventh transistor T7 and an eighth transistor T8.

The first active layer ACT1 may be a semiconductor layer including or made of low temperature polycrystalline silicon (LTPS).

The third pattern layer 333 may be disposed on the second pattern layer 222 in the third direction DR3. An insulating layer may be disposed between the second pattern layer 222 and the third pattern layer 333. The third pattern layer 333 may include or define, as in the example illustrated in FIGS. 11, 14 and 21, a second gate electrode GE2, a first gate electrode GE1, an eighth gate electrode GE8, an emission control line EML, a fifth gate electrode GE5, a sixth gate electrode GE6, and a seventh gate electrode GE7.

The emission control line EML may include or define the fifth gate electrode GE5 and the sixth gate electrode GE6. In an embodiment, for example, a part of the emission control line EML may correspond to the fifth gate electrode GE5, and another part of the emission control line EML may correspond to the sixth gate electrode GE6. The emission control line EML, the fifth gate electrode GE5, and the sixth gate electrode GE6 may be formed integrally with each other as a single unitary indivisible part.

The first, second, fifth, sixth, seventh and eighth gate electrodes GE1, GE2, GE5, GE6, GE7 and GE8 may overlap the first active layer ACT1 in the third direction DR3.

The channel regions CH1, CH2, CH5, CH6, CH7 and CH8 of the first, second, fifth, sixth, seventh and eighth transistors T1, T2, T5, T6, T7 and T8 may be formed in overlapping regions between the first, second, fifth, sixth, seventh and eighth gate electrodes GE1, GE2, GE5, GE6, GE7 and GE8 and the first active layer ACT1.

The first transistor T1 may include the first gate electrode GE1, the first electrode E11, the second electrode E12, and the first channel region CH1.

The second transistor T2 may include the second gate electrode GE2, the first electrode E21, the second electrode E22, and a second channel region CH2.

The fifth transistor T5 may include the fifth gate electrode GE5, the first electrode E51, the second electrode E52, and a fifth channel region CH5.

The sixth transistor T6 may include the sixth gate electrode GE6, the first electrode E61, the second electrode E62, and a sixth channel region CH6.

The seventh transistor T7 may include the seventh gate electrode GE7, the first electrode E71, the second electrode E72, and a seventh channel region CH7.

The eighth transistor T8 may include the eighth gate electrode GE8, the first electrode E81, the second electrode E82, and an eighth channel region CH8.

The fourth pattern layer 444 may be disposed on the third pattern layer 333 in the third direction DR3. An insulating layer may be disposed between the third pattern layer 333 and the fourth pattern layer 444. The fourth pattern layer 444 may include or define a fourth counter gate electrode GEb4, a third counter gate electrode GEb3, and a capacitor electrode CPE as in the example illustrated in FIGS. 11, 14, 22 and 23.

The third counter gate electrode GEb3 may overlap a second active layer ACT2 and a third gate electrode GE3 in the third direction DR3 as in the example illustrated in FIG. 22. In an embodiment, for example, the third counter gate electrode GEb3 may face the third gate electrode GE3 with the second active layer ACT2 interposed between them.

The fourth counter gate electrode GEb4 may overlap the second active layer ACT2 and a fourth gate electrode GE4 in the third direction DR3 as in the example illustrated in FIG. 22. In an embodiment, for example, the fourth counter gate electrode GEb4 may face the fourth gate electrode GE4 with the second active layer ACT2 interposed between them.

The capacitor electrode CPE may overlap the first gate electrode GE1 in the third direction DR3 as illustrated in FIG. 23. A capacitor Cst may be formed in an overlapping region between the capacitor electrode CPE and the first gate electrode GE1. In an embodiment, for example, the capacitor electrode CPE and the first gate electrode GE1 may correspond to a first electrode and a second electrode of the capacitor Cst, respectively. In addition, the capacitor electrode CPE may be provided with a hole 44 defined therethrough in the third direction DR3. The first gate electrode GE1 may be connected to a first electrode E31 of a third transistor T3 through the hole 44 of the capacitor Cst (e.g., the capacitor electrode CPE) and a gate connection electrode GCE. In addition, the capacitor electrode CPE may be connected to a driving voltage line VDL through a capacitor connection electrode CCE which will be described later.

The fifth pattern layer 555 may be disposed on the fourth pattern layer 444 in the third direction DR3. An insulating layer may be disposed between the fourth pattern layer 444 and the fifth pattern layer 555. The fifth pattern layer 555 may include or define the second active layer ACT2 as in the example illustrated in FIGS. 11, 16, 22 and 23. The second active layer ACT2 may provide or define channel regions CH3 and CH4, first electrodes E31 and E41 and second electrodes E32 and E42 of the third transistor T3 and a fourth transistor T4.

The second active layer ACT2 may be, for example, an oxide-based semiconductor.

The sixth pattern layer 666 may be disposed on the fifth pattern layer 555 in the third direction DR3. An insulating layer may be disposed between the fifth pattern layer 555 and the sixth pattern layer 666. The sixth pattern layer 666 may include or define the fourth gate electrode GE4 and the third gate electrode GE3 as in the example illustrated in FIGS. 11, 17, 22 and 23.

As illustrated in FIG. 22, the third gate electrode GE3 and the fourth gate electrode GE4 may overlap the second active layer ACT2 in the third direction DR3.

The channel regions CH3 and CH4 of the third and fourth transistors T3 and T4 may be formed in overlapping regions between the third and fourth gate electrodes GE3 and GE4 and the second active layer ACT2.

The third transistor T3 may include the third gate electrode GE3, the first electrode E31, the second electrode E32, and a third channel region CH3.

The fourth transistor T4 may include the fourth gate electrode GE4, the first electrode E41, the second electrode E42, and a fourth channel region CH4.

The seventh pattern layer 777 may be disposed on the sixth pattern layer 666 in the third direction DR3. An insulating layer may be disposed between the sixth pattern layer 666 and the seventh pattern layer 777. The seventh pattern layer 777 may include or define, as in the example illustrated in FIGS. 11, 18, 23 and 24, a first initialization voltage line VIL1, a third gate line GIL, a data connection electrode DCE, a first gate line GWL, a second gate line GCL, the gate connection electrode GCE, an active connection electrode ACE, a bias voltage line VBL, the capacitor connection electrode CCE, a lower pixel connection electrode PCEa, a fourth gate line GBL, and a second initialization voltage line VIL2.

The first initialization voltage line VIL1 may be connected to a first electrode E41 (e.g., the first electrode E41 of the fourth transistor T4) of the second active layer ACT2 through a first type contact hole CTa of the insulating layer as illustrated in FIG. 23.

The second initialization voltage line VIL2 may be connected to a second electrode E72 (e.g., the second electrode E72 of the seventh transistor T7) of the first active layer ACT1 through a first type contact hole CTa of the insulating layer as illustrated in FIG. 23.

The first gate line GWL may be connected to the second gate electrode GE2 through a first type contact hole CTa of the insulating layer as illustrated in FIG. 23.

The second gate line GCL may be connected to the third gate electrode GE3 through a first type contact hole CTa of the insulating layer as illustrated in FIG. 23. In addition, the second gate line GCL may be connected to the third counter gate electrode GEb3 through a first type contact hole CTa of the insulating layer.

The third gate line GIL may be connected to the fourth gate electrode GE4 through a first type contact hole CTa of the insulating layer as illustrated in FIG. 23. In addition, the third gate line GIL may be connected to the fourth counter gate electrode GEb4 through a first type contact hole CTa of the insulating layer.

The fourth gate line GBL may be connected to the seventh gate electrode GE7 through a first type contact hole CTa of the insulating layer as illustrated in FIG. 23. In addition, the fourth gate line GBL may be connected to the eighth gate electrode GE8 through a first type contact hole CTa of the insulating layer.

The gate connection electrode GCE may be connected to the first gate electrode GE1 through a first type contact hole CTa of the insulating layer and the hole 44 of the capacitor electrode CPE as illustrated in FIG. 23. In addition, the gate connection electrode GCE may be connected to a first electrode E31 (e.g., the first electrode E31 of the third transistor T3) of the second active layer ACT2 and a second electrode E42 (e.g., the second electrode E42 of the fourth transistor T4) of the second active layer ACT2 through a first type contact hole CTa (e.g., CT4) of the insulating layer.

The data connection electrode DCE may be connected to a first electrode E21 (e.g., the first electrode E21 of the second transistor T2) of the first active layer ACT1 through a first type contact hole CTa of the insulating layer as illustrated in FIG. 23.

The active connection electrode ACE may be connected to a first electrode E11 (e.g., the second electrode E12 of the first transistor T1) of the first active layer ACT1 through a first type contact hole CTa (e.g., CT2) of the insulating layer as illustrated in FIG. 23. In addition, the active connection electrode ACE may be connected to a second electrode E32 (e.g., the second electrode E32 of the third transistor T3) of the second active layer ACT2 through a first type contact hole CTa (e.g., CT5) of the insulating layer.

The lower pixel connection electrode PCEa may be connected to a second electrode E62 (e.g., the second electrode E62 of the sixth transistor T6) of the first active layer ACT1 through a second type contact hole CTa (e.g., CT1) of the insulating layer as illustrated in FIG. 23.

The capacitor connection electrode CCE may be connected to a first electrode E51 (e.g., the second electrode E52 of the fifth transistor T5) of the first active layer ACT1 through a first type contact hole CTa of the insulating layer as illustrated in FIG. 23. In addition, the capacitor connection electrode CCE may be connected to the capacitor electrode CPE through a first type contact hole CTa (e.g., CT8) of the insulating layer.

The bias voltage line VBL may transmit a bias voltage VB. The bias voltage line VBL may be connected to a first electrode E81 (e.g., the first electrode E81 of the eighth transistor T8) of the first active layer ACT1 through a first type contact hole CTa of the insulating layer as illustrated in FIG. 23.

The eighth pattern layer 888 may be disposed on the seventh pattern layer 777 in the third direction DR3. An insulating layer may be disposed between the seventh pattern layer 777 and the eighth pattern layer 888. The eighth pattern layer 888 may include or define a data line DL, the driving voltage line VDL, and an upper pixel connection electrode PCEb as in the example illustrated in FIGS. 11, 19, 24 and 25.

The data line DL may be connected to the data connection electrode DCE through a second type contact hole CTb of the insulating layer as illustrated in FIG. 24.

The driving voltage line VDL may be connected to the capacitor connection electrode CCE through a second type contact hole CTb of the insulating layer as illustrated in FIG. 24.

The upper pixel connection electrode PCEb may be connected to the lower pixel connection electrode PCEa through a second type contact hole CTb (e.g., CT6) of the insulating layer as illustrated in FIG. 24.

The ninth pattern layer 999 may be disposed on the eighth pattern layer 888 in the third direction DR3. An insulating layer may be disposed between the eighth pattern layer 888 and the ninth pattern layer 999. The ninth pattern layer 999 may include or define a pixel electrode PE as in the example illustrated in FIG. 25. In FIG. 25, only a part, not the whole, of the pixel electrode PE is illustrated.

A part of the pixel electrode PE may be exposed by a bank which will be described later. For example, the bank may define an opening (hereinafter, referred to as an emission area) that exposes a part of the pixel electrode PE. A light emitting layer may be disposed on the pixel electrode PE corresponding to the emission area.

The pixel electrode PE may be connected to the upper pixel connection electrode PCEb through a third type contact hole CTc (e.g., CT7) of the insulating layer.

FIG. 26 is a cross-sectional view taken along line I-I' of FIG. 11.

As illustrated in FIG. 26, the display device 10 may include the substrate SUB, a barrier layer BR, a thin-film transistor layer TFTL, a light emitting element layer EMTL, and an encapsulation layer ENC. The barrier layer BR, the thin-film transistor layer TFTL, the light emitting element layer EMTL, and the encapsulation layer ENC may be sequentially disposed on the substrate SUB in the third direction DR3.

The substrate SUB may be a rigid substrate or a flexible substrate that can be bent, folded, or rolled. The substrate SUB may include or be made of an insulating material such as glass, quartz, or polymer resin. The polymer material may be, for example, polyethersulphone (PES), polyacrylate (PA), polyarylate (PAR), polyetherimide (PEI), polyethylene naphthalate (PEN), polyethylene terepthalate (PET), polyphenylene sulfide (PPS), polyallylate, polyimide (P1), polycarbonate (PC), cellulose triacetate (CAT), cellulose acetate propionate (CAP), or a combination thereof. Alternatively, the substrate SUB may include a metal material.

As illustrated in FIG. 26, the barrier layer BR may be disposed on the substrate SUB. The barrier layer BR may be disposed on the entire surface of the substrate SUB. The barrier layer BR may be a layer for protecting transistors T1 through T8 of the thin-film transistor layer TFTL and a light emitting layer EL of the light emitting element layer EMTL from moisture introduced through the substrate SUB which is vulnerable to moisture penetration.

The barrier layer BR may be composed of or defined by a plurality of inorganic layers stacked alternately. In an embodiment, for example, the barrier layer BR may be a multilayer in which one or more inorganic layers selected from a silicon nitride layer, a silicon oxynitride layer, a silicon oxide layer, a titanium oxide layer, and an aluminum oxide layer are alternately stacked.

As illustrated in FIG. 26, the first pattern layer 111 may be disposed on the barrier layer BR. In an embodiment, for example, the light blocking layer BML may be disposed on the barrier layer BR. The light blocking layer BML may be disposed on the barrier layer BR to cover the overlapping region (e.g., the first channel region CH1) between the first gate electrode GE1 and the first active layer ACT1. In other words, the light blocking layer BML may be disposed on the barrier layer BR to overlap the channel region CH1 of the first transistor T1, which is a driving transistor, in the third direction DR3.

The light blocking layer BML may include or be made of, for example, a metal material such as chromium (Cr) or molybdenum (Mo) or may include or be made of black ink or black dye. In an embodiment where the light blocking layer BML is made of a metal material, the light blocking layer BML may receive constant power. Accordingly, the light blocking layer BML may not float electrically, and the electrical characteristics of a transistor (e.g., the first transistor T1) on the light blocking layer BML may be stabilized.

As illustrated in FIG. 26, a buffer layer BF may be disposed on the light blocking layer BML. The buffer layer BF may be disposed on the entire surface of the substrate SUB including the barrier layer BR. The buffer layer BF may be a layer for protecting the transistors T1 through T8 of the thin-film transistor layer TFTL and the light emitting layer EL of the light emitting element layer EMTL from moisture introduced through the substrate SUB which is vulnerable to moisture penetration.

The buffer layer BF may be composed of or defined by a plurality of inorganic layers stacked alternately. In an embodiment, for example, the buffer layer BF may be a multilayer in which one or more inorganic layers selected from a silicon nitride layer, a silicon oxynitride layer, a silicon oxide layer, a titanium oxide layer, and an aluminum oxide layer are alternately stacked.

The second pattern layer 222 may be disposed on the buffer layer BF. For example, the first active layer ACT1 may be disposed on the buffer layer BF. As illustrated in FIG. 21, the first active layer ACT1 may include the first channel region CH1 of the first transistor T1, the second electrode E12 of the first transistor T1, the first channel region CH1 of the first transistor T1, the first electrode E61 of the sixth transistor T6, the second electrode E62 of the sixth transistor T6, and the sixth channel region CH6 of the sixth transistor T6.

The first active layer ACT1 may be an active layer including or made of low temperature polycrystalline silicon (LTPS).

A first gate insulating layer GTI1 may be disposed on the first pattern layer 111. In an embodiment, for example, as illustrated in FIG. 26, the first gate insulating layer GTI1 may be disposed on the first active layer ACT1. Here, the first gate insulating layer GTI1 may be disposed on the entire surface of the substrate SUB including the first active layer ACT1.

The first gate insulating layer GTI1 may include at least one selected from tetraethylorthosilicate (TEOS), silicon nitride ($SiN_x$), and silicon oxide ($SiO_2$). In an embodiment, for example, the first gate insulating layer GTI1 may have a double-layer structure in which a silicon nitride layer with a thickness of about 40 nanometers (nm) and a tetraethylorthosilicate layer with a thickness of about 80 nm are sequentially stacked.

The third pattern layer 333 may be disposed on the first gate insulating layer GTI1. In an embodiment, for example, the second gate electrode GE2, the first gate electrode GE1, the eighth gate electrode GE8, the emission control line EML, the fifth gate electrode GE5, and the sixth gate electrode GE6 may be disposed on the first gate insulating layer GTI1.

FIG. 26 shows an embodiment in which the first gate electrode GE1, the sixth gate electrode GE6, and the emission control line EML are disposed on the first gate insulating layer GTI1. The first gate electrode GE1 may be disposed on the first gate insulating layer GTI1 to overlap the first channel region CH1 of the first active layer ACT1 in the third direction DR3. The sixth gate electrode GE6 of the emission control line EML may be disposed on the first gate insulating layer GTI1 to overlap the sixth channel region CH6 of the first active layer ACT1 in the third direction DR3.

The third pattern layer 333 may include at least one selected from molybdenum (Mo), copper (Cu), aluminum and titanium (Ti) and may be a single layer or a multilayer. In an embodiment, for example, the first gate electrode GE1 may be a triple layer including a titanium layer, an aluminum layer, and a titanium layer which are sequentially disposed on the first gate insulating layer GTI1 in the third direction DR3.

A second gate insulating layer GTI2 may be disposed on the third pattern layer. In an embodiment, for example, as illustrated in FIG. 26, the second gate insulating layer GTI2 may be disposed on the first gate electrode GE1, the sixth gate electrode GE6, and the emission control line EML. Here, the second gate insulating layer GTI2 may be disposed on the entire surface of the substrate SUB including the first gate electrode GE1, the sixth gate electrode GE6, and the emission control line EML.

The second gate insulating layer GTI2 may include a same material as and have a same structure as the first gate insulating layer GTI1 described above.

The fourth pattern layer 444 may be disposed on the second gate insulating layer GTI2. In an embodiment, for example, the fourth counter gate electrode GEb4, the third counter gate electrode GEb3, and the capacitor electrode CPE may be disposed on the second gate insulating layer GTI2. FIG. 26 shows an embodiment in which the capacitor electrode CPE and the third counter gate electrode GEb3 are disposed on the second gate insulating layer GTI2. The capacitor electrode CPE may be disposed on the second gate insulating layer GTI2 to overlap the first gate electrode GE1 in the third direction DR3. The capacitor Cst may be formed between the capacitor electrode CPE and the first gate electrode GE1.

The fourth pattern layer 444 may include a same material as or have a same structure as the third pattern layer 333 described above.

A first interlayer insulating layer ITL1 may be disposed on the fourth pattern layer 444. In an embodiment, for example, as illustrated in FIG. 26, the first interlayer insulating layer ITL1 may be disposed on the capacitor electrode CPE and the third counter gate electrode GEb3. Here, the first interlayer insulating layer ITL1 may be disposed on the entire surface of the substrate SUB including the capacitor electrode CPE and the third counter gate electrode GEb3.

The first interlayer insulating layer ITL1 may include an inorganic layer, for example, a silicon nitride layer, a silicon oxynitride layer, a silicon oxide layer, a titanium oxide layer, or an aluminum oxide layer. The first interlayer insulating layer ITL1 may include a plurality of inorganic layers.

The fifth pattern layer 555 may be disposed on the first interlayer insulating layer ITL1. In an embodiment, for example, the second active layer ACT2 may be disposed on the first interlayer insulating layer ITL1. As illustrated in FIG. 26, the second active layer ACT2 may be disposed on the first interlayer insulating layer ITL1 to overlap the third counter gate electrode GEb3 in the third direction DR3. The second active layer ACT2 may include the first electrode E31 of the third transistor T3, the second electrode E32 of the third transistor T3, and the third channel region CH3 of the third transistor T3. The third channel region CH3 of the second active layer ACT2 may overlap the third counter gate electrode GEb3 in the third direction DR3.

The second active layer ACT2 may be an oxide-based active layer. In an embodiment, for example, the second active layer ACT2 may be an oxide semiconductor layer including indium-gallium-zinc-oxide (IGZO) or indium-gallium-zinc-tin oxide (IGZTO).

A third gate insulating layer GTI3 may be disposed on the fifth pattern layer 555. In an embodiment, for example, as illustrated in FIG. 26, the third gate insulating layer GTI3 may be disposed on the second active layer ACT2. The third gate insulating layer GTI3 may be disposed on the entire surface of the substrate SUB including the second active layer ACT2.

The third gate insulating layer GTI3 may include a same material as and have a same structure as the first gate insulating layer GTI1 described above.

The sixth pattern layer 666 may be disposed on the third gate insulating layer GTI3. In an embodiment, for example, the fourth gate electrode GE4 and the third gate electrode GE3 may be disposed on the third gate insulating layer GTI3.

FIG. 26 shows an embodiment in which the third gate electrode GE3 is disposed on the third gate insulating layer GTI3. The third gate electrode GE3 may overlap the third channel region CH3 of the second active layer ACT2 in the third direction DR3.

The sixth pattern layer 666 may include a same material or have a same structure as the third pattern layer 333 described above.

A second interlayer insulating layer ITL2 may be disposed on the sixth pattern layer 666. In an embodiment, for example, as illustrated in FIG. 26, the second interlayer insulating layer ITL2 may be disposed on the third gate electrode GE3. The second interlayer insulating layer ITL2 may be disposed on the entire surface of the substrate SUB including the third gate electrode GE3.

The second interlayer insulating layer ITL2 may include a same material as and have a same structure as the first interlayer insulating layer ITL1 described above.

The seventh pattern layer 777 may be disposed on the second interlayer insulating layer ITL2. In an embodiment, for example, the first initialization voltage line VIL1, the third gate line GIL, the data connection electrode DCE, the first gate line GWL, the second gate line GCL, the gate connection electrode GCE, the active connection electrode ACE, the bias voltage line VBL, the capacitor connection electrode CCE, the lower pixel connection electrode PCEa, the fourth gate line GBL, and the second initialization voltage line VIL2 may be disposed on the second interlayer insulating layer ITL2.

FIG. 26 shows an embodiment in which the gate connection electrode GCE, the active connection electrode ACE, the bias voltage line VBL, and the lower pixel connection electrode PCEa are disposed on the second interlayer insulating layer ITL2. The lower pixel connection electrode PCEa may be connected to the second electrode E62 of the sixth transistor T6 through a first contact hole CT1 defined therethrough the second interlayer insulating layer ITL2, the third gate insulating layer GTI3, the first interlayer insulating layer ITL1, the second gate insulating layer GTI2, and the first gate insulating layer GTI1. The active connection electrode ACE may be connected to the second electrode E12 of the first transistor T1 and the first electrode E61 of the sixth transistor T6 through a second contact hole CT2 defined therethrough the second interlayer insulating layer ITL2 (?), the third gate insulating layer GTI3, the first interlayer insulating layer ITL1, the second gate insulating layer GTI2, and the first gate insulating layer GTI1. In addition, the active connection electrode ACE may be connected to the second electrode E32 of the third transistor T3 through a fifth contact hole CT5 defined therethrough the second interlayer insulating layer ITL2 and the third gate insulating layer GTI3. The gate connection electrode GCE may be connected to the first gate electrode GE1 through a third contact hole CT3 defined therethrough the second interlayer insulating layer ITL2, the third gate insulating layer GTI3, the first interlayer insulating layer ITL1, the hole 44 of the capacitor electrode CPE, and the second gate insulating layer GTI2. In addition, the gate connection electrode GCE may be connected to the first electrode E31 of the third transistor T3 through a fourth contact hole CT4 defined therethrough the second interlayer insulating layer ITL2 and the third gate insulating layer GTI3. The first contact hole CT1, the second contact hole CT2, the third contact hole CT3, the fourth contact hole CT4, and the fifth contact hole CT5 may belong to the first type contact holes CTa.

The seventh pattern layer 777 may include a same material as or have a same structure as the third pattern layer 333 described above.

A first planarization layer VA1 may be disposed on the seventh pattern layer 777. In an embodiment, for example, the first planarization layer VA1 may be disposed on the gate connection electrode GCE, the active connection electrode ACE, the bias voltage line VBL, and the lower pixel connection electrode PCEa. The first planarization layer VA1 may be disposed on the entire surface of the substrate SUB including the gate connection electrode GCE, the active connection electrode ACE, the bias voltage line VBL, and the lower pixel connection electrode PCEa.

The first planarization layer VA1 may include an organic layer such as acryl resin, epoxy resin, phenolic resin, polyamide resin, or polyimide resin.

The eighth pattern layer 888 may be disposed on the first planarization layer VA1. In an embodiment, for example, the data line DL, the driving voltage line VDL, and the upper pixel connection electrode PCEb may be disposed on the second interlayer insulating layer ITL2. FIG. 26 shows an embodiment in which the driving voltage line VDL and the upper pixel connection electrode PCEb are disposed on the first planarization layer VA1.

The upper pixel connection electrode PCEb may be connected to the lower pixel connection electrode PCEa through a sixth contact hole CT6 defined therethrough the first planarization layer VA1. The sixth contact hole CT6 may belong to the second type contact holes CTb.

The eighth pattern layer 888 may have the same material or structure as the third pattern layer 333 described above.

A second planarization layer VA2 may be disposed on the eighth pattern layer 888. In an embodiment, for example, the second planarization layer VA2 may be disposed on the driving voltage line VDL and the upper pixel connection electrode PCEb. The second planarization layer VA2 may be disposed on the entire surface of the substrate SUB including the driving voltage line VDL and the upper pixel connection electrode PCEb.

The second planarization layer VA2 may include a same material as and have a same structure as the first planarization layer VA1 described above.

The ninth pattern layer 999 may be disposed on the second planarization layer VA2. In an embodiment, for example, as illustrated in FIG. 26, the light emitting element layer EMTL including the ninth pattern layer 999 may be disposed on the second planarization layer VA2. In an embodiment, for example, as illustrated in FIG. 26, the pixel electrode PE may be disposed as the ninth pattern layer 999 on a third planarization layer VA3. The pixel electrode PE may be connected to the upper pixel connection electrode PCEb through a seventh contact hole CT7 defined therethrough the second planarization layer VA2. The seventh contact hole CT7 may belong to the third type contact holes CTc.

The light emitting element layer EMTL may further include a light emitting element LEL and a bank PDL (or a pixel defining layer) in addition to the ninth pattern layer 999 described above.

The light emitting element LEL may include the pixel electrode PE, the light emitting layer EL, and a common electrode CM. An emission area EA is an area where the pixel electrode PE, the light emitting layer EL, and the common electrode CM are sequentially stacked so that holes from the pixel electrode PE and electrons from the common electrode CM are combined with each other in the light emitting element LEL to emit light. In this case, the pixel electrode PE may be an anode of the light emitting element LEL, and the common electrode CM may be a cathode of the light emitting element LEL.

In an embodiment having a top emission structure in which light is emitted in a direction from the light emitting layer EL toward the common electrode CM, the pixel electrode PE may be formed as a single layer of molybdenum (Mo), titanium (Ti), copper (Cu) or aluminum (Al) or, to increase reflectivity, may be formed as a stacked structure (Ti/Al/Ti) of aluminum and titanium, a stacked structure (ITO/Al/ITO) of aluminum and indium tin oxide, an APC alloy, or a stacked structure (ITO/APC/ITO) of an APC alloy and indium tin oxide. The APC alloy is an alloy of silver (Ag), palladium (Pd), and copper (Cu).

The bank PDL (or the pixel defining layer) may define emission areas EA of pixels. To this end, the bank PDL may be disposed on the third planarization layer VA3 to expose a portion of the pixel electrode PE. The bank PDL may cover edges of the pixel electrode PE. The bank PDL may be disposed in the seventh contact hole CT7 defined therethrough the third planarization layer VA3. Accordingly, the seventh contact hole CT7 defined therethrough the third planarization layer VA3 may be filled with the bank PDL. The bank PDL may include or be made of an organic layer such as acryl resin, epoxy resin, phenolic resin, polyamide resin, or polyimide resin.

As illustrated in FIG. 26, a spacer SPC may be disposed on the bank PDL. The spacer SPC may support a mask during a process of manufacturing the light emitting layer EL. The spacer SPC may be made of an organic layer such as acryl resin, epoxy resin, phenolic resin, polyamide resin, or polyimide resin.

The light emitting layer EL may be formed on the pixel electrode PE. The light emitting layer EL may include an organic material to emit light of a predetermined color. In an embodiment, for example, the light emitting layer EL may include a hole transporting layer, an organic material layer, and an electron transporting layer. The organic material layer may include a host and a dopant. The organic material layer may include a material that emits predetermined light and may be formed using a phosphorescent material or a fluorescent material.

The light emitting element LEL described above may be provided for each pixel. In an embodiment, for example, a first pixel may include a first light emitting element, a second pixel may include a second light emitting element, and a third pixel may include a third light emitting element. The first light emitting element, the second light emitting element, and the third light emitting element may provide light of different colors. In an embodiment, for example, the first light emitting element may emit light of a first color, the second light emitting element may emit light of a second color, and the third light emitting element may emit light of a third color.

In an embodiment, for example, an organic material layer of a first light emitting layer of a first emission area emitting light of the first color may be a phosphorescent material that includes a host material including carbazole biphenyl (CBP) or 1,3-bis(carbazol-9-yl) (mCP) and a dopant including at least one selected from bis(1-phenylisoquinoline) acetylacetonate iridium (PIQIr(acac)), bis(1-phenylquinoline) acetylacetonate iridium (PQIr(acac)), tris(1-phenylquinoline) iridium (PQIr) and octaethylporphyrin platinum (PtOEP). Alternatively, the organic material layer of the first light emitting layer of the first emission area may be a fluorescent material including PBD:Eu(DBM)3(Phen) or perylene. However, the disclosure is not limited thereto.

An organic material layer of a second light emitting layer of a second emission area emitting light of the second color may be a phosphorescent material that includes a host material including CBP or mCP and a dopant material including Ir(ppy)3(fac tris(2-phenylpyridine) iridium). Alternatively, the organic material layer of the second light emitting layer of the second emission area emitting light of the second color may be a fluorescent material including tris(8-hydroxyquinolino)aluminum (Alq3). However, the disclosure is not limited thereto.

An organic material layer of a third light emitting layer of a third emission area emitting light of the third color may be a phosphorescent material that includes a host material including CBP or mCP and a dopant material including (4,6-F2ppy)2Irpic or L2BD111. However, the disclosure is not limited thereto.

The common electrode CM may be disposed on the first, second, and third light emitting layers (e.g., EL). The common electrode CM may cover the first, second and third light emitting layers. The common electrode CM may be a common layer commonly disposed on the first through third light emitting layers. A capping layer may be disposed on the common electrode CM.

In the top emission structure, the common electrode CM may include or be made of a transparent conductive material (TCO) that can transmit light, such as indium tin oxide (ITO) or indium zinc oxide (IZO), or a semi-transmissive conductive material such as magnesium (Mg), silver (Ag) or an alloy of Mg and Ag. In an embodiment where the common electrode CM is made of a semi-transmissive conductive material, light output efficiency may be increased by a microcavity.

The encapsulation layer ENC may be formed on the light emitting element layer EMTL. The encapsulation layer ENC may include at least one inorganic layer TFE1 and TFE3 to prevent oxygen or moisture from penetrating into the light emitting element layer EMTL. In addition, the encapsulation layer ENC may include at least one organic layer to protect the light emitting element layer EMTL from foreign substances such as dust. In an embodiment, for example, the encapsulation layer ENC may include a first encapsulating inorganic layer TFE1, an encapsulating organic layer TFE2, and a second encapsulating inorganic layer TFE3.

The first encapsulating inorganic layer TFE1 may be disposed on the common electrode CM, the encapsulating organic layer TFE2 may be disposed on the first encapsulating inorganic layer TFE1, and the second encapsulating inorganic layer TFE3 may be disposed on the encapsulating organic layer TFE2. Each of the first encapsulating inorganic layer TFE1 and the second encapsulating inorganic layer TFE3 may be a multilayer in which one or more inorganic layers selected from a silicon nitride layer, a silicon oxynitride layer, a silicon oxide layer, a titanium oxide layer, and an aluminum oxide layer are alternately stacked. The encapsulating organic layer TFE2 may be an organic layer such as acryl resin, epoxy resin, phenolic resin, polyamide resin, or polyimide resin.

An array for the pixel of FIG. 5 may have a shape similar to the array illustrated in FIGS. 11 through 26 described above. However, the pixel array of FIG. 5 may not include patterns for the eighth transistor T8.

In a display device according to an embodiment, emission signals having different pulse widths may be transmitted to pixels that provide different colors, respectively. Accordingly, each light emitting element can emit light with optimal efficiency in its optimal current density section. In addition, a luminance deviation of each light in its optimal current density section may be minimized. Therefore, according to an embodiment, the power consumption of the display device can be reduced, and the image quality of the display device can be improved.

However, the effects of the disclosure are not restricted to the one set forth herein. The above and other effects of the disclosure will become more apparent to one of daily skill in the art to which the disclosure pertains by referencing the claims.

The display device according to the embodiment can be applied to various electronic devices. The electronic device according to an embodiment includes the display device described above and may further include modules or devices having additional functions in addition to the display device.

Figure 27:
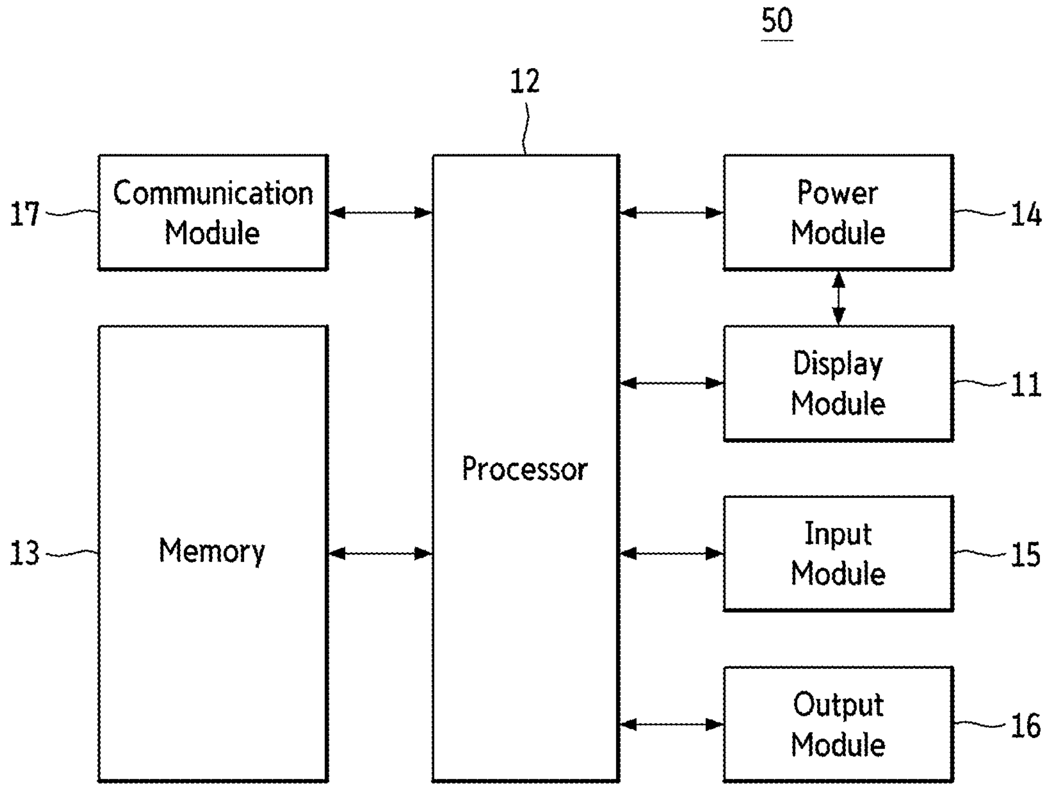
FIG. 27 is a block diagram of an electronic device according to an embodiment.

FIG. 27 is a block diagram of an electronic device according to an embodiment. Referring to FIG. 27, the electronic device 50 according to an embodiment may include a display module (11, e.g., a display device), a processor 12, a memory 13, and a power module 14. The electronic device 50 may further include an input module 15, an output module (or a non-image output module) 16 and/or a communication module 17.

The electronic device 50 may output various information in the form of images through the display module 11. When the processor 12 executes an application stored in the memory 13, image information provided by the application may be provided to the user through the display module 11. The power module 14 may include a power supply module such as a power adapter or a battery device, and a power conversion module that converts the power supplied by the power supply module to generate power required for the operation of the electronic device 50. The input module 15 may provide input information to the processor 12 and/or the display module 11. The output module 16 may receive information other than images transmitted from the processor 12, such as sound, haptics, and light, and provide the information to the user. The communication module 17 is a module for transmitting and receiving information between the electronic device 50 and an external device, and may include a receiving unit and a transmitting unit.

At least one of the components of the electronic device 50 described above may be included in the display device according to the embodiments described above. In addition, some of the individual modules functionally included in one module may be included in the display device, and others may be provided separately from the display device. In an embodiment, for example, the display device includes a display module 11, and the processor 12, memory 13, and power module 14 may be provided in the form of other devices within the electronic device 11 other than the display device.

Figure 28:
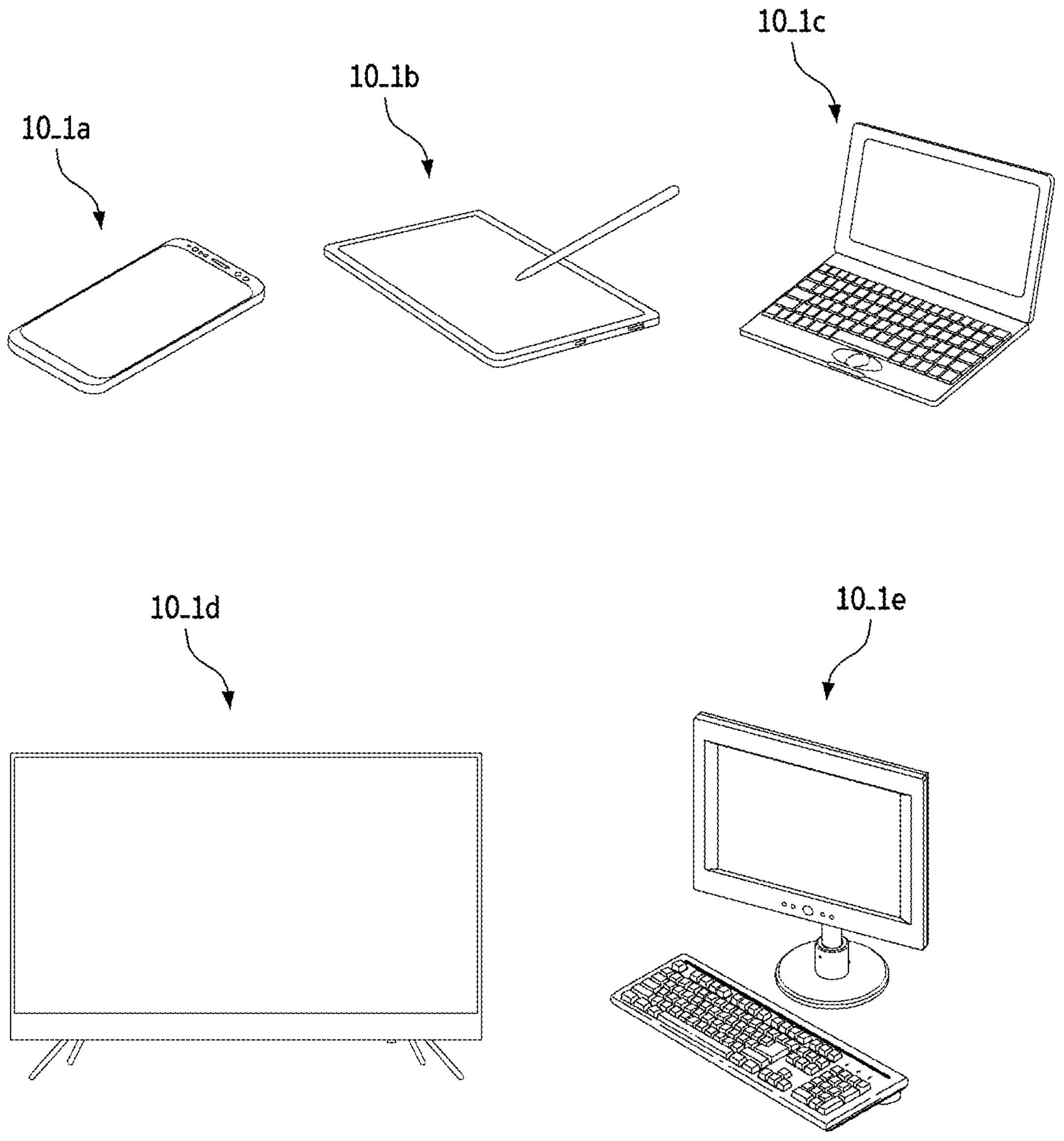
FIGS. 28, 29, and 30 are schematic diagrams of electronic devices according to various embodiments.
Figure 29:
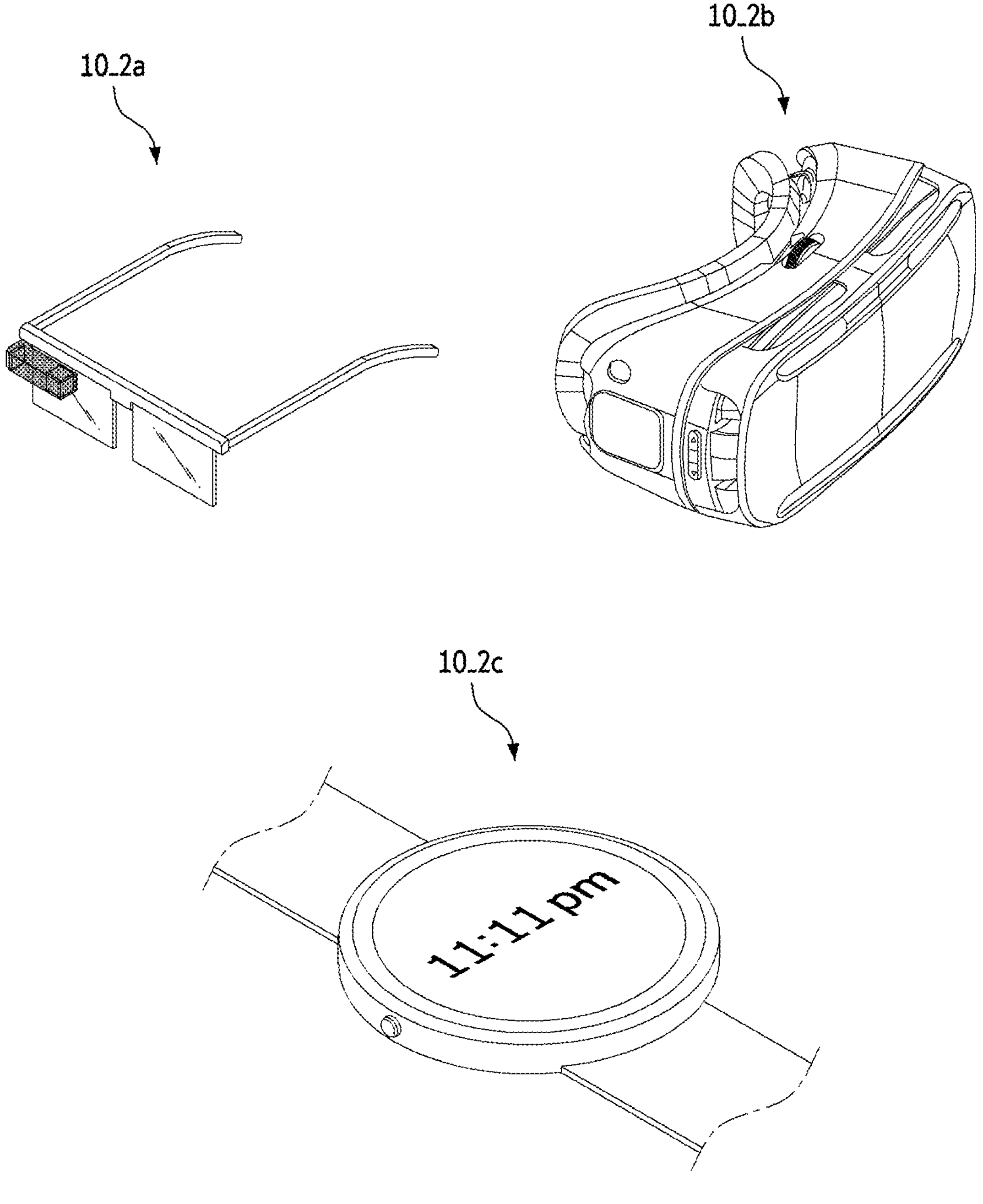
Figure 30:
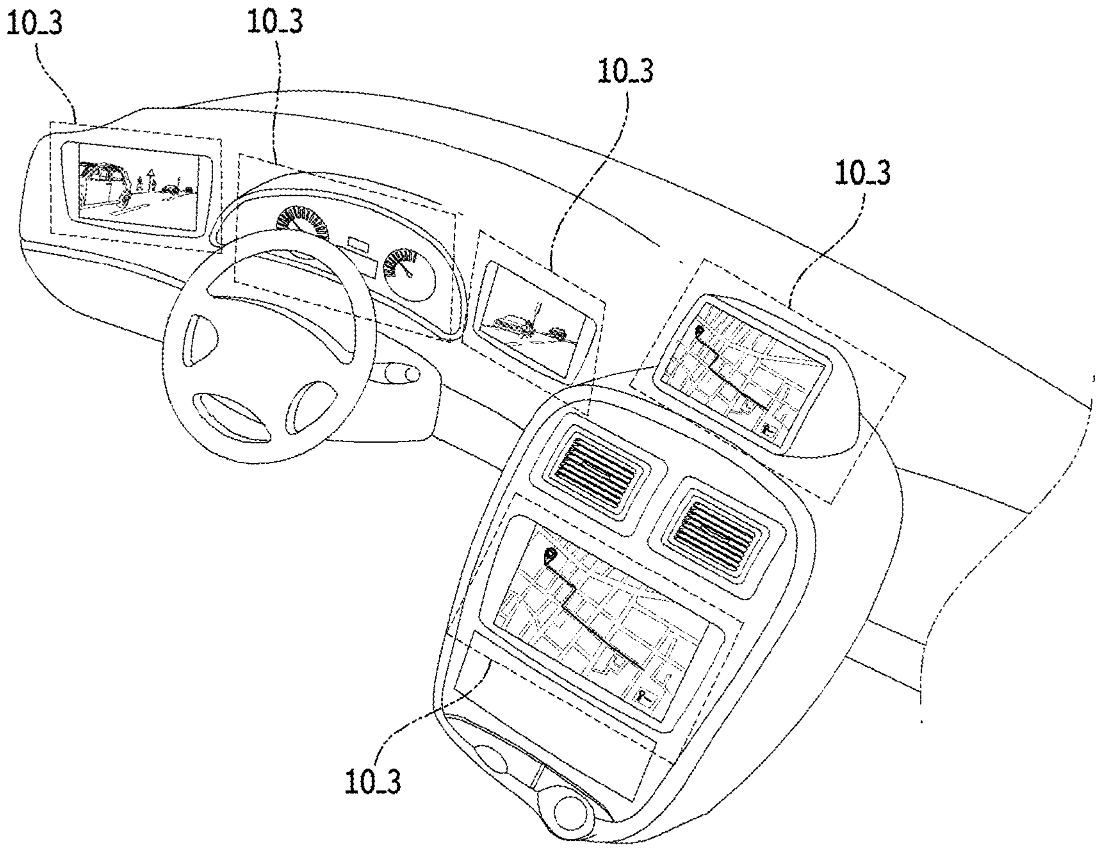

FIGS. 28, 29, and 30 are schematic diagrams of electronic devices according to various embodiments. FIGS. 28 to 30 illustrate examples of various electronic devices to which the display device according to embodiments is applied.

FIG. 28 illustrates a smartphone 10_1*a*, a tablet PC 10_1*b*, a laptop 10_1*c*, a TV 10_1*d*, and a desk monitor 10_1*e* as examples of electronic devices.

In addition to the display module 1000, the smartphone 10_1*a* may include an input module such as a touch sensor and a communication module. The smartphone 10_1*a* may process information received through the communication module or other input modules and display the information through the display module of the display device.

In the case of tablet PCs 10_1*b*, laptops 10_1*c*, TVs 10_1*d*, and desk monitors 10_1*e*, they also include display modules and input modules similar to smartphones 10_1, and may additionally include communication modules in some cases.

FIG. 29 shows an example of an electronic device including a display module being applied to a wearable electronic device. The wearable electronic device may be a smart glasses 10_2*a*, a head-mounted display 10_2*b*, a smart watch 10_2*c*, etc.

The smart glasses 10_2*a* and the head-mounted display 10_2*b* may include a display module that emits a display image and a reflector that reflects the emitted display screen and provides it to the user's eyes, thereby providing a virtual reality or augmented reality screen to the user.

The smart watch 10_2*c* includes a biometric sensor as an input device, and may provide biometric information recognized by the biometric sensor to the user through the display module. FIG. 30 illustrates a case where an electronic device including a display module is applied to a vehicle. For example, the electronic device 10_4 may be applied to a dashboard, center fascia, etc. of a vehicle, or may be applied to a CID (Center Information Display) placed on a dashboard of a vehicle, or a room mirror display replacing a side mirror.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a first pixel comprising a first light emitting element which provides light of a first color;

a second pixel comprising a second light emitting element which provides light of a second color different from the first color;

a first emission line which is connected to the first pixel and transmits a first emission signal to the first pixel; and a second emission line which is connected to the second pixel and transmits a second emission signal to the second pixel, wherein a first pulse width of the first emission signal is smaller than a second pulse width of the second emission signal, wherein a first data voltage during the first pulse width corresponding to a same gray level and applied to the first pixel is greater than a second data voltage during the second pulse width corresponding to the same gray level and applied to the second pixel.

2. The display device of claim 1, wherein the first color is red, and the second color is green.

3. The display device of claim 1, wherein an absolute value of a difference value between a reference voltage and the first data voltage is greater than an absolute value of a difference value between the reference voltage and the second data voltage.

4. The display device of claim 3, wherein the reference voltage is a voltage corresponding to a black gray level.

5. The display device of claim 1, wherein a first driving current corresponding to a same gray level and supplied to the first light emitting element is larger than a second driving current corresponding to a same gray level and supplied to the second light emitting element.

6. The display device of claim 5, wherein a peak value of the first driving current is greater than a peak value of the second driving current.

7. The display device of claim 1, further comprising:

a first emission driver which provides the first emission signal to the first emission line; and a second emission driver which provides the second emission signal to the second emission line.

8. The display device of claim 1, wherein the first pixel comprises:

a first transistor comprising a source electrode connected to a first node, a drain electrode connected to a second node, and a gate electrode connected to a third node;

a fifth transistor comprising a gate electrode connected to the first emission line, a source electrode connected to a driving voltage line, and a drain electrode connected to the first node; and a sixth transistor comprising a gate electrode connected to the first emission line, a source electrode connected to the second node, and a drain electrode connected to an anode of the first light emitting element.

9. The display device of claim 8, wherein the first pixel further comprises:

a second transistor comprising a gate electrode connected to a first gate line, a source electrode connected to a first data line, and a drain electrode connected to the first node;

a third transistor comprising a gate electrode connected to a second gate line, a source electrode connected to the third node, and a drain electrode connected to the second node;

a fourth transistor comprising a gate electrode connected to a third gate line, a drain electrode connected to the third node, and a source electrode connected to a first initialization voltage line;

a seventh transistor comprising a gate electrode connected to a fourth gate line, a source electrode connected to the anode of the first light emitting element, and a drain electrode connected to a second initialization voltage line; and a capacitor connected between the driving voltage line and the third node.

10. The display device of claim 9, wherein the first pixel further comprises an eighth transistor comprising a gate electrode connected to the fourth gate line, a source electrode connected to a bias voltage line, and a drain electrode connected to the first node.

11. The display device of claim 10, wherein each of the first transistor, the second transistor, the fifth transistor, the sixth transistor, the seventh transistor and the eighth transistor of the first pixel is a p-type transistor, and each of the third transistor and the fourth transistor of the first pixel is an n-type transistor.

12. The display device of claim 1, wherein the second pixel comprises:

a first transistor comprising a source electrode connected to a first node, a drain electrode connected to a second node, and a gate electrode connected to a third node;

a fifth transistor comprising a gate electrode connected to the second emission line, a source electrode connected to a driving voltage line, and a drain electrode connected to the first node; and a sixth transistor comprising a gate electrode connected to the second emission line, a source electrode connected to the second node, and a drain electrode connected to an anode of the second light emitting element.

13. The display device of claim 12, wherein the second pixel further comprises:

a second transistor comprising a gate electrode connected to a first gate line, a source electrode connected to a second data line, and a drain electrode connected to the first node;

a third transistor comprising a gate electrode connected to a second gate line, a source electrode connected to the third node, and a drain electrode connected to the second node;

a fourth transistor comprising a gate electrode connected to a third gate line, a drain electrode connected to the third node, and a source electrode connected to a first initialization voltage line;

a seventh transistor comprising a gate electrode connected to a fourth gate line, a source electrode connected to the anode of the second light emitting element, and a drain electrode connected to a second initialization voltage line; and a capacitor connected between the driving voltage line and the third node.

14. The display device of claim 13, wherein the second pixel further comprises an eighth transistor comprising a gate electrode connected to the fourth gate line, a source electrode connected to a bias voltage line, and a drain electrode connected to the first node.

15. The display device of claim 14, wherein each of the first transistor, the second transistor, the fifth transistor, the sixth transistor, the seventh transistor and the eighth transistor of the second pixel is a p-type transistor, and each of the third transistor and the fourth transistor of the second pixel is an n-type transistor.

16. The display device of claim 1, further comprising:

a third pixel comprising a third light emitting element which provides light of a third color different from the first color and the second color; and a third emission line which is connected to the third pixel and transmits a third emission signal to the third pixel, wherein a third pulse width of the third emission signal is greater than the first pulse width and smaller than the second pulse width.

17. The display device of claim 16, wherein the first color is red, the second color is blue, and the third color is green.

18. The display device of claim 16, wherein a third data voltage corresponding to a same gray level and applied to the third pixel is smaller than a first data voltage corresponding to a same gray level and applied to the first pixel and greater than a second data voltage corresponding to a same gray level and applied to the second pixel, wherein an absolute value of a difference value between a reference voltage and the third data voltage is smaller than the absolute value of the difference value between the reference voltage and the first data voltage and greater than the absolute value of the difference value between the reference voltage and the second data voltage.

19. An electronic device comprising:

a display device which displays an image, wherein the display device comprising:

a first pixel comprising a first light emitting element which provides light of a first color;

a second pixel comprising a second light emitting element which provides light of a second color different from the first color;

a first emission line which is connected to the first pixel and transmits a first emission signal to the first pixel; and a second emission line which is connected to the second pixel and transmits a second emission signal to the second pixel, wherein a first pulse width of the first emission signal is smaller than a second pulse width of the second emission signal, wherein a first data voltage during the first pulse width corresponding to a same gray level and applied to the first pixel is greater than a second data voltage during the second pulse width corresponding to the same gray level and applied to the second pixel.

* * * * *